United States Patent
Landers et al.

(10) Patent No.: US 6,247,036 B1
(45) Date of Patent: *Jun. 12, 2001

(54) PROCESSOR WITH RECONFIGURABLE ARITHMETIC DATA PATH

(75) Inventors: George Landers, Mt. View; Earle Jennings, San Jose, both of CA (US); Tim B. Smith, Dallas; Glen Haas, Plano, both of TX (US)

(73) Assignee: Infinite Technology Corp., Richardson, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/787,496

(22) Filed: Jan. 21, 1997

Related U.S. Application Data

(60) Provisional application No. 60/010,317, filed on Jan. 22, 1996.

(51) Int. Cl.[7] .................................................. G06F 15/00
(52) U.S. Cl. ............................................................. 708/603
(58) Field of Search ................................... 364/736, 759, 364/736.02, 754; 395/800; 708/603, 627, 501, 670

(56) References Cited

U.S. PATENT DOCUMENTS

| | | | |
|---|---|---|---|
| 4,215,416 | * 7/1980 | Muramatsu | 364/736 |
| 4,546,446 | * 10/1985 | Machida | 364/759 |

(List continued on next page.)

5,144,576   9/1992   Briggs et al. .

FOREIGN PATENT DOCUMENTS

| | | | |
|---|---|---|---|
| 0 122 117 A2 | 4/1984 | (EP) . | |
| 0316 036 A2 | * 11/1988 | (EP) | 7/544 |
| 0 377 837 A2 | 12/1989 | (EP) . | |
| 0 479 390 A2 | 10/1991 | (EP) . | |
| WO 96 08777 | 9/1995 | (WO) . | |

OTHER PUBLICATIONS

"MOVE: A framework for high–performance processor design", Corporaal, H. and Mulder, H., Publised Nov. 18, 1991, pp. 692–701.

"Programmable Data Paths Speed Computations", Bursky, D., Electronic Design, May 1, 1995.

(List continued on next page.)

*Primary Examiner*—Joseph E. Palys
*Assistant Examiner*—Omar A. Omar
(74) *Attorney, Agent, or Firm*—Gregory M. Howison

(57) ABSTRACT

A reconfigurable processor includes at least three (3) MacroSequencers (10)–(16) which are configured in an array. Each of the MacroSequencers is operable to receive on a separate one of four buses (18) an input from the other three MacroSequencers and from itself in a feedback manner. In addition, a control bus (20) is operable to provide control signals to all of the MacroSequencers for the purpose of controlling the instruction sequence associated therewith and also for inputting instructions thereto. Each of the MacroSequencers includes a plurality of executable units having inputs and outputs and each for providing an associated execution algorithm. The outputs of the execution units are input to an output selector which selects the outputs for outputs on at least one external output and on at least one feedback path. An input selector (66) is provided having an input for receiving at least one external output and at least the feedback path. These are selected between for input to select ones of the execution units. An instruction memory (48) contains an instruction word that is operable to control configurations of the datapath through the execution units for a given instruction cycle. This instruction word can be retrieved from the instruction memory (48), the stored instructions therein sequenced through to change the configuration of the datapath for subsequent instruction cycles.

10 Claims, 17 Drawing Sheets

U.S. PATENT DOCUMENTS

| | | |
|---|---|---|
| 5,184,318 | 2/1993 | Briggs et al. . |
| 5,260,897 * | 11/1993 | Toriumi et al. .................. 364/736 |
| 5,327,368 | 7/1994 | Eustace et al. . |
| 5,481,736 * | 1/1996 | Schwartz et al. .................. 395/800 |
| 5,659,495 | 8/1997 | Briggs et al. . |
| 5,826,072 * | 10/1998 | Knapp et al. .................. 395/567 |
| 5,878,255 * | 3/1999 | Tran et al. .................. 395/587 |

OTHER PUBLICATIONS

"An 80 MFLOPS Floating–point Engine in the Intel i1860(TM) Processor", Sit, H. P., Rosenraugh Nofal, M., Kimm, S., 1989 IEEE, pp. 374–379.

"Floating Point 2:1 High Level Design", IBM Technical Disclosure Bulletin, IBM Corp. 1991, p. 2830285.

* cited by examiner

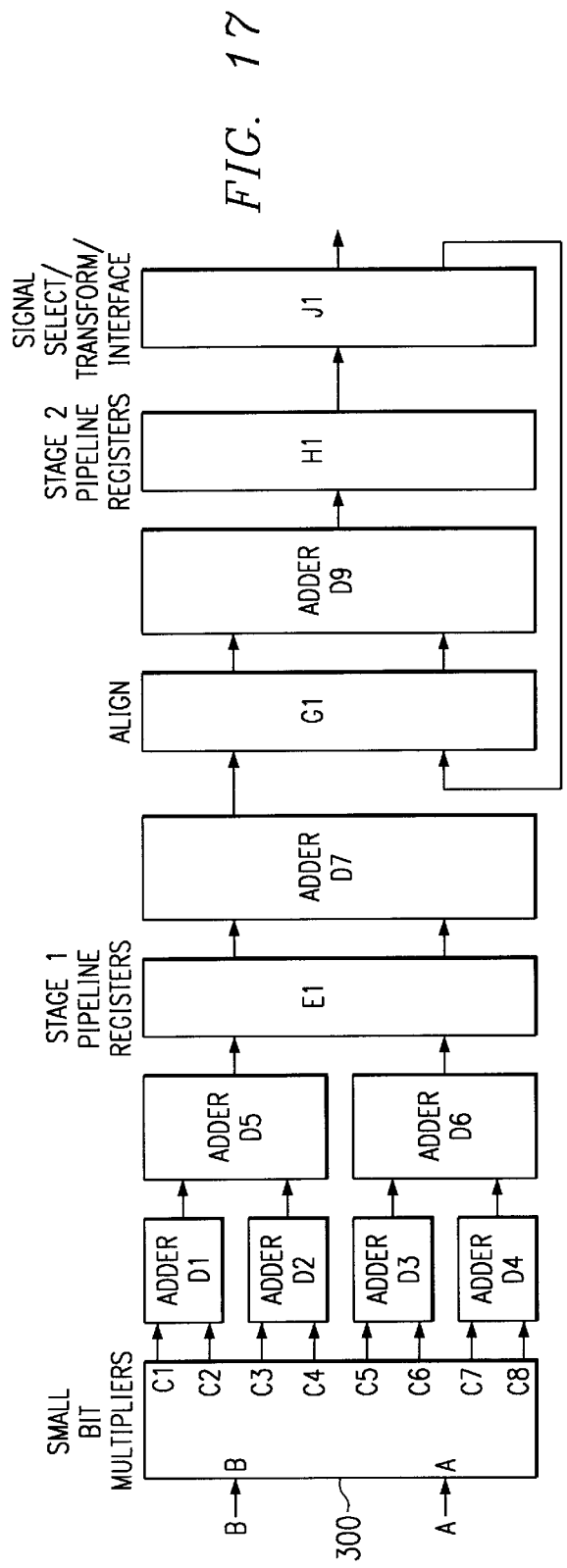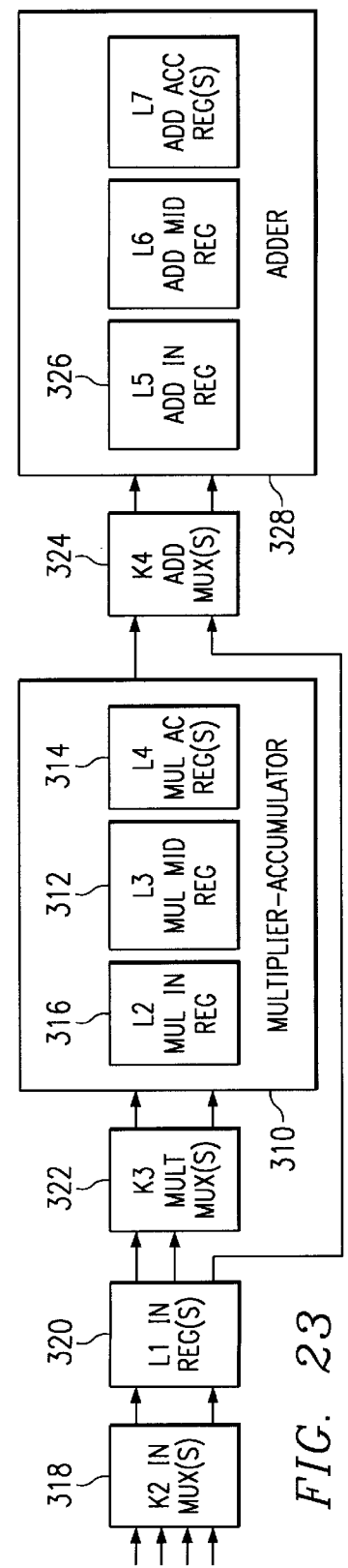

PROCESSOR WITH RECONFIGURABLE ARITHMETIC DATA PATH

CROSS REFERENCE TO RELATED APPLICATIONS

This application claims priority in Provisional Application Serial No. 60/010,317, filed Jan. 22, 1996.

TECHNICAL FIELD OF THE INVENTION

The present invention pertains in general to dual processors and, more particularly, to a digital processor that has a plurality of execution units that are reconfigurable and which utilizes a multiplier-accumulator that is synchronous.

BACKGROUND OF THE INVENTION

Digital single processors have seen increased use in recent years. This is due to the fact that the processing technology has advanced to an extent that large fast processors can be manufactured. The speed of these processors allows a large number of computations to be made, such that a very complex algorithms can be executed in very short periods of time. One use for these digital single processors is in real-time applications wherein data is received on an input, the algorithm of the transformer function computed and an output generated in what is virtually real-time.

When digital single processors are fabricated, they are typically manufactured to provide a specific computational algorithm and its associated data path. For example, in digital filters, a Finite Impulse Response (FIR) filter is typically utilized and realized with a Digital Single Processor (DSP). Typically, a set of coefficients is stored in a RAM and then a multiplier/accumulator circuit is provided that is operable to process the various coefficients and data in a multi-tap configuration. However, the disadvantage to this type of application is that the DSP is "customized" for each particular application. The reason for this is that a particular algorithm requires a different sequence of computations. For example, in digital filters, there is typically a multiplication followed by an accumulation operation. Other algorithms may require additional multiplications or additional operations and even some shift operations in order to realize the entire function. This therefore requires a different data path configuration. At present, the reconfigurable DSPs have not been a reality and they have not provided the necessary versatility to allow them to be configured to cover a wide range of applications.

SUMMARY OF THE INVENTION

The present invention disclosed and claimed herein comprises a reconfigurable processing unit. The reconfigurable unit includes a plurality of execution units, each having at least one input and at least one output. The execution units operate in parallel with each other, with each having a predetermined executable algorithm associated therewith. An output selector is provided for selecting one or more of the at least one outputs of the plurality of execution units, and providing at least one output to an external location and at least one feedback path. An input selector is provided for receiving at least one external input and the feedback path. It is operable to interface to at least one of the at least one inputs of each of the execution units, and is further operable to selectively connect one or both of the at least one external input and the feedback path to select ones of the at least one inputs of the execution units. A reconfiguration register is provided for storing a reconfiguration instruction. This is utilized by a configuration controller for configuring the output selector and the input selector in accordance with the reconfiguration instruction to define a data path configuration through the execution units in a given instruction cycle.

I another embodiment of the present invention, an input device is provided for inputting a new reconfiguration instruction into the reconfiguration register for a subsequent instruction cycle. The configuration controller is operable to reconfigure the data path of data through the configured execution units for the subsequent instruction cycle. An instruction memory is provided for storing a plurality of reconfiguration instructions, and a sequencer is provided for outputting the stored reconfiguration instructions to the reconfiguration register in subsequent instruction cycles in accordance with a predetermined execution sequence.

In yet another aspect of the present invention, at least one of the execution units has multiple configurable data paths therethrough with the execution algorithm of the one execution unit being reconfigurable in accordance with the contents of the instruction register to select between one of said multiple data paths therein. This allows the operation of each of said execution units to be programmable in accordance with the contents of the reconfiguration register such that the configuration controller will configure both the data path through and the executable algorithm associated with the one execution unit.

BRIEF DESCRIPTION OF THE DRAWINGS

For a more complete understanding of the present invention and the advantages thereof, reference is now made to the following description taken in conjunction with the accompanying Drawings in which:

FIG. 17 illustrates a block diagram of basic multiplier;

FIG. 23 illustrates a block diagram of a multiplier block with minimal support circuitry;

DETAILED DESCRIPTION OF THE INVENTION

Figure 1:
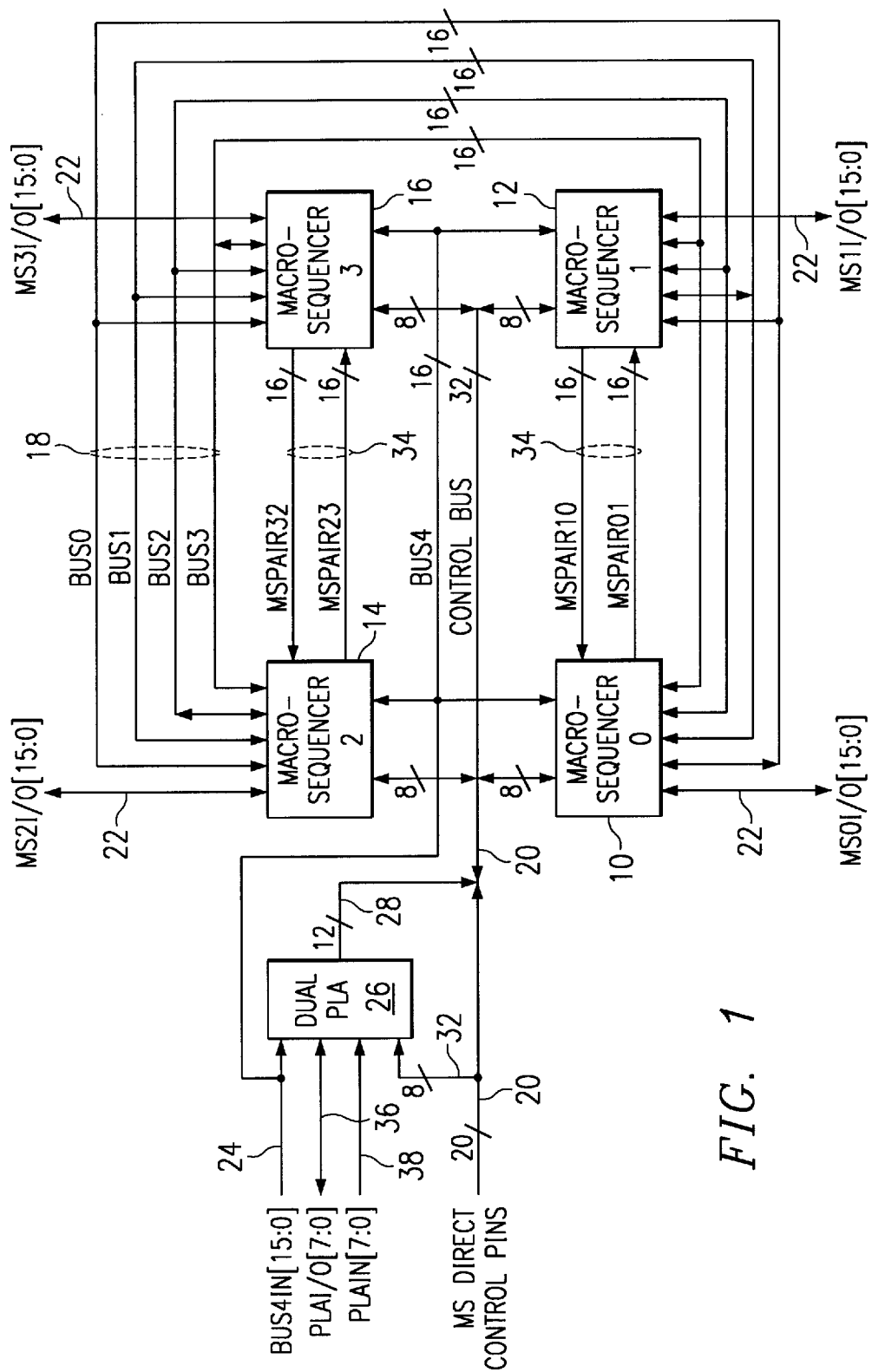
FIG. 1 illustrates a data flow diagram of a reconfigurable arithmetic data path processor in accordance with present invention.

Referring now to FIG. 1, there is illustrated a block diagram of the Reconfigurable Arithmetic Datapath Processor (RADP) of the present invention. The RADP is comprised of four (4) MacroSequencers, 10, 12, 14 and 16, respectively. MacroSequencers 10 and 12 comprised one (1) pair and MacroSequencers 14 and 16 comprised a second pair. Each of the MacroSequencers has associated therewith one of four Buses 18, labeled Bus0, Bus1, Bus2 and Bus3, respectively. Bus0 is associated with MacroSequencer 10, Bus1 with MacroSequencer 12, Bus2 with MacroSequencer 14 and Bus3 with MacroSequencer 16. These are global 16-bit buses. There is also provided a control bus 20, which is a 32-bit bus with 8-bits each associated with the MacroSequencer 10–16. Each MacroSequencer also has associated therewith an I/O bus 22, each Bus 22 comprises 16 I/O lines to allow each of the MacroSequencers 10–16 to interface with 64 I/O pins. Additionally, there is provided a 16-bit input bus 24 which interfaces with each of the MacroSequencers 10–16 to allow input of information thereto. A dual PLA 26 is provided which has associated therewith built-in periphery logic to control information to the bi-directional control bus 20. The PLA 26 interfaces with a control bus 20 through a 12-bit bus 28, with an external 20-bit control bus 30 interfacing with the control bus 20 and also with PLA 20 through an 8-bit control bus 32.

Each of the MacroSequencers 10–16 is a 16-bit a fixed-point processor that can be an individually initiated either by utilizing the dual PLA 26 or directly from the control bus 20. The bus 18 allows data to be shared between the MacroSequencers 10–16 according to various design needs. By providing the buses 18, a 16-bit data path is provided, thus increasing data throughput between MacroSequencers. Additionally, each pair of MacroSequencers 10 and 12 or 14 and 16 are interconnected to each other by two (2) private 16-bit buses 34, 16-bits in each direction. These private buses 34 allow each pair of MacroSequencers to be paired together for additional data sharing.

Each MacroSequencer is designed with a Long Instruction Word (LIW) architecture enabling multiple operations per clock cycle. Independent operation fields in the LIW control the MacroSequencer's data memories, 16-bit adder, multiplier-accumulator, logic unit, shifter, and I/O registers so they may be used simultaneously with branch control. The pipe-lined architecture allows up to seven operations of the execution units during each cycle.

The LIW architecture optimizes performance allowing algorithms to be implemented with a small number of long instruction words. Each Macro-Sequencer may be configured to operate independently, or can be paired for some 32-bit arithmetic operations.

Built-In Glue Logic

The Dual PLA 26 may be used for initiating stream processes, output enable signal generation, and interface glue logic. The eight I/O pins 36 can be configured individually as input only or output only pins. These can be used for external interface control. Process initiation and response may be provided externally via input pins 38 directly to the MacroSequencers or it may be provided by the programmable PLA via the control bus 20. The RADP operates in either a configuration operating mode or a normal mode. The configuration mode is used for initializing or reconfiguring the RADP and the normal mode is used for executing algorithms.

Paired MacroSequencer Operational Support

The MacroSequencers may be used individually for 16-bit operations or in pairs for standard 32-bit addition, subtraction, and logic operations. When pairing, the MacroSequencers are not interchangeable. MacroSequencers 10 and 12 form one pair, and MacroSequencers 14 and 16 form the other pair. The least significant sixteen bits are processed by MacroSequencers 10 and 12. The two buses 34 are available to the MacroSequencer pairs for direct interchange of data.

Data Bus

The five global data buses consisting of data buses 18 and input data bus 24 can be simultaneously accessed by all of the MacroSequencers. Four of the buses 18, bus0, bus1, bus2, and bus3, are associated with MacroSequencers 10, 12, 14, and 16, respectively. These four buses receive data from either the MacroSequencer I/O pins 22 or an output register (not shown) in the MacroSequencer. The fifth bus, bus4, always receives data from BUS4IN[15:0] pins.

Control Bus

The Control Bus 20 is used to communicate control, status, and output enable information between the MacroSequencer and the PLA 26 or external MacroSequencer pins. There are six signals associated with each MacroSequencer.. Two control signals sent to the MacroSequencer are described hereinbelow with reference to a MacroSequencer Datapath Controller and are used to:

Initiate one of two available LIW sequences,

Continue execution of the LIW sequence, or

Acknowledge the MacroSequencer status flags by resetting the send and await state bits.

Status Signals

Two status signals, Await and Send, are sent from the MacroSequencer which are described in more detail with respect to the MacroSequencer Datapath Controller hereinbelow and indicate:

the Program Counter is sequencing;

the MacroSequencer is in the send state it has executed a specific LIW;

the Program Counter is continuing to sequence;

the MacroSequencer is in the await state and it has executed a specific LIW; and the Program Counter is not continuing to sequence, and it is awaiting further commands before resuming.

Output Enable

Two output enable signals for each MacroSequencer are described with reference to an Output Selection operation described hereinbelow and allow for output enable to be:

from the Dual PLA 26 oepla outputs or from MacroSequencer(n) output enable MSnOE pins;

always output;

Always input (the power up condition); or

Optionally inverted.

Input Clocks

Five input clocks are provided to allow the RADP to process multiple data streams at different transmission speeds. There is one clock for each Macro-Sequencer, and a separate clock for the PLA 26. Each MacroSequencer can operate on separate data paths at different rates. The clock signals can be connected, for synchronization between the four MacroSequencers 10–16 and the Dual PLA 26.

MacroSequencer Description

Figure 2:
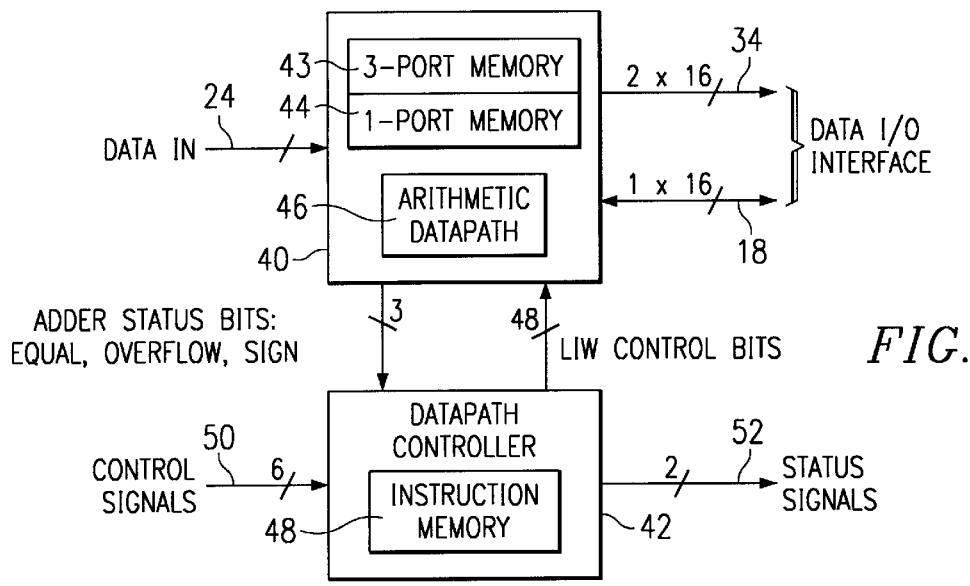
FIG. 2 illustrates a top level block diagram of the MacroSequencer.
Figure 4:
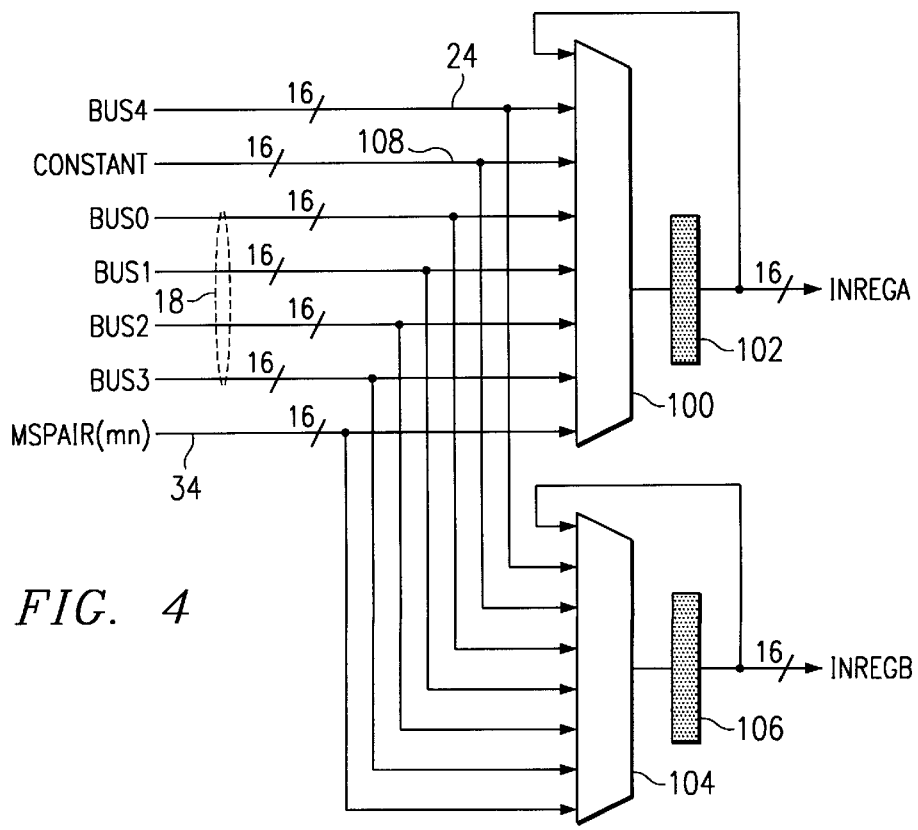
FIG. 4 illustrates a logic diagram of the input register.

Referring now to FIG. 2, there is illustrated a overall block diagram of each of MacroSequencers 10–14. The MacroSequencer generally is comprised of two (2) functional blocks, an arithmetic datapath block 40 and a datapath controller block 42. The arithmetic datapath block 40 includes a three (3) port memory 43 and one port memory 44, in addition to various execution blocks contained therein (not shown). The execution blocks are defined as the arithmetic datapath, represented by block 46. The three port memory 43 and a one port memory 44 are accessed by the arithmetic datapath 46. The datapath controller 42 includes an instruction memory 48. The three port memory 43, the one port memory 44 and the instruction memory 48 are all loaded during an Active Configuration Mode. The arithmetic datapath 40 receives input from the data-in bus 24 and provides an interface through the interface buses 18 and also through the dedicated pair of interfaced buses 34. Control signals are received on 6-bits of the control bus 20 through control signal bus 50 with status signals provided by 2-bits of the control bus 20 through status signal lines 52.

The control signals may initiate one of two programmed LIW sequences in instruction memory 48 in normal operating mode. Once a sequence begins, it will run, or loop indefinitely until stopped by the control signals. An await state programmed into the LIW sequence will stop the Program Counter from continuing to increment. The LIW sequences are a combination of data steering, data processing, and branching operations. Each MacroSequencer may execute a combination of branch, memory access, logic, shift, add, subtract, multiply-accumulate, and input/output operations on each clock cycle. The instruction memory can be reloaded dynamically at any time by transitioning to Active Configuration Mode which will also initialize all registers in the entire device.

Figure 3:
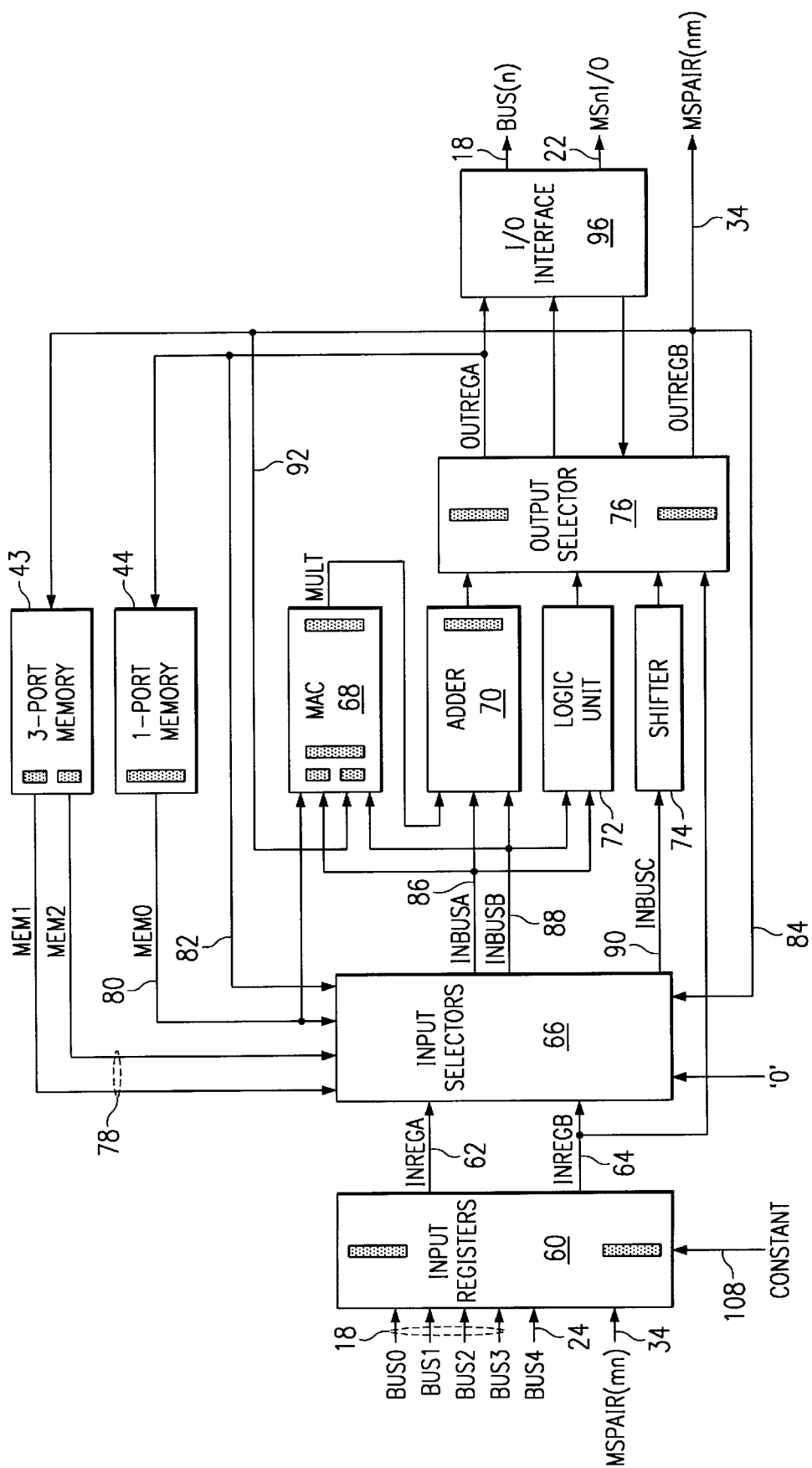
FIG. 3 illustrates a more detailed block diagram of the MacroSequencer.

Referring now to FIG. 3 is illustrated a block diagram of the MacroSequencer datapath for MacroSequencers 10–16. The databus 18 and databus 24 are input to input register 60, which also receives a constant as a value. There are two (2) registers in the input registers 60, an input register A and input register B. The output of the input register A is output on the line 62 and the output of the input register B is output on the line 64. The contents of input registers A and B on lines 62 and 64 are input to an input selector block 66. As will be described hereinbelow, the input selector is operable to provide a central portion of a pipeline structure where data is processed through six stages.

There are nine (9) basic elements in the MacroSequencer Arithmetic Datapath. Six (6) of these are data processing elements and six (6) are data steering functions, of which the input selector 66 is one of the data steering functions. The data processing elements include a multiplier-accumulator (MAC) 68, an adder 70, a logic unit 72 and a shifter 74. The three port memory 43 and the one port memory 44 also comprise the data processing elements. The data steering functions, in addition to the input selector 66, also include the input register block 60 and an output register block 76.

The input register block 60, as noted above, can capture any two (2) inputs thereto. Input selector 66 is operable to, in addition to, receive the two line 62 and 64, as noted above, and also receive two (2) outputs on two (2) lines 78 from the output of the three port memory 43 and one (1) output line 80 from the one port memory 44. It also receives on a line 82 an output from the output register block 76 which is from a register A. The output of the register B, also output from the output register block 76 is output on a line 84 to the input selector. In addition, a value of "0" is input to the input selector block 66. The input selector block 66 is operable to select any three operands for data processing elements. These are provided on three buses, a bus 86, a bus 88, and a bus 90. A bus 86 is input to the MAC 68, the adder 70 and the logic unit 72, with bus 88 input to the MAC 68, adder 70 and logic unit 72. The Bus 90 is input only to a shifter 74. The MAC 68 also receives as an input the output of the register B on a line 92 and the output of the one port memory 44. The output of MAC 68 comprises another input of the adder 70, the out put of the adder 70 input to the output selector block 76. The logic unit 72 has an output that is connected to the output selector 76, as well as a shifter 74 having an output to the output selector block 76. The output selector block 76 also receives as an input the output from register B in the input register block 60. The output of register B is connected to the output one of the MacroSequencer pier bus 34, whereas the output of register B is output to the input of an interface block 96 which is connected to one of the four data buses 18 and the I/O bus 22. The I/O bus 22 also comprises an input to the output selector 76. Therefore, the output selector/register block 76 is operable to select which two of the data processing elements are stored, as will be described in more detail hereinbelow.

Each of the four (4) parallel data processing units, the MAC 68, Adder 70, logic unit 72 and shifter 74, runs in the parallel with the others allowing the execution of multiple operations per cycle. Each of the data processing functions in the MacroSequencer datapath will be discussed hereinbelow in detail. However, they are controlled by the operation fields in the MacroSequencers LIW register. It is noted that, as described herein, the terms "external" and "internal" do not refer to signals external and internal to the RADP; rather, they refer only to signals external and internal to an individual MacroSequencer.

The 16-bit input registers in register block 60 comprise InRegA and InRegB. There are six external inputs and one internal input available to the Input Registers. The input registers are comprised of an 8-to-1 multiplexer 100 with the output thereof connected to a register 102, the output of register 102 comprising the InRegA output. Also, an 8-to-1 multiplexer 104 is provided having the output thereof connected to a register 106, which provides the output InRegB. Seven of the inputs of both multiplexers 100 and 104 connected to six inputs, one input being the 16-bit input of bus 24, one being a 16-bit constant input bus 108, four being the 16-bit data buses 18 and one being the pair bus 34, which is also a 16-bit bus. The constant is a value that varies from "0" to "65535", which is generated from the LIW register bits. The eighth input of the multiplexor 100 is connected to the output of register 102, whereas the 8 input of register 106 is connected to the output of register 106.

The Constant introduces 16-bit constants into any calculation. The constant of the MacroSequencer shares internal signals with the MacroSequencer Controller as well as the MAC 68, the Shifter 74, and the Logic Unit 72. Since the Constant field of the LIW is shared, care must be taken to insure that overlap of these signals does not occur. The RADP Assembler detects and reports any overlap problems.

Input Selector

Figure 5:
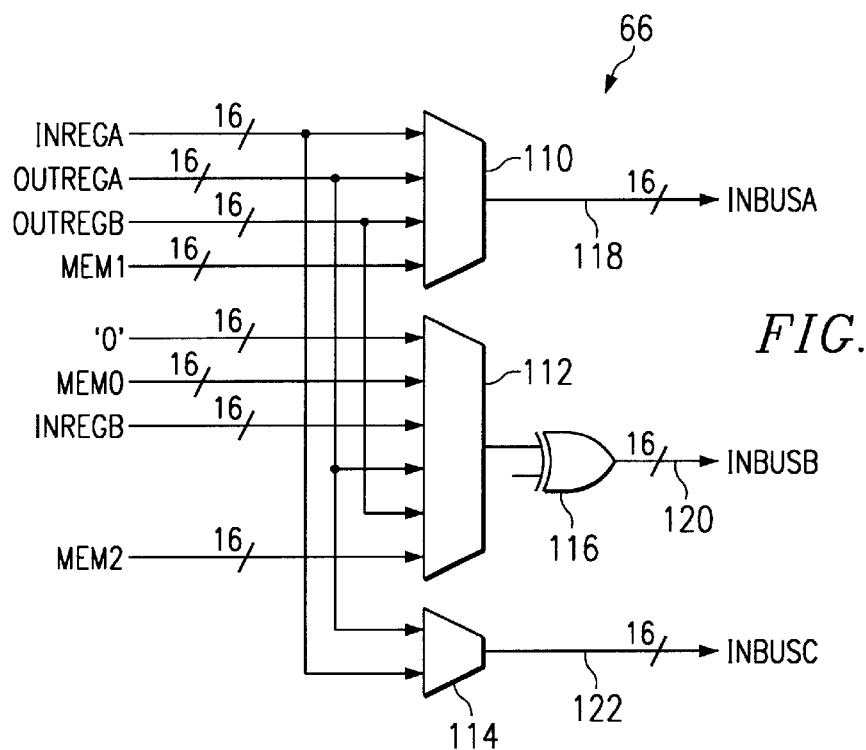
FIG. 5 illustrates a logic diagram of the input selector.

Referring now to FIG. 5, there is illustrated a block diagram of the input selector block 66. The input selector block 66 is comprised of a four-to-one multiplexer 110, a six-to-one multiplexer 112 and a two-to-one multiplexer 114. The multiplexer 112 is connected to one input of an Exclusive OR gate 116. The output of multiplexer 110 is connected to a bus 118 to provide the InBusA signals, the output of Exclusive OR gate 116 is connected to a bus 120 to provide the InBusB signals and the output of multiplexer 114 is connected to a bus 122 to provide the InBusC signals. Inputs to the Input Selector 66 include:

InRegA and InRegB from the Input Register 60,
OutRegA and OutRegB from the Output Register 76,
mem1 and mem2 from the Three-Port Memory read ports 1 and 2 respectively on lines 78,
mem0 from the One-Port Memory read port on line 80, and
Constant '0' which is generated in the Input Selector 66.

Control signals from the MacroSequencer Controller (not shown) determine which three of the eight possible inputs are used and whether InBusB is inverted or not. The Input Selector 66 is automatically controlled by assembly language operations for the MAC 68, Adder 70, Shifter 74, and Logic Unit 72 and does not require separate programming. The input selections are controlled by the same assembly operations used by the MAC 68, Adder 70, Logic Unit 72 and Shifter 74.

Multiplier-Accumulator

Figure 6:
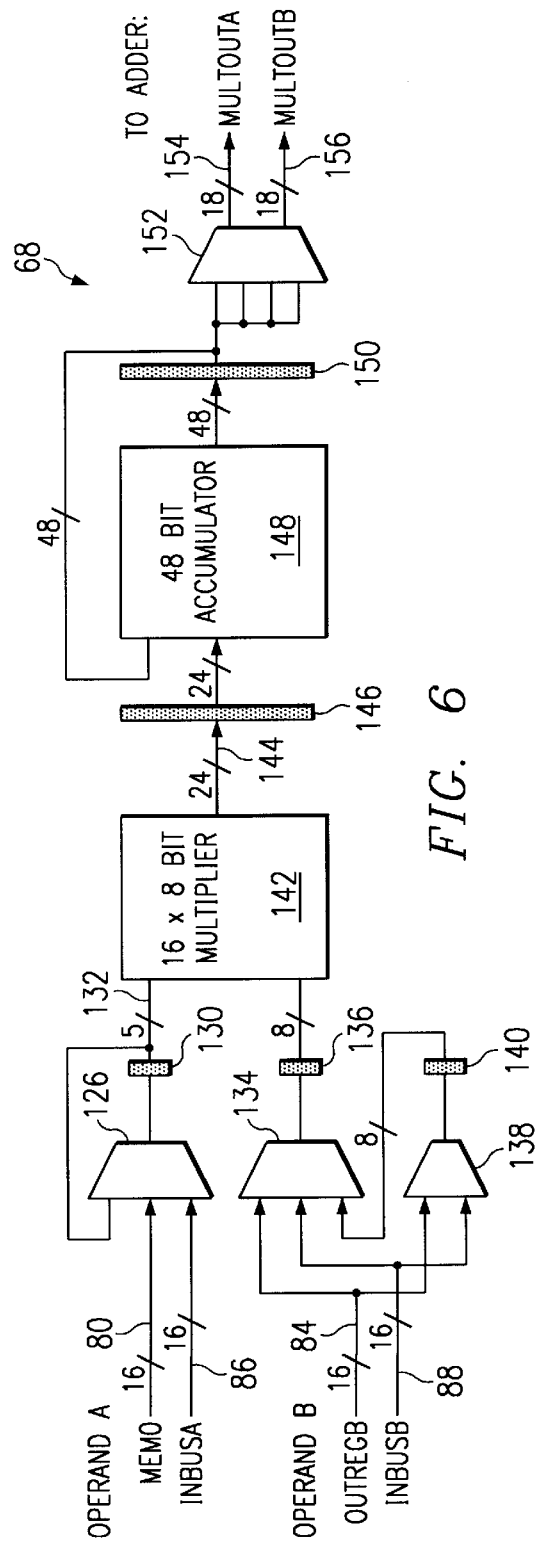
FIG. 6 illustrates a block diagram of the multiplier-accumulator.

Referring now to FIG. 6, there is illustrated a block diagram of the MAC 78. The Multiplier-Accumulator (MAC) 78 is a three-stage, 16 by 8 multiplier capable of producing a full 32-bit product of a 16 by 16 multiply every two cycles. The architecture allows the next multiply to begin in the first stages before the result is output from the last stage so that once the pipe-line is loaded, a 16 by 8 result (24-bit product) is generated every clock cycle.

The input to the MAC 78 is comprised of an Operand A and an Operand B. The Operand A is comprised of the output of the One-Port memory 44 on the bus 80 and the InBusA 86. These are input to a three-to-one multiplexer 126, the output thereof input to a register 130, the output of the register 130 connected to a 16-bit bus 132. The output of the register 130 is also input back as a third input of the multiplexer 126. The Operand B is comprised of the OutRegB bus 84 and the InBusB bus 88. These buses are input to a three-to-one multiplexer 134, the output thereof connected to the register 136. They are also input to a 2-input multiplexer 138, the output thereof input to a register 140, the output of register 140 input as a third input to the multiplexer 130. The output of registers 130 and 136 are input to a 16x8-bit multiplier 142 which is operable to multiply the two Operands on the inputs to provide a 24-bit output on a bus 144. This is input to a register 146, the output thereof input to a 48-bit accumulator 148. The output of the accumulator 148 is stored in a register 150, the output thereof fed back to the input of the accumulator 148 and also to the input of a four-to-two multiplexer 152, the output of the register 150 connected to all four inputs of multiplexer 152. The multiplexer 152 then provides two outputs for input to the Adder 70 on buses 154 and 156. The operation of the MAC 68 will be described in more detail hereinbelow. Either or both operands may be signed or unsigned. The multiplier input multiplexers 126, 134 and 138 serve two purposes:

1) They align the high or low bytes from Operand B for the multiplier which allows 16 by 8 or 16 by 16 multiply operations; and 2) They allow each operand to be selected from three different sources:

Operand A is selected from the One-Port Memory 44, InBusA 86, or Operand A from the previous cycle.

Operand B is selected from the high byte of OutRegB 84, InBusB 88, or the least significant byte of the previous Operand B.

The Multiplier Stage 142 produces a 24-bit product from the registered 16-bit Operand A and either the most significant byte (8-bits) or the least significant byte of Operand B. The Accumulator Stage 148 aligns and accumulates the product. Controls in the accumulator allow the product to be multiplied by: 1 when <weight> is low, or 28 when <weight> is high. The result is then: added to the result in the accumulator 148 when <enable> is acc, placed in the accumulator replacing any previous value when <enable> is clr, or held in the accumulator in lieu of mult3 operation.

Cycles per Multiply

The number of cycles required for Multiplies and MACs are shown in Tables 1 and 2.

TABLE 1

Cycles Between New Multiplies

| Multiply | Accuracy | Cycles |
|---|---|---|
| 16 by 8 | 16 bits | 1 |
|  | 24 bits | 2 |
| 16 by 16 | 16 bits | 2 |
|  | 16 by 816 by 832 bits | 3 |

TABLE 2

Cycles Between New Multiply - Accumulates of $n$ Products

| Multiply | Accuracy | Cycles |
|---|---|---|
| 16 by 8 | 16 bits | n |
|  | 32 bits | n + 1 |
|  | 48 bits | n + 2 |
| 16 by 16 | 16 bits | 2n |
|  | 32 bits | 2n + 1 |
|  | 48 bits | 2n + 2 |

The MAC internal format is converted to standard integer format by the Adder 70. For this reason, all multiply and multiply-accumulate outputs must go through the Adder 70.

If a 16- by 8-bit MAC 68 is desired, new operands are loaded every cycle. The Multiplier 142 results in a 24-bit product which is then accumulated in the third stage to a 4-bit result. This allows at least $2^{24}$ multiply-accumulate operations before overflow. If only the upper 16-bits of a 24-bit result are required, the lower eight bits may be discarded. If more than one 16-bit word is extracted, the accumulated result must be extracted in a specific order. First the lower 16-bit word is moved to the Adder 70, followed in order by the middle 16 bits and then the upper 16 bits. This allows at least $2^{16}$ of these 16- by 16-bit multiply-accumulate operations before overflow will occur.

Adder

Figure 7:
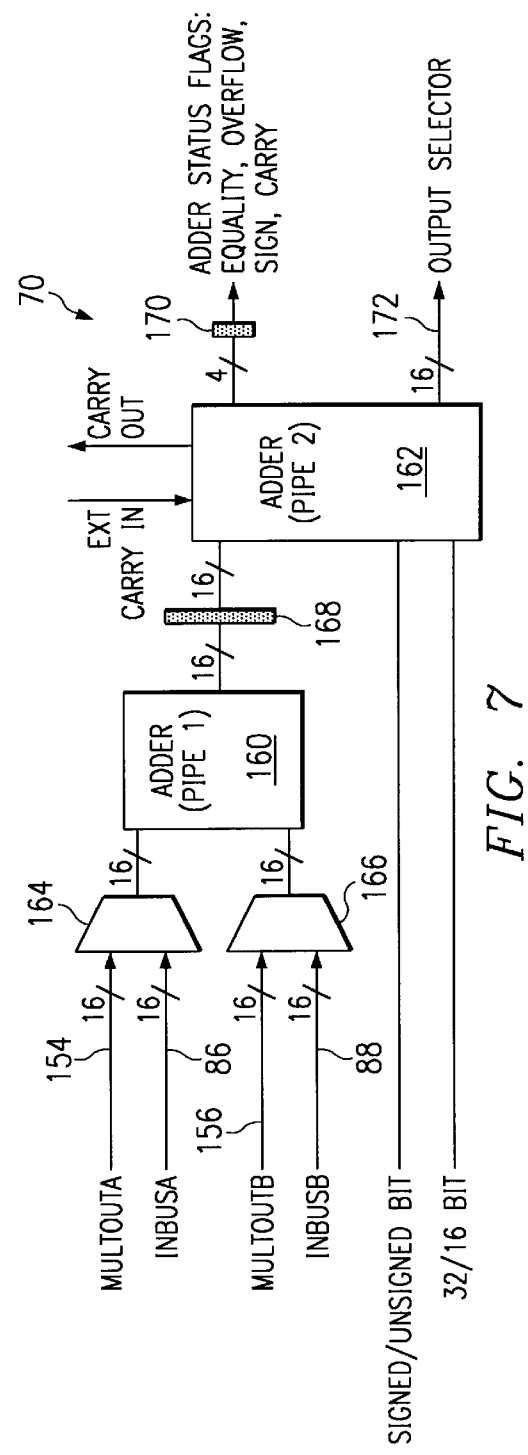
FIG. 7 illustrates a logic diagram of the adder.

Referring now to FIG. 7, there is illustrated a block diagram of the Adder 70. The Adder 70 produces a 16-bit result of a 16- by 16-bit addition, subtraction, or 16-bit data conversion to two's complement every cycle. The Adder 70 is also used for equality, less-than and greater-than comparisons. The Adder 70 is comprised of two Adder pipes, an Adder pipe 160 and Adder pipe 162. There are provided two multiplexers 164 and 166 on the input, with multiplexer 164 receiving the multiplier output signal on bus 154 and the multiplexer 166 receiving the multiplier output on bus 156. Additionally, multiplexer 164 receives the signal on the InBusA 86 with multiplexer 166 receiving as an input the signals on InBusB 88. The output of multiplexers 164 and 166 are input to the Adder pipe 160, the output thereof being input to a register 168. The output of register 168 is input to the Adder pipe to 162, which also receives an external carry N-bit, a signal indicating whether the operation is a 32-bit or 16-bit operation and a signed/unsigned bit. The Adder pipe to 162 provides a 4-bit output to a register 170 which combines the Adder status flags for equality, overflow, sign and carry and also a 16-bit output selector on a bus 172. The architecture allows the next adder operation to begin in the first stage before the result is output from the last stage.

The input multiplexers 164 and 166 select one of two sources of data for operation by the Adder 70. The operands are selected from either InBusA 86 and InBusB 88, or from the Multiplier 68. Select InBusA 86 and InBusB 88 are selected for simple addition or subtraction and setting the Adder Status flags. The multiplier 68 outputs, MultOutA 154 and MultOutB 156, are selected for conversion. The first adder stage 160 receives the operands and begins the operation. The second adder stage 162 completes the operation and specifies the output registers in the Output Selector where the result will be stored. The two adder stages 160 and 162 may be controlled separately for addition and subtraction operations.

The Adders 70 from a pair of MacroSequencers may be used together to produce 32 bit sums or differences. There is no increase in the pipe-line latency for these 32 bit operations. The Adder 70 may be placed in the sign or unsigned mode.

Adder Status Bits—The Equal, Sign, Overflow, and Carry flags are set two cycles after an addition operation (add1 or sub1) occurs and remain in effect for one clock cycle:

The Equal flag is set two cycles later when the two operands are equal during an addition operation;

The Overflow flag is set when the result of an addition or subtraction results in a 16-bit out-of-range value;

When the adder 70 is configured for unsigned integer arithmetic, Overflow=Carry. Range=0 to 65535;

When the adder is configured for signed integer arithmetic, Overflow=Carry XOR Sign. Range=– 32768 to +32767;

The Sign flag is set when the result of an addition or subtraction is a negative value;

The Carry flag indicates whether a carry value exists.

The Adder 70 may be used to convert the data in the Accumulator 148 of the Multiplier 142 to standard integer formats when inputs are selected from the output of the MAC 68. Since the Accumulator 148 is 48 bits, the multiplier's accumulated result must be converted in a specific order: lower-middle for 32-bit conversion, and lower-middle-upper for 48-bit conversion. Once the conversion process is started, it must continue every cycle until completed. Signed number conversion uses bits 30:15.

Shifter

Shift Mode signals control which Shifter functions are performed:

Logical Shift Left by n bits (shift low order bits to high order bits). The data shifted out of the Shifter is lost, and a logical '0' is used to fill the bits shifted in.

Logical Shift Right by n bits (shift high order bits to low order bits). The data shifted out of the Shifter is lost, and a logical '0' is used to fill the bits shifted in.

Arithmetic Shift Right by n bits. This is the same as logical shift right with the exception that the bits shifted in are filled with Bit[15], the sign bit. This is equivalent to dividing the number by $2^n$.

Rotate Shift Left by n bits. The bits shifted out from the highest ordered bit are shifted into the lowest ordered bit.

Normalized Shift Right by 1 bit. All bits are shifted one lower in order. The lowest bit is lost and the highest bit is replaced by the Overflow Register bit of the Adder. This is used to scale the number when two 16-bit words are added to produce a 17-bit result.

Logical, Arithmetic and Rotate shifts may shift zero to fifteen bits as determined by the Shift Length control signal.

Logic Unit

Figure 9:
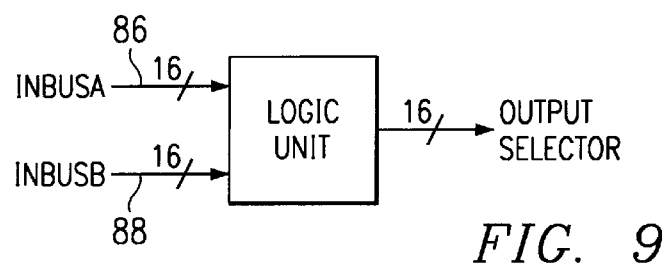
FIG. 9 illustrates a block diagram of the logic unit.

Referring now to FIG. 9, there is illustrated a block diagram of the Logic Unit 72. The Logic Unit 72 is able to perform a bit-by-bit logical function of two 16-bit vectors for a 16-bit result. All bit positions will have the same function applied. All sixteen logical functions of 2 bits are supported. The Logic Function controls determine the function performed. The Logic Unit 72 is described in U.S. Pat. No. 5,394,030, which is incorporated herein by reference.

One-Port Memory

Figure 10:
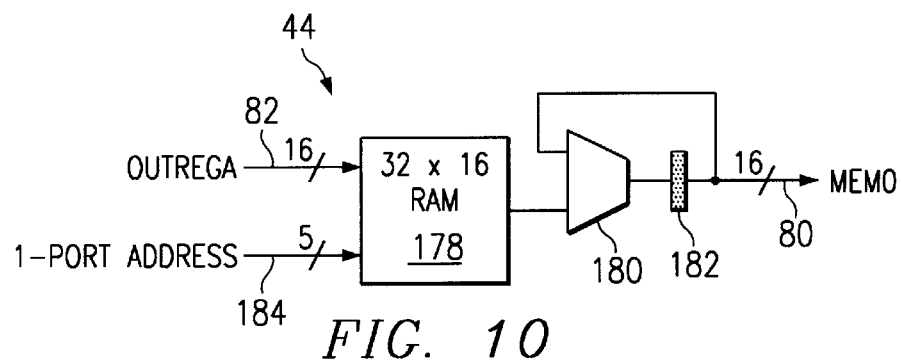
FIG. 10 illustrates a block diagram of the one port memory.

Referring now to FIG. 10, there is illustrated a block diagram of the One-Port Memory 44. The One-Port Memory 44 is comprised of a random access memory (RAM) which is a 32×16 RAM. The RAM 44 receives on the input thereof the data from the OutRegA bus 82. The output of the RAM 44 is input to a multiplexer 180, the output thereof input to a register 182, the output of the register 182 connected to the bus 80. Also, the bus 80 is input back to the other input of the multiplexer 180. A 5-bit address for the RAM 178 is received on a 5-bit address bus 184. The One-Port Memory 44 supports single-cycle read and single-cycle write operations, but not both at the same time. There are 32 addressable 16-bit memory locations in the One-Port Memory 44. The register 182 is a separate register provided to store and maintain the result of a read operation until a new read is executed. Read and write operands control whether reading or writing memory is requested. No operation is performed when both the Read and Write Controls are inactive. Only one operation, read or write, can occur per cycle. Index registers provides the read and write address to the One-Port Memory. The index register may be incremented, decremented, or held with each operation. Both the index operation and the read or write operation are controlled by the MacroSequencer LIW.

Three-Port Memory

Figure 11:
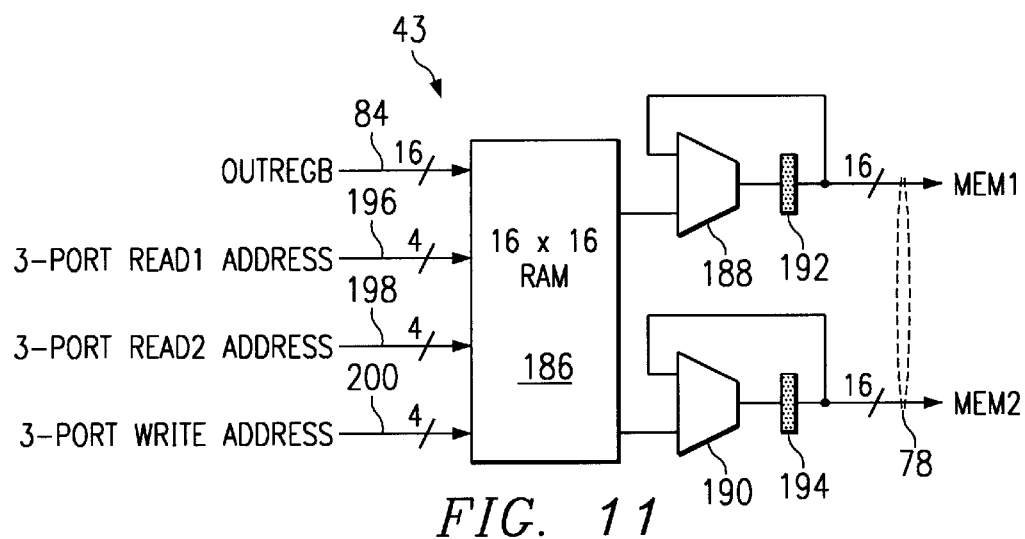
FIG. 11 illustrates a block diagram of the three port memory.

Referring now to FIG. 11, there is illustrated a block diagram of a Three-Port Memory 43. The Three-Port Memory 43 is comprised of a 16×16 RAM 186, which receives as an input the OutRegB contents as an input on the bus 84 and provides two outputs, one output providing an input to a multiplexer 188 and one output providing an input to a multiplexer 190. The output of multiplexer 188 is input to a register 192 and the output of the multiplexer 190 is input to a register 194. The output of register 192 provides the mem1 output on the line 78 and the output of register 194 provides the mem2 output on buses 78, buses 78 each comprising the 16-bit bus. Additionally, the output of register 192 is fed back to the other input of multiplexer 188 and the output of register 194 is fed back to the input of the multiplexer 190. There are two read operations that are provided by the RAM 186 and they are provided by two read addresses, a Read1 address on a 4-bit bus 196 and a 4-bit read address on a bus 198, labeled Read2. The write address is provided on a 4-bit bus 200. The Three-Port Memory 43 supports two read and one write operation on each clock cycle. The two read ports may be used independently; however, data may not be written to the same address as either read in the same clock cycle. Four index registers are associated with the Three-Port Memory. Two separate registers are provided for write indexing: Write Offset and Write Index. These two registers may be loaded or reset simultaneously or independently. Write Offset provides a mechanism to offset read index registers from the Write Index by a fixed distance. Increment and Decrement apply to both write registers so that the offset is maintained. The two Read Index registers may be independently reset or aligned to the Write Offset.

Smart Indexing

Figure 12:
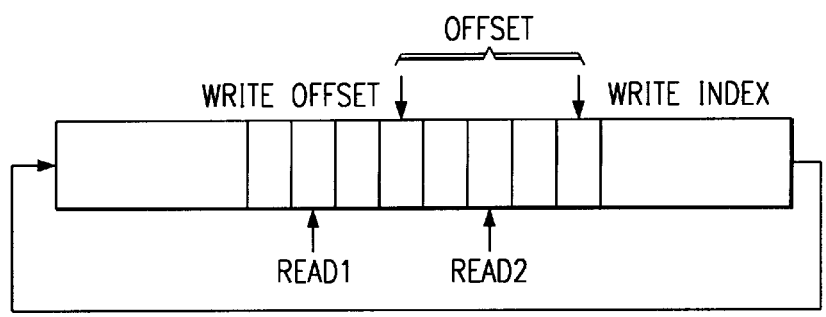
FIG. 12 illustrates a diagram of the 3-port index pointers.

Referring now to FIG. 12, there is illustrated a block diagram of the Three-Port Memory Index Pointers. Smart Indexing operates multiple memory addresses to be accessed. This is particularly useful when the data is symmetrical. Symmetrical coefficients are accessed by providing the Write Offset from the center of the data and aligning both Read Indices to the Write Offset. The Read Indices may be separated by a dummy read. Additional simultaneous reads with one index incrementing and the other decrementing allows for addition or subtraction of data that uses the same or inverted coefficients. Each index has separate controls to control its direction. Each index may increment or decrement, and/or change its direction. The change in each index register's address takes place after a read or write operation on the associated port. Smart Indexing is ideal for Filter, and DCT applications where pieces of data are taken from equal distance away from the center of symmetrical data. The Smart Indexing method used in the Data Memory allows symmetrical data to be multiplied in half the number of cycles that would have normally been required. Data from both sides can be added together and then multiplied with the common coefficient. For example, a 6-tap filter which would normally take 6 multiplies and 7 cycles, can be implemented with a single MacroSequencer and only requires 3 cycles to complete the calculation. An 8-point DCT which normally requires 64 multiplies and 65 cycles can be implemented with a single Macro-Sequencer and only requires 32 clock cycles to complete the calculation.

Output Selector

Figure 13:
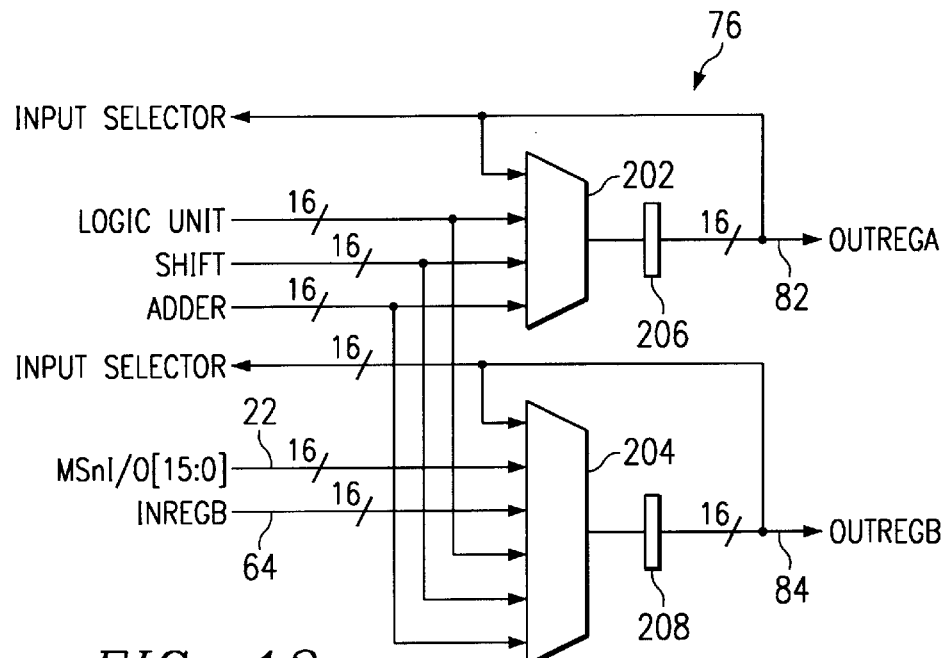
FIG. 13 illustrates a logic diagram of the output selector.

Referring now to FIG. 13, there is illustrated a block diagram of the output selector 76. The output selector 76 is comprised of two multiplexers, a 4-input multiplexer 202 and a 6-input multiplexer 204. Both multiplexers 202 and 204 receive the outputs from the Adder 70, Logic Unit 72 and Shifter 74 on the respective 16-bit buses. The output of multiplexer 202 is input to a register 206, the output thereof providing the 16-bit signal for the OutRegA output on bus 82. This bus 82 is fed back to the remaining input of the multiplexer 202 and also back to the input selector 66. The multiplexer 204 also receives as an input InRegB contents on bus 64 and the MacroSequencer share the data on the bus 34. The output of the multiplexer 204 is input to a register 208, the output thereof comprising the OutRegB contents on the bus 84, which is also input back to an input of the multiplexer 204 and to the input selector 66. The Output Selector 76 controls the state of output registers OutRegA 206 and OutRegB 208 and controls the state of the MSnI/O[15:0] bus pins. The Output Selector 76 multiplexes five 16-bit buses and places the results on the two 16-bit output registers 206 and 208 which drive the two on-chip buses 82 and 84 and the MacroSequencer I/O pins 22. The Output registers may be held for multiple cycles.

I/O Interface

Figure 14:
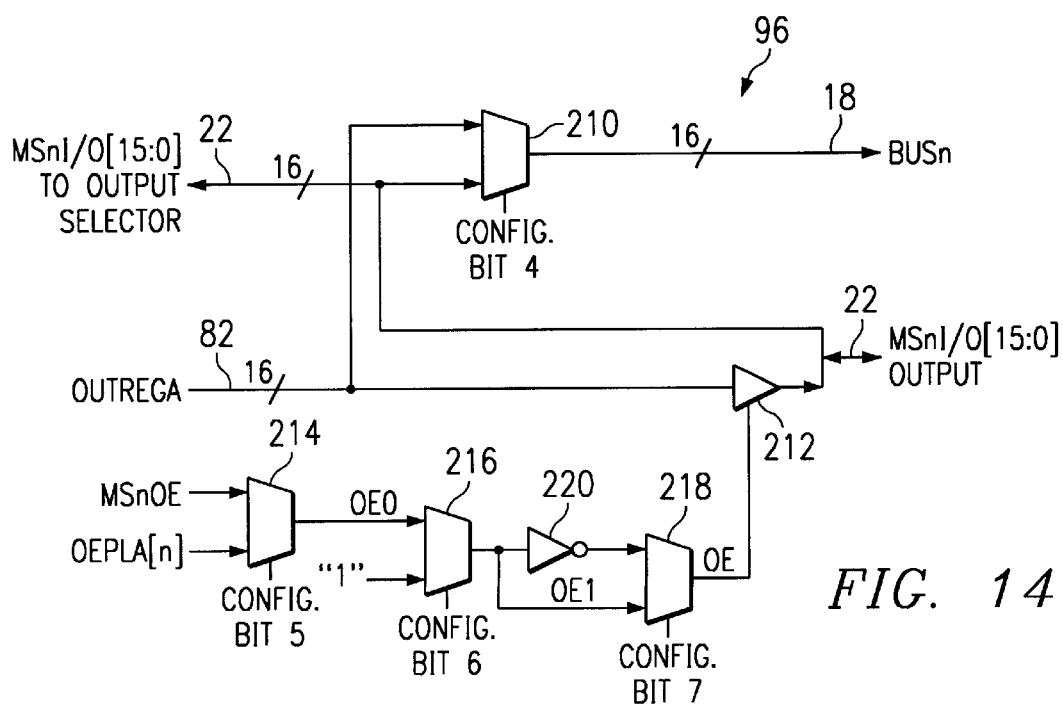
FIG. 14 illustrates a logic diagram of the I/O interface.

Referring now to FIG. 14, there is illustrated a block diagram of the MacroSequencer I/O interface. The contents of the output register 206 on the bus 82 are input to a 2-input multiplexer 210, the other input connected to bus 203 to provide the MacroSequencer I/O data. The output of multiplexer 210 provides the data to the associated one of the four buses 18, each being a 16-bit bus. Additionally, the 16-bit bus 82 is input to a driver 212 which is enabled with an output enable signal OE. The output of driver 212 drives the I/O bus 22 for an output operation and, when it is disabled, this is provided back as an input to the multiplexer 204. The output enable circuitry for the driver 212 is driven by an output enable signal MsnOE and a signal OEPLA which is an internal signal from the PLA 26. These two signals are input to a 2-input multiplexer 214, which is controlled by a configuration bit 5 to input multiplexer 216, the other input connected to a "1" value. This multiplexer is controlled by a configuration bit 6. The output of multiplexer 216 drives one input of the 2-input multiplexer 218 directly and the other input thereof through an inverter 220. The multiplexer 218 is controlled by the configuration bit 7 and provides the OE signal to the driver 212. The configuration bit 4 determines the state of the multiplexer 210. The I/O Interface selection for each MacroSequencer determines: Input source for data busn and the output enable configuration.

Busn Selection

The input data on the buses 18, busn, is selected from the MSnI/O[15:0] pins 22 or the OutRegA 206 output of MacroSequencer(n) by configuration bit 4. When the MacroSequencer(n)'s associated busn is connected to the OutRegA 206 signal, the MacroSequencer still has input access to the MSnI/O pins 22 via the Output Selector.

Output Enable Control

Output Enable to the MSnI/O pins is controlled by configuration bit selections. Inputs to the output enable control circuitry include the MSnOE pin for MacroSequencer(n) and the oepla[n] signal from the PLA 26. The Output Selector diagram for the output enable circuitry represents the equivalent of the output enable selection for configuration bits 5, 6, and 7 in the normal operating mode.

MacroSequencer Datapath Controller

Figure 15:
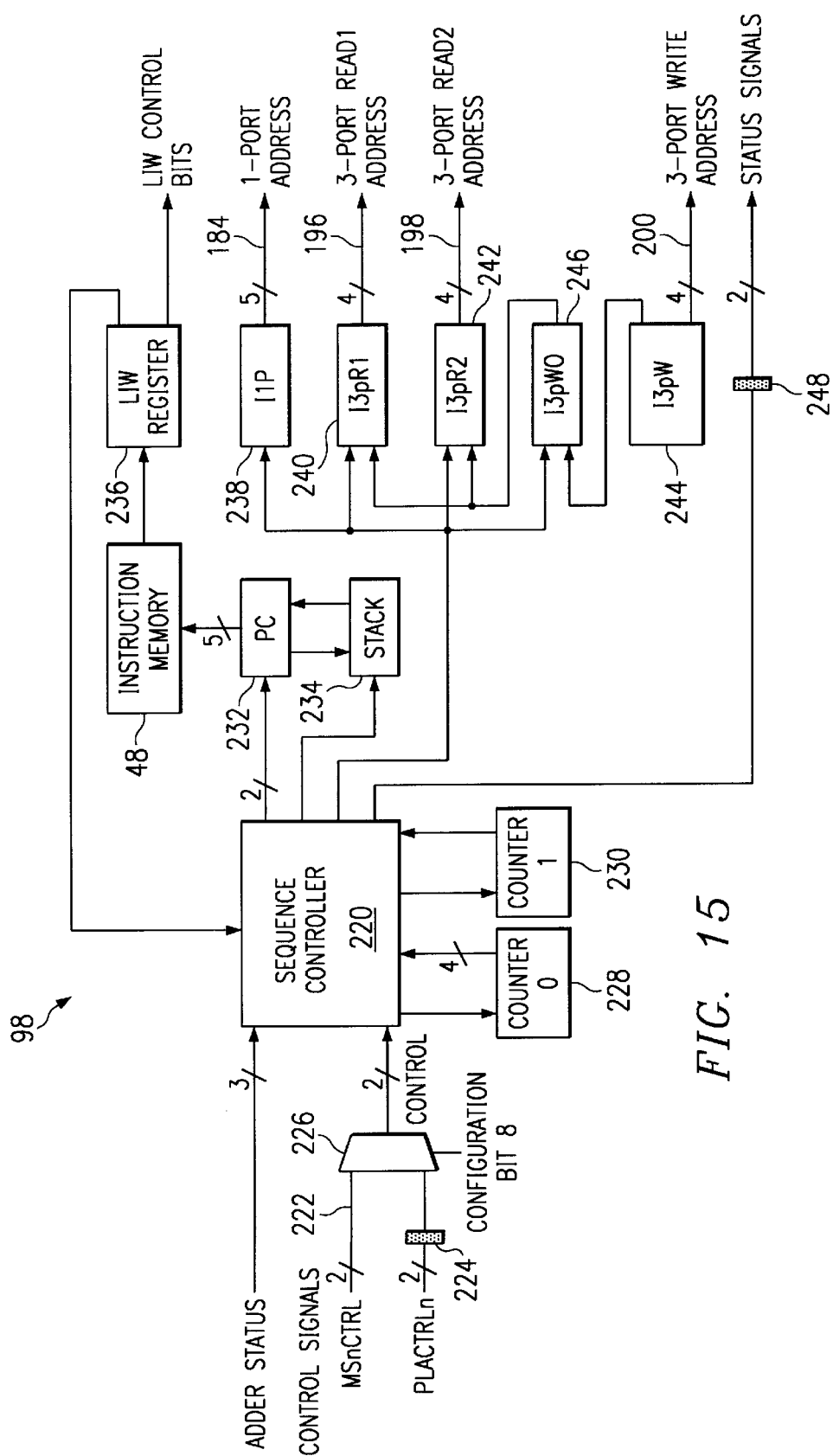
FIG. 15 illustrates a block diagram of the MacroSequencer data path controller.

Referring now to FIG. 15, there is illustrated a block diagram of the MacroSequencer Datapath Controller 42. The MacroSequencer Datapath Controller 42 contains and executes one of two sequences of Long Instruction Words (LIWs) that may be configured into the instruction memory 48. The Datapath Controller 42 generates LIW bits which control the MacroSequencer Arithmetic Datapath. It also generates the values for the One-Port and Three-Port index registers. The Datapath Controller 42 operation for each MacroSequencer is determined by the contents of its LIW register and the two control signals.

The Datapath Controller 42 has associated therewith a sequence controller 220 which is operable to control the overall sequence of the instructions for that particular MacroSequencer. The sequence controller 220 receives adder status bits from the Adder 70 which were stored in the register 170 and also control signals from either an internal MacroSequencer control bus 222 or from the PLA 26 which are stored in a register 224. The contents of the register 224 or the contents of the bus 222 are selected by a multiplexer 226 which is controlled by the configuration bit 8. There are provided two counters, a counter0 228 and a counter1 230 which are associated with the sequence controller 220. The instruction memory 48 is controlled by a program counter 232 which is interfaced with a stack 234. The program counter 232 is controlled by the sequence controller 220 as well as the stack 234. The instruction memory 48, as noted above, is preloaded with the instructions. These instructions are output under the control of sequence controller 220 to an LIW register 236 to provide the LIW control bits which basically configure the entire system. In addition, there are provided read addresses, with an index register 238 storing the address for the One-Port address on bus 84, an index register 240 for storing the read address for the Three-Port read address on bus 196, an index register 242 for storing a read address for the Three-Port read address bus 198, an index register 244 for storing the write address for the Three-Port write address bus 200. These are all controlled by the sequence controller 220. The status bits are also provided for storage in a register 248 to provide status signals.

The LIW register 236, as noted above, contains the currently executing LIW which is received from the instruction memory 48, which is a 32×48 reprogrammable memory. The program counter 232 is controlled by the stack 234 which is a return stack for "calls", and is operable to hold four return addresses.

The controller 48 accepts control signals from the PLA CtrlReg signals or external MSnCTRL pins which initiates one of two possible LIW sequences. It outputs Send and Await status signals to the PLA 26 and to external MSnSEND and MSnAWAIT pins.

The Datapath Controller 42 is a synchronous pipelined structure. A 48-bit instruction is fetched from instruction memory 48 at the address generated by the program counter 232 and registered into the LIW register 236 in one clock cycle. The actions occurring during the next clock cycle are determined by the contents of the LIW register 236 from the previous clock cycle. Meanwhile, the next instruction is being read from memory and the contents of the LIW register 236 are changed for the next clock cycle so that instructions are executed every clock cycle. Due to the synchronous pipe-lined structure, the Datapath Controller 42 will always execute the next instruction before branch operations are executed. The program counter 232 may be initiated by control signals. It increments or branches to the address of the LIW to be executed next.

The Adder status signals, Stack 234 and the two Counters 228 and 230 in the Datapath Controller support the program counter 232. Their support roles are:

the Adder status bits report the value of the Equal, Overflow, and Sign, for use in branch operations;

the Stack 234 contains return addresses; and counter0 228 and Counter1 230 hold down loop-counter values for branch operations.

The five index registers 238–246 hold write, read, and write offset address values for the One-Port and Three-Port memories. The write offset index register 246 is used for alignment of the two read index registers, and it holds the value of an offset distance from the Three-Port Memory 63 write index for the two read indices.

Control Signals

The MSn Direct Control and Status pins illustrated in FIG. 2 are the control and status interface signals which connect directly between the pins and each MacroSequencer. The direct control signals are MSnCTRL[1:0] and MSnOE. The direct status signals are MSnAWAIT and MSnSEND. Alternatively, the MacroSequencers 10–16 may use control signals from the Dual PLA 26. The Dual PLA also receives the MacroSequencer status signals. Two Control signals for each MacroSequencer specify one of four control commands. They are selected from either the MSnCTRL[1:0] pins or from the two PLA Controln signals. The control state of the MacroSequencer on the next clock cycle is determined by the state of the above components and the value of these Controln[1:0] signals.

The four control commands include:

SetSequence0

SetSequence0 sets and holds the Program Counter 232 to '0' and resets the Send and Await state registers to '0' without initializing any other registers in the MacroSequencer. Two clock cycles after the SetSequence0 is received, the Datapath Controller 42 will execute the contents of the LIW register 236 (which is the contents of the LIW memory at address '0') every clock cycle until a Run or Continue control command is received.

SetSequence2

SetSequence2 sets and holds the Program Counter 232 to '2' and resets the Send and Await state registers to '0' without initializing any other registers in the MacroSequencer. Two clock cycles after the SetSequence0 is received, the Datapath Controller 2 will execute the contents of the LIW register 236 (which is the contents of the LIW memory at address '2') every clock cycle until a Run or Continue control command is received.

Run

Run permits normal operation of the Datapath Controller 42. This control command should be asserted every cycle during normal operation except when resetting the Send and/or Await flags, or initiating an LIW sequence with SetSequence0 or SetSequence2.

Continue

Continue resets both the Send and Await status signals and permits normal operation. If the Await State was asserted, the Program Counter 232 will resume normal operation on the next cycle.

If an await operation is encountered while the Continue control command is in effect, the Continue control command will apply, and the await operation will not halt the program counter 232, nor will the Await status register be set to a '1'. Therefore, the Continue control command should be changed to a Run control command after two clock cycles. If a send operation is encountered while the Continue control command is in effect, the Continue control command will apply, and the Send status register will not be set to a '1.

The following table summarizes the four control command options for Controln[1:0] which may be from CtrlPLAn or from MSnCTRL pins:

TABLE 3

| Control n [1:0] | Command | Description |
|---|---|---|
| 0 0 | Run | Normal Operating Condition |
| 0 1 | Continue | Reset Send and Await registers. |
| 1 0 | SetSequence0 | The program counter is set to '0'. Resets the Send and Await registers. This must be asserted for at least two cycles. |
| 1 1 | SetSequence2 | The program counter is set to '2'. Resets the Send and Await registers. This must be asserted for at least two cycles. |

By allowing two sequence starting points, each MacroSequencer can be programmed to perform two algorithms without reloading the sequences. The two PLA Controln signals are synchronized within the MacroSequencer. The two MSnCTRL pin signals are not synchronized within the Macro-Sequencer; therefore, consideration for timing requirements is necessary.

Status Signals

There are two single-bit registered status signals that notify the external pins and the PLA 26 when the MacroSequencer has reached a predetermined point in its sequence of operations. They are the Await and Send status signals. Both of the Status signals and their registers are reset to '0' in any of these conditions: during Power On Reset, active configuration of any part of the RADP, or during Control States: SetSequence0, SetSequence2, or Continue.

When an await operation is asserted from the LIW register, the MacroSequencer executes the next instruction, and repeats execution of that next instruction until a Continue or SetSequence control command is received. The await operation stops the program counter from continuing to change and sets the Await status signal and register to '1'. A Continue control command resets the Await status signal and register to '0' allowing the program counter 232 to resume. When send operation is asserted, the Send status signal and register is set to '1' and execution of the sequence continues. The program counter 232 is not stopped. A Continue control command resets the Send status signal and register to '0'. Status signals are resynchronized by the Dual PLA 26 with the PLACLK.

The Adder status bits, Equal, Overflow, and Sign are provided for conditional jumps.

Long Instruction Word Register

The purpose of the 48-bit LIW Register 236 is to hold the contents of the current LIW to be executed. Its bits are connected to the elements in the datapath. The LIW register 236 is loaded with the contents of the instruction pointed to by the Program Counter 232 one cycle after the Program Counter 232 has been updated. The effect of that instruction is calculated on the next clock cycle. Each of the MacroSequencers 10–16 is composed of elements that are controlled by Long Instruction Word (LIW) bits. LIWs are programmed into Macro-Sequencer Instruction memory 48 during device configuration. The Datapath Controller executes the LIWs which control the arithmetic datapath. Some of these fields are available in every cycle. Some are shared between more than one operational unit. The following operational fields are available on every cycle:

One-Port Memory access
Three-Port Memory access
Input Register multiplexers
Input Mux A, B, C
Output multiplexers
Adder 1
Adder 2

These operational fields are available on every cycle except when a Constant is required by an in operation:

Multiplier
Multiplier-Accumulator

These operational fields conflict with each other. Only one is allowed in each LIW:

Shifter
Logic Unit
Datapath Controller (if parameters are required)
Program Counter The Program Counter 232 is a 5-bit register which changes state based upon a number of conditions. The program counter may be incremented, loaded directly, or set to '0' or '2'. The three kinds of LIW operations which affect the MacroSequencer Program Counter explicitly are:

Branch Operations,
SetSequence0 and SetSequence2 operations, and
Await status operations.
The Program Counter 232 is set to zero '0':
During power-on Reset,
During Active configuration of any part of the RADP,
During the SetSequence0 control command,
When the Program Counter 232 reaches the value '31', and the previous LIW did not contain a branch to another address, or
Upon the execution of a branch operation to address '0'.

Control Signal Effects:

The Controln[1:0] signals are used to reset the program counter to either '0' or '2' at any time with either SetSequence0 or SetSequence2 respectively. A Run control command begins and maintains execution by the program counter according to the LIW. A Continue control state resumes the program counter operation after an Await state and resets the Send and Await registers to '0' on the next rising clock signal. A Continue control command after a Send status state resets the Send register to '0' on the next rising clock signal.

Status Signal Effects:

The Await status register is set to '1' and the Program Counter 232 stops on the next clock cycle after an await operation is encountered. A Continue control state resets the Send and Await registers and permits the Program Counter 232 to resume. The Send status register is set to '1' on the next clock cycle after a send operation. In the Send status, the Program Counter continues to function according to the LIW. A Continue control state is required to reset the Send register.

Branch Operations

The LIW register may contain one Branch Operation at a time. Conditional Branches should not be performed during the SetSequence control commands to insure predictable conditions.

TABLE 4

| Branch Operation | Assembly Instruction | Result in the Program Counter |
|---|---|---|
| Unconditional branch | jump <address> | Program Counter is set to <address>. |
| Branch on loop Counter0 or loop Counter1 not equal to '0' | jumpcounter0 <address> jumpcounter1 <address> | Program Counter is set to <address> if the respective branch loop counter has a non-zero value. The respective loop counter will then be decremented in the next clock cycle. |
| Branch on an Adder status condition: Equal, Overflow, Sign | jumpequal <address> jumpoverflow <address> jumpsign <address> | Program Counter is set <address> if the Adder status bits agree with the branch condition. |
| Call subroutine | call <address> | The current address plus '1' in the Program Counter is pushed onto the Stack. The contents of the Program Counter on the next clock cycle will be set to the address in the LIW. |

TABLE 4-continued

| Branch Operation | Assembly Instruction | Result in the Program Counter |
|---|---|---|
| Return from subroutine operation | return | The address from the top of the Stack is popped into the Program Counter. |

Instruction Memory

The Instruction memory 48 consists of thirty-two words of 48-bit RAM configured according to the MacroSequencer assembly language program. The Instruction memory 48 is not initialized during Power On Reset. For reliability, the LIW RAM must be configured before MacroSequencer execution begins. Bit fields in the LIW Registers control datapath operations and program flow.

Counter0 and Counter1

The counters 228 and 230 are 5-bit loop counters. Both loop counters are filled with '0's during Power On Reset and active configuration of any component in the RADP. Counter0 and Counter1 may be loaded by the setcounter0 and setcounter1 operations respectively. The jumpcounter0 and jumpcounter1 operations will decrement the respective counter on the next clock cycle until the Counter value reaches '0'. The SetSequence0 and SetSequence2 control signals do not alter or reset the loop counters. Therefore, the counters should be initialized with setcounter0 and setcounter1 operations before they are referenced in the program.

Stack

The Stack 234 holds return addresses. It contains four 5-bit registers and a 2-bit stack pointer. After Power On Reset or the active configuration of any component in the RADP, the stack pointer and all of the 5-bit registers are initialized to '0's. A call performs an unconditional jump after executing the next instruction, and pushes the return address of the second instruction following the call into the Stack 234. A return operation pops the return address from the Stack 234 and into the Program Counter 232. The call and return operations will repeat and corrupt the Stack 234 if these operations are in the next LIW after an await operation because the program counter 232 is held on that address, and the MacroSequencer repeats execution of the LIW in that address.

Index Registers

The LIW Register 236 controls the five index registers which are used for data memory address generation. The index register 238 holds the One-Port Memory address. The other four index registers 240–246 hold Three-Port Memory address information. During Power On Reset or the active configuration of any component in the RADP, all index register bits are reset to '0's. The control states, Run, Continue, SetSequence0 or SetSequence2 do not effect or reset the index registers. Each clock cycle that a relevant memory access is performed, the memory address can be loaded, incremented, decremented or held depending upon the control bit settings in each index register.

MacroSequencer Configuration Bits

In each MacroSequencer there are nine programmable configuration bits. They are listed in the table below. The three signed/unsigned related bits are set with directives when programming the MacroSequencer. The others are set by the software design tools when the configuration options are selected.

TABLE 5

MacroSequencer Configuration Bits

| Bit | Functional Block | Function | If Bit = 0 | If Bit = 1 |
|---|---|---|---|---|
| 0 | Multiplier | Must operand A sign | A is unsigned. | A is signed. |
| 1 | Multiplier | Must operand B sign | B is unsigned. | B is signed. |
| 2 | Adder | Signed/Unsigned Bit | Unsigned Add | Signed Add |
| 3 | Adder | 32/16 Bit | 16 bit Datapath mode | 32 bit Datapath mode |
| 4 | Data Bus Connections | Select OutRegA or MS$n$I/O pins for Macro-Sequencer bus$n$ inputs | Bus$n$ inputs are from OutRegA of MacroSequencer($n$) | Bus$n$ inputs are from MS$n$I/O pins |
| 5 | I/O Interface | Output Enable Select | OE from MS$n$OE pin | OE from PLA |
| 6 | I/O Interface | Select OE signal or '1' | OE = OE | OE = '1' |
| 7 | I/O Interface | OE Polarity Select | OE = OE | OE = OE |
| 8 | Datapath Controller | Control[1:0] source select | Control[1:0] from MS$n$CTRL[1:0] pins | Control[1:0] from PLA0 CtrlPLA$n$[1:0] |

'1' - logical one, '0' - logical zero

The configuration bits are configured with the instruction memory 48, where bits 0 through 8 of the 16-bit program data word are the nine configuration bits listed above.

Dual PLA Description

Figure 16:
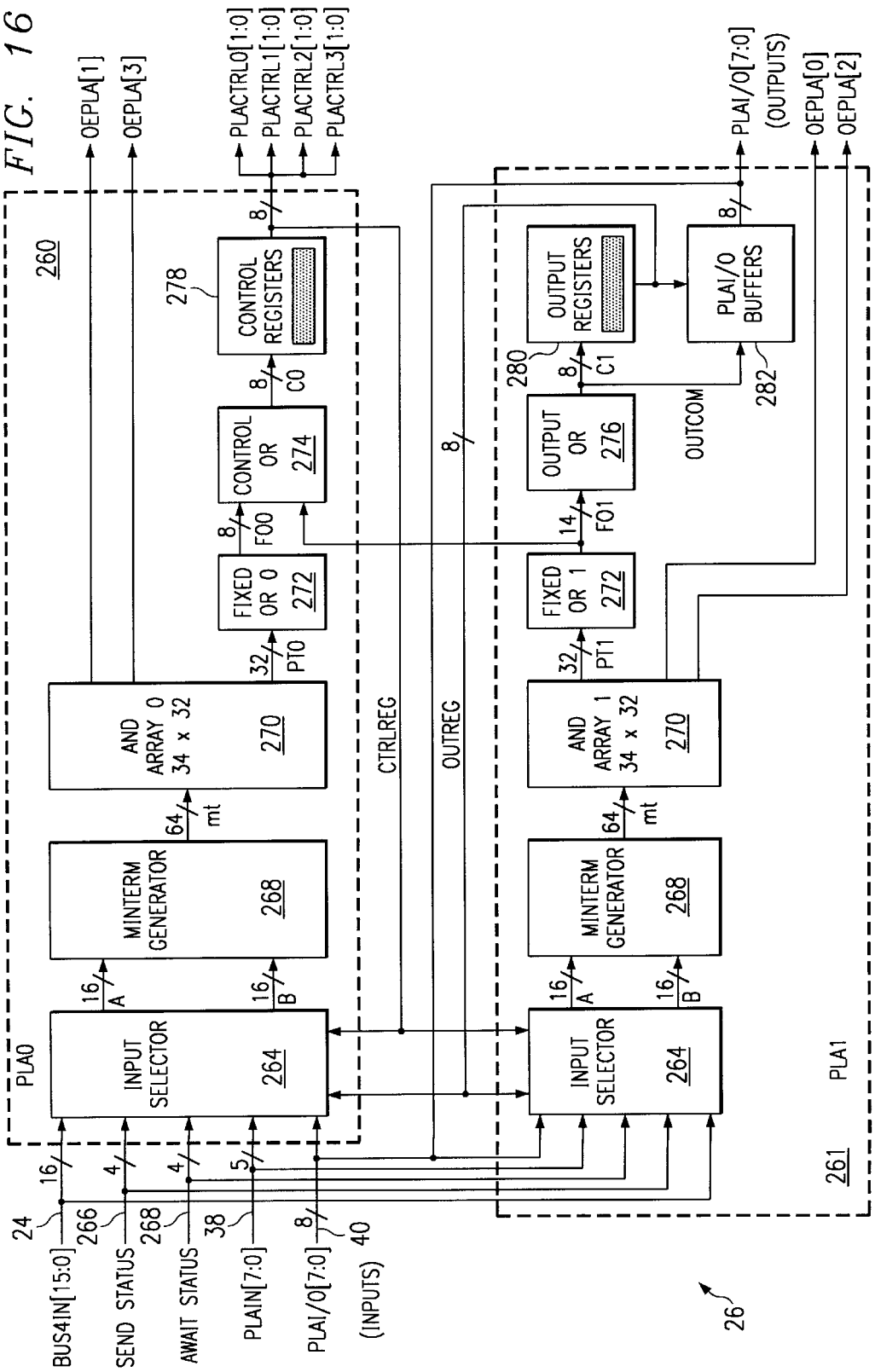
FIG. 16 illustrates a block diagram of the dual PLA.

Referring now to FIG. 16, there is illustrated a block diagram of the dual PLA 26. There are provided two PLAs, a PLA0 260 and a PLA1 261. Each of the PLAs is comprised of an input selector 264 for receiving seven inputs. Each receives the 16-bit BUS4IN bus 24 which is a 16-bit bus, the send status bits on a bus 266, the await status bits on a bus 268, the PLA input signal on the bus 38, the PLA I/O signal on the bus 40, the output of each of the PLAs 260 and 261. Each of the input selectors provides an A and a B output on 16-bit buses to a minimum term generator 268 which provides a 64-bit output. This is input to a 34×32 AND array 270 for each of the PLAs 260 and 261, the output thereof being a 32-bit output that is input to a fixed OR gate 272. The AND array 270 also provides output enable signals, two for the PLA 260 and two for the PLA 261. For PLA 260, the fixed OR output 272 is an 8-bit output that is input to a control OR gate 274, whereas the output of the fixed OR gate 272 and PLA 261 is a 14-bit output that is input to an output OR gate 276 and also is input to the control OR gate 274 and PLA 260. The output of the control OR gate 274 and PLA 260 is input to an 8-bit control register 278, the output thereof providing the PLA control signals, there being four 2-bit control signals output therefrom. This control register 278 also provides the output back to the input selectors 264 for both PLAs 260 and 261. The output of the output OR gate 276 and the PLA 261 is input to an output register 280, the output thereof providing an 8-bit output that is input back to the input selectors 264 for both PLAs 260 and 261 and also to an I/O buffer 282. The output of the I/O buffer is connected to the I/O bus 40 that is input to the input selector 264 and comprising 8- bit output. The I/O buffer 282 also receives the output of the output OR 276. The general operation of the PLA is described in U.S. Pat. No. 5,357,152, issued Oct. 18, 1994 to E. W. Jennings and G. H. Landers, which is incorporated herein by reference.

The Dual PLA 26 provides the two in-circuit programmable, 32 input by 34 product term PLAs 260 and 261. PLA0 260 may serve as a state machine to coordinate the Macro-Sequencer array operation with external devices. PLA1 261 may be used for random interface logic. The Dual PLA 26 may perform peripheral logic or control functions based upon the state of BUS4IN, PLAIN and PLAI/O bus states and the Control bus20. The Dual PLA control functions which may be used by any or all of the MacroSequencers include:

Registered control outputs, CtrlReg[7:0], for:

Initiation of LIW sequences; and

Control response to Send and Await status signals.

Combinatorial outputs, oepla[3:0], used to generate Output Enable signals for the MacroSequencers. The oepla [3:0] signals are generated from individual product terms.

The PLA0 260 produces eight CtrlReg outputs that can be used as MacroSequencer control signals where two signals are available for each of the MacroSequencers 10–14 to use as Control signals. They are also available as feedbacks to both PLA0 260 and PLA1 261. The CtrlReg[7:0] signals are useful in multi-chip array processor applications where system control signals are transmitted to each RADP. PLA1 261 produces combinatorial or registered I/O outputs for the PLAI/O[7:0] pins 40. The fourteen Fixed OR outputs(FO1) from OR gate 272 from PLA1 261 are also available to the Control OR array 274 in the PLA0 260. The PLAI/O signals are useful for single chip applications requiring a few interface/handshake signals, and they are useful in multichip array processor applications where system control signals are transmitted to each device.

RADP Configuration

The RADP is configured by loading the configuration file into the device.

RADP Configurable Memories There are three memories in each of the four MacroSequencers and a Dual PLA configuration memory. Within each of the MacroSequencers, there is an:

LIW memory with the nine configuration bits,

One-Port data memory, and

Three-Port data memory.

The nine programmable configuration bits within each MacroSequencer are configured as additional configuration data words in the LIW configuration data packet. The LIW memory, configuration bits, and Dual PLA memory may only be loaded during Active Configuration Mode. The One-Port and Three-Port data memories for each MacroSequencer may be loaded during Active Configuration and accessed during normal operating mode as directed by each MacroSequencer's LIW Register.

RADP Operating Modes

The configuration is to be loaded into the RADP during Active Configuration Mode. The RADP may be in one of three operating modes depending on the logic states of PGM0 and PGM1:

In the Normal Operation mode, the RADP MacroSequencers concurrently execute the LIWs programmed into each LIW memory.

The RADP is configured during the Active Configuration mode which allows each MacroSequencer's instruction memory and Data Memories and the Dual PLA to be programmed.

Passive Configuration mode disables the device I/O pins from operating normally or being configured which allows other RADPs in the same circuit to be configured.

Four configuration pins, named PGM0, PGM1, PRDY, and PACK, are used to control the operating mode and configuration process. BUS4IN[15:0] pins are used to input the configuration data words.

MULTIPLIER-ACCUMULATOR

The Multiplier-Accumulator (MAC) 68 is described hereinabove with reference to the FIG. 3 and FIG. 6. In general, this is a synchronous multiplier-accumulator circuit and is composed of two pipe stages.

The first pipe stage is composed of a network of a multiplicity small bit multipliers, a multiplicity of local carry propagate adders forming a multiplicity of trees and a pipeline register circuit for holding the results of the roots of each adder tree. The leaves of these adder trees are from the multiple digit output of the small bit multiplier circuits. The second pipe stage is composed of a multiplicity of local carry propagate adders of which all but one of which comprise a tree taking the synchronized results of the multiplicity of adder trees of the first pipe stage and forming a single sum of all adder tree results from the first pipe stage. An interface circuit operates on this resulting sum and on a possibly selected component of the accumulator register(s) contents of this pipe stage. The interface circuit either: may zero the feedback from the accumulator register(s) 14 in accumulator 148 and pass the resultant sum from the above mentioned adder tree in this pipe stage through or it may align the resultant sum and the (possibly) selected accumulator result for processing by the last local carry propagate adder. The output of this adder is again submitted to a second interface circuit which can modify the adders output by alignment, or by zeroing the result. The output of this interface circuit is then stored in one of the (possibly) multiplicity of accumulator registers which comprise the pipeline register bank of this pipe stage. Extensions of this multiplier-accumulator embodying input pipe registers potentially containing portions of the small bit multiplier circuitry, variations to the tree structure of the local carry propagate adder trees in both pipe stages are claimed. Implementations of this basic circuit and extensions embodying standard integer, fixed point and floating point arithmetic, as well as scalar and matrix modular decomposition, p-adic fixed and p-adic floating point and extended scientific precision standard and p-adic floating point arithmetic are included. Extensions embedding implementations of the multiplier-accumulator including one or more carry propagate adders, multiple data memories circuitry minimally comprising one-port RAM and three-port (2 read port and 1 write port) RAM with synchronization registers, shift and alignment circuitry plus content addressable memory(ies) as well as bit level pack and unpack circuitry are also included. Extensions embedding multiple instances of implementations of any of the above claimed circuitry within a single integrated circuit are also included.

For the purpose of describing the MAC 68, some definitions may be useful.

They will be set forth as follows:

Wire

A wire is a means of connecting a plurality of communicating devices to each other through interface circuits which will be identified as transmitting, receiving or bi-directional interfaces. A bi-directional interface will consist of a transmitter and receiver interface. Each transmitter may be implemented so that it may be disabled from transmitting. This allows more than one transmitter may be interfaced to a wire. Each receiver may be implemented so that it may be disabled from receiving the state of the wire it is interfaced to. A wire will be assumed to distribute a signal from one or more transmitters to the receivers interfaced to that wire in some minimal unit of time. This signal can be called the state of the wire. A signal is a member of a finite set of symbols which form an alphabet. Often this alphabet consists of a 2 element set, although use of multi-level alphabets with more than 2 symbols have practical applications. The most common wire is a thin strip of metal whose states are two disjoint ranges of voltages, often denoted as '0' and '1'. This alphabet has proven extremely useful throughout the development of digital systems from telegraphy to modern digital computers. Other metal strip systems involving more voltages ranges, currents and frequency modulation have also been employed. The key similarity is the finite, well defined alphabet of wire states. An example of this is multiple valued current-mode encoded wires in VLSI circuits such as described in "High-Speed Area-Efficient Multiplier Design Using Multiple-Valued Current-Mode Circuits" by Kawhito, et. al. Wires have also been built from optical transmission lines and fluidic transmission systems. The exact embodiment of the wires of a specific implementation can be composed of any of these mechanisms, but is not limited to the above. Note that in some high speed applications, the state of a wire in its minimal unit of time may be a function of location within the wire. This phenomena is commonly observed in fluidic, microwave and optical networks due to propagation delay effects. This may be a purposeful component of certain designs and is encompassed by this approach.

Signal Bundle and Signal Bus

A signal bundle and a signal bus are both composed of a plurality of wires. Each wire of a signal bundle is connected to a plurality of communicating devices through interface circuitry which is either a transmitter or a receiver. The direction of communication within a signal bundle is constant with time, the communication devices which are transmitting are always transmitting. Those which are receiving are always receiving. Similarly, each wire of a signal bus is also connected to a plurality of communicating devices. The communicating devices interfaced to a signal bus are uniformly attached to each wire so that whichever device is transmitting transmits on all wires and whichever device(s) are receiving are receiving on all wires. Further, each communicating device may have both transmitters and receivers, which may be active at different time intervals. This allows the flow of information to change in direction through an succession of intervals of time, i.e., the source and destinations(s) for signals may change over a succession of time intervals.

Pipeline Register and Stage

The circuitry being claimed herein is based upon a sequential control structure known as a pipeline stage. A pipeline stage will be defined to consist of a pipeline register and possibly a combinatorial logic stage. The normal operational state of the pipeline stage will be the contents of the memory components within the pipeline register. Additional state information may also be available to meet testability requirements or additional systems requirements outside the intent of this patent. Typical implementations of pipeline stage circuits are found in synchronous Digital Logic Systems. Such systems use a small number of control signals known as clocks to synchronize the state transition events within various pipeline stages. One, two and four phase clocking schemes have been widely used in such approaches. See the references listed in the section entitled Typical Clocking Schemes for a discussion of these approaches applied to VLSI Design. These typical approaches face severe limitations when clocks must traverse large distances and/or large varying capacitive loads across different paths within the network to be controlled. These limitations are common in sub-micro CMOS VLSI fabrication technologies. The use of more resilient timing schemes has been discussed in the Alternative Clocking Scheme references. It will be assumed that a pipeline stage will contain a pipeline register component governed by control signals of either a traditional synchronous or a scheme such as those mentioned in the Alternative Clocking Scheme References.

K-ary Trees, K-ary and Uniform Trees with Feedback

For the purposes of this document, a directed graph G(V,E) is a pair of objects consisting of a finite, non-empty set of vertices V={v[1], . . . , v[n]} and a finite set of edges E=(e[1], . . . , e[k]) where each edge e is an ordered pair of vertices belonging to V. Denote the first component of e[j] by e[j][1] and the second component by e[j][2]. Vertices will also be known as nodes in what follows. A directed graph is connected if each vertex is a component in at least one edge. A directed graph G(V,E) possesses a path if there exists a finite sequence of edges (ek[1],ek[2], . . . ,ek[h]) where h>=2 is a subset of E such that the first component of ek[j+1] is also the second component of ek[j] for j=1, . . . , h−1. A directed graph G(V,E) possesses a cycle if there exists a path (ek[1],ek[2], . . . ,ek[]) where h>=2 such that the second component of ek[h] is also the first component of ek[1]. A connected directed graph which possesses no cycles is a tree. Note that typically, this would be called a directed tree, but since directed graphs are the only kind of graphs considered here, the name has been simplified to tree. A k-ary tree is a tree where k is a positive integer and each vertex(node) of the tree is either the first component in k edges or is the first component in exactly one edge. A k-ary tree with feedback is a directed graph G(V,E) such that there exists an edge ew such that the directed graph G1(V,E1) is a k-ary tree, where E1 contains all elements of E except ew. Note that G(V,E) contains one cycle. A uniform tree is a tree such that the vertices form sets called layers L[1], . . . , L[m] such that the height of the tree is m and the root of the tree belongs to L[1], all vertices feeding the this root vertex belong to L[2], . . . , all vertices feed vertices of L[k] belonging to L[k+1], etc. It is required the vertices in each layer all have the same number of edges which target each vertex in that layer. The notation (k1, k2, . . . , kn) where k1 ..., kn are positive integers will denote the k1 edges feeding the vertex in L[1], k2 edges feeding each vertex in L[2], kn edges feeding each vertex in L[n]. A uniform tree with feedback differs from a uniform tree in that one edge forms a circuit within the graph.

p-adic Number Systems

A p-adic number system is based upon a given prime number p. A p-adic representation of an unsigned integer k is a polynomial $-k=a_n p^n + a_{n-1} p^{n-1} + \ldots + a_1 p + a_0$, where $a_n$, $a_{n-1}, \ldots, a_1, a_0$ are integers between 0 and p−1. A fixed length word implementation of signed p-adic numbers is also represented as a polynomial with the one difference being that the most significant p-digit, $a_n$ now ranges between (p−1)/2 and (p−1)/2.

Two's Complement Number System

Two's complement Numbers is a signed 2-adic number system implemented in a fixed word length or multiples of a fixed word length. This is the most commonly used integer number system in contemporary digital computers.

Redundant Number Systems and Local Carry Propagation Adders

A redundant number system is a number system which has multiple distinct representations for the same number. A common redundant number system employs an entity consisting of two components. Each component possesses the same bit length. The number represented by such an entity is a function (often the difference) between the two components. A local carry propagation adder will be defined as any embodiment of an addition and/or subtraction function which performs its operation within a constant time for any operand length implementation. This is typically done by propagating the carry signals for any digit position only to a small fixed number of digits of higher precision. This phenomena is called local carry propagation. A primary application of redundant number systems is to provide a notation for a local carry propagation form of addition and subtraction. Such number systems are widely used in the design of computer circuitry to perform multiplication. In the discussion that follows, Redundant Binary Adder Cells are typically used to build implementations such as those which follow. The local carry propagate adder circuits discussed herein may also be built with Carry-Save Adder schemes. There are other local or limited carry propagation adder circuits which might be used to implement the following circuitry. However, for the sake of brevity and clarity, only redundant adder schemes will be used in the descriptions that follow. Many of the references hereinbelow with respect to the High Speed Arithmetic Circuitry discuss or use redundant number systems.

Modular Decomposition Number Systems

Modular Decomposition Number Systems are based upon the Chinese Remainder Theorem. This theorem was first discovered and documented for integers twenty centuries ago in China. The Chinese Remainder Theorem states that: Let $m[1], m[2], \ldots, m[n]$ be positive integers such that $m[i]$ and $m[j]$ are relatively prime for I not equal j. If $b[1], b[2], \ldots, b[n]$ be any integers, then the system of congruences $x=b[i] \pmod{m[i]}$ for $I=1, \ldots, n$, has integral solution that is uniquely determined modulo $m=m[1] * m[2] * \ldots * m[n]$. The Chinese Remainder Theorem has been extended in the last hundred and fifty years to a more general result which is true in any nontrivial algebraic ring. Note that square matrices form algebraic rings and that both modular decomposition matrix and p-adic number systems can be built which have performance and/or accuracy advantages over typical fixed or floating point methods for a number of crucial operations, including matrix inversion. Modular Decomposition Number Systems have found extensive application in cryptographic systems. An important class of cryptographic systems are based upon performing multiplications upon very large numbers. These numbers often involve 1000 bits. Arithmetic operations have been decomposed into modular multiplications of far smaller numbers. These decompositions allow for efficient hardware implementations in integrated circuits. The modular multiplications of these smaller numbers could well be implemented with the multiplier architectures described hereinbelow. Such multiplier implementation would have the same class of advantages as in traditional numerical implementations.

Standard Floating Point Notations

Standard Floating Point Notation is specified in a document published by ANSI. Floating point arithmetic operations usually require one of four rounding mode to be invoked to complete the generation of the result. The rounding modes are used whenever the exact result of the operation requires more precision in the mantissa than the format permits. The purpose of rounding modes is to provide an algorithmic way to limit the result to a value which can be supported by the format in use. The default mode used by compiled programs written in C, PASCAL, BASIC, FORTRAN and most other computer languages is round to nearest. Calculation of many range limited algorithms, in particular the standard transcendental functions available in FORTRAN, C, PASCAL and BASIC require all of the other three modes: Round to positive infinity, Round to negative infinity and round to zero. Round to nearest looks at the bits of the result starting from the least significant bit supported and continuing to the least significant bit in the result. The other three rounding modes are round to 0, round to negative infinity and round to positive infinity, which are well documented in IEEE-ANSI specification for standard floating point arithmetic.

Extended Precision Floating Point Notations

Extended Precision Floating Point Notations are a proposed notational and semantic extension of Standard Floating Point to solve some of its inherent limitations. Extended Precision Floating Point requires the use of accumulator mantissa fields twice as long as the mantissa format itself. This provides for much more accurate multiply-accumulate operation sequences. It also minimally requires two accumulators be available, one for the lower bound and one for the upper bound for each operation. The use of interval arithmetic with double length accumulation leads to significantly more reliable and verifiable scientific arithmetic processing. Long Precision Floating Point Notations involve the use of longer formats. For example, this could take the form of a mantissa which is 240 bits (including sign) and an exponent of 16 bits. Extended Long Precision Floating Point Notations would again possess accumulators supporting mantissas of twice the length of the operands. These extensions to standard floating point have great utility in calculations where great precision is required, such as interplanetary orbital calculations, solving non-linear differential equations, performing multiplicative inverse calculations upon nearly singular matrices.

p-adic Floating Point Systems

P-adic arithmetic can be used as the mantissa component of a floating point number. Current floating point implementations use p=2. When p>2, rounding to nearest neighbor has the effect of converging to the correct answer, rather than often diverging from it in the course of executing a sequence of operations. The major limitation of this scheme is that a smaller subset of the real numbers than can be represented compared with the base 2 arithmetic notation. Note that the larger p is and the closer it is to a power of two, the more numbers can be represented in such a notation for a fixed word length. One approach to p-adic floating point arithmetic would be based upon specific values of p with standard word lengths. The next two tables assume the following format requirements:

The mantissa field size must be a multiple of the number of bits it takes to store p.

The mantissa field size must be at least as big as the standard floating point notation.

The exponent field will be treated as a signed 2's complement integer.

The mantissa sign bit is an explicit bit in the format.

The following Table 6 summarizes results based upon these assumptions for Word Length 32:

TABLE 6

| p | Exponent Field Size | Mantissa Field Size | Numerical Expression | Mantissa Digits base p Dynamic Range (in base 10) |
|---|---|---|---|---|
| 3 | 7 | 24 | Mantissa*$3^{Exponent}$ | 12 digits $3^{63}$ to $3^{-64}$ ($10^{30}$ to $10^{-31}$) |
| 7 | 7 | 24 | Mantissa*$7^{Exponent}$ | 8 digits $7^{63}$ to $7^{-64}$ ($10^{53}$ to $10^{-54}$) |
| 15 | 7 | 24 | Mantissa*$15^{Exponent}$ | 6 digits $15^{63}$ to $15^{-64}$ ($10^{74}$ to $10^{-75}$) |
| 31 | 6 | 25 | Mantissa*$31^{Exponent}$ | 5 digits $31^{31}$ to $31^{-32}$($10^{46}$ to $10^{47}$) |

Note the from this table:
The standard single precision floating point mantissa is 23 bits, with an implied 24 bit.
Its exponent field is 8 bits.
The standard single precision floating point dynamic range is $2^{127}$ to $2^{-128}$ ($10^{38}$ to $10^{-39}$).
The p = 7, 15 and 31 formats all have greater dynamic range and at least as much mantissa precision as the standard single precision format.

The following table summarizes results based upon these assumptions for Word Length 64:

TABLE 7

| p | Exponent Field Size | Mantissa Field Size | Numerical Expression | Mantissa Digits base p Dynamic Range (in base 10) |
|---|---|---|---|---|
| 3 | 9 | 54 | Mantissa*$3^{Exponent}$ | 27 digits $3^{255}$ to $3^{-256}$ ($10^{121}$ to $10^{-122}$) |
| 7 | 9 | 54 | Mantissa*$7^{Exponent}$ | 18 digits $7^{255}$ to $7^{-256}$ ($10^{215}$ to $10^{-216}$) |
| 15 | 7 | 56 | Mantissa*$15^{Exponent}$ | 14 digits $15^{63}$ to $15^{-64}$ ($10^{74}$ to $10^{-75}$) |
| 31 | 8 | 55 | Mantissa*$31^{Exponent}$ | 11 digits $31^{127}$ to $31^{-128}$ ($10^{189}$ to $10^{-191}$) |

Note from this table:
The standard double precision floating point mantissa is 53 bits, with an implied 54-th bit. Its exponent field is 10 bits.
The standard double precision floating point dynamic range is $2^{511}$ to $2^{-512}$ ($10^{153}$ to $10^{-154}$).
The p = 7 and 31 formats have greater dynamic range and at least as much mantissa precision as the standard double precision format.

One may conclude from the above two tables that p-adic floating point formats based upon p=7 and p=31 offer advantages in dynamic range with at least as good mantissa accuracy for both single and double precision(32 and 64 bit) formats. It seems reasonable that p=7 has distinct advantages over p=31 in terms of inherent implementation complexity. The mantissa component of a floating point number system can also be composed of two components, known here as MSC and LSC, for Most Significant Component and Least Significant Component, respectively. The MSC can be constructed as a binary or 2-adic system and the LSC can be constructed from a p-adic system where p>2. Such an arrangement would also converge to the correct answer in round to nearest neighbor mode and would have the advantage of making fill use of the bits comprising the MSC. If the LSC occupies the "guard bits" of the floating point arithmetic circuitry, then the visible effect upon the subset of floating point numbers which can be represented is the consistent convergence of resulting operations. This would aid standard Floating Point notation implementation. If p is near a power of two, then p-adic number based mantissa calculations would be efficiently stored in memory. Particularly for p=3 and 7, the modular arithmetic multiplier architecture could amount to specializing the redundant binary adder chain in each adder strip and slightly changing the Booth encoding algorithms discussed in the following implementation discussions. If the MSC represented all but 2, 3 or 5 bits of the mantissa, then p=3, 7 or 31 versions of p-adic arithmetic could respectively be used with minimal impact on how many numbers could be represented by such notations. Note that for this kind of application, p need not be restricted to being prime. As long as p was odd, the desired rounding convergence would result. It will be general assumed throughout this document that p=3,7,15 and 31 are the most optimal choices for p-adic floating point extensions, which are "mostly" prime. Both the number systems discussed in the previous paragraphs will be designated as p-adic floating point systems with the second version involving the MSC and LSC components being designated the mixed p-adic floating point system when relevant in what follows. Both of these notations can be applied to Extended Precision Floating Point Arithmetic.

Overview Discussion of the MAC

The basic operation of a multiplier 142 is to generate from two numbers A and B, a resulting number C which represents something like standard integer multiplication. The accumulation of such results, combined with the multiplication are the overall function of a multiplier/accumulator. It is noted that the accumulation may be either additive, subtractive or capable of both.

This description starts with a basic block diagram of a multiplier-accumulator and one basic extension of that multiplier/accumulator which provides significant cost and performance advantages over other approaches achieving similar results. These circuit blocks will be shown advantageous in both standard fixed and floating point applications, as well as long precision floating point, extended precision floating point, standard p-adic fixed and floating point and modular decomposition multiplier applications.

Optimal performance of any of these multiplier-accumulator circuits in a broad class of applications requires that the multiplier-accumulator circuit receive a continuous stream of data operands. The next layer of the claimed devices entail a multiplier-accumulator circuit plus at least one adder and a local data storage system composed of two or more memories combined in a network. The minimum circuitry for these memories consists of two memories, the one-port memory 44 and the 3-port memory 43. The circuitry described to this point provides for numerous practical, efficient fixed point algorithmic engines for processing linear transformations, FFT's, DCT's, and digital filters.

Extension to support various floating point schemes requires the ability align one mantissa resulting from an arithmetic operation with a second mantissa. This alignment operation is best performed by a specialized circuit capable of efficient shifting, Shifter 74. Support of the various floating point formats also requires efficient logical merging of exponent, sign and mantissa components. The shift circuitry mentioned in this paragraph (assuming it also supports rotate operations) combined with the logical merge circuitry provides the necessary circuitry for bit-packing capabilities necessary for image compression applications, such as Huffman coding schemes used in JPEG and MPEG. Once aligned, these two mantissas must be able to be added or subtracted from each other. The long and extended precision formats basically require at least one adder to be capable of performing multiple word length "chained" addition-type operations, so that the carry out results must be available efficiently to support this.

Support for p-adic arithmetic systems requires that the multiplier-accumulator implementation support p-adic arithmetic. Similar requirements must be made of at least one adder in an implementation. The p-adic mantissa alignment circuitry also makes similar requirements upon the shifter. Modular arithmetic applications are typically very long integer systems. The primary requirement becomes being able to perform high speed modular arithmetic where the modular decomposition may change during the execution of an algorithm. The focus of such requirements is upon the multiplier-accumulator and adder circuitry.

Basic Multiplier Overview of Basic Multiplier 142 and Its components

Referring now to FIG. 17, there is illustrated a block diagram of basic multiplier. A very fast way to sum $2^P$ numbers (where P is assumed to be a positive integer) is called a Binary Adder Tree. Adders D1–D7 form a Binary Adder Tree summing $8=2^3$ numbers, C1 to C8 in a small bit multiplier 300. The numbers C1 to C8 are the partial products of operand A and portions of operand B input to multiplier 300, which are then sent to the adder tree D1–D7. These partial products are generated within the multiplier 300 by a network of small bit multipliers. The Adder D8 and the logic in block GI align the resulting product from Adder D7 and the selected contents of the block Hi representing the second stage of pipeline registers an alignment. The accumulated results are held in memory circuitry in block H1. This provides for the storage of accumulated products, completing the basic functions required of a multiplier-accumulator.

The circuitry in the stage-one pipeline registers E1 acts as pipeline registers making the basic circuit into a two pipe-stage machine. The time it takes for signals to propagate from entry into multipliers 30 to the pipeline registers of E1 is about the same as the propagation time from entry into Adder D7 to the pipeline registers in H1. Thus the pipeline cycle time is about half of what it would be without the registers of E1.

Transform circuitry J1 is provided on the output of H1 that performs several functions. It selects which collection of memory contents are to be sent outside the multiplier/accumulator, it transforms the signal bundle to be sent to a potentially different format, it selects which collection of memory contents are to be sent to Adder D8 for accumulation and it transforms that signal bundle to be sent to Adder D8, if necessary, to a potentially different format. The circuitry in J1 permits the reduction of propagation delay in the second pipeline stage of this multiplier-accumulator, since the final logic circuitry required to generate the results can occur in J1 after the pipeline registers of H1 and the use of non-standard arithmetic notations such as redundant binary notations in the adder cells of D1 to D9, since the notation used internally to the multiplier-accumulator can be converted to be used with a standard 2's complement adder for final conversion.

An example of the above can be seen in implementing a redundant binary notation as follows:

TABLE 8

| Represented number | A Standard Notation as used in Takagi's Research St[1:0] | A Non-standard Signed Magnitude Notation Sn[1:0] |
|---|---|---|
| 0 | 00 | 10 |
| 1 | 01 | 11 |
| −1 | 10 | 01 |

This notation turns out to be optimal for certain CMOS logic implementations of an 8 by 16-bit multiplier based upon FIG. 17. Conversion by a standard two's complement adder required conversion from the Non-standard Signed Magnitude notation to a Standard Notation. This was done by implementing the logic transformation:

St[1]=not Sn[1]

St[0]=Sn[0]

Optimal implementations of redundant p-adic notations to carry propagate p-adic notation conversion may also require this.

With the above noted structure, the following operations can be realized:
  Signed and Unsigned 8 by 16 bit multiplication and multiply-accumulate
  Signed and Unsigned 16 by 16 bit multiplication and multiply-accumulate
  Signed and Unsigned 24 by 16 multiplication and multiply-accumulate
  Signed and Unsigned 24 by 24 bit multiplication and multiply-accumulate
  Signed and Unsigned 24 by 32 bit multiplication and multiply-accumulate
  Signed and Unsigned 32 by 32 bit multiplication and multiply-accumulate
  Optimal polynomial calculation step
  Fixed point versions of the above:
  Standard Floating Point Single Precision Mantissa Multiplication
  Extended Precision Floating Point Single Precision Mantissa
  Multiplication
  P-Adic Floating Point Single Precision Mantissa Multiplication
  P-Adic Fixed Point Multiplication and Multiplication/accumulation.

These operations can be used in various applications, some of which are as follows:
1. 8 by 16 multiplication/accumulation is used to convert between 24 bit RGB to YUV color encoding. YUV is the standard broadcast NTSC color coding format. The standard consumer version of this requires 8 bit digital components to the RGB and/or YUV implementation.
2. 16 bit arithmetic is a very common form of arithmetic used embedded control computers.
3. 16 by 24 bit multiplication/accumulation with greater than 48 bits accumulation is capable of performing 1024 point complex FFTs on audio data streams for Compact Disk Applications, such as data compression algorithms. The reason for this is that the FFT coefficients include numbers on the order PI/512, which has an approximate magnitude of $\frac{1}{256}$. Thus a fixed point implementation requires accumulation of 16 by 24 bit multiplications to preserve the accuracy of the input data.

4. 24 by 24 bit multiplication/accumulation is also commonly used in audio signal processing requirements. Note that by a similar argument to the last paragraph, 24 by 32 bit multiplications are necessary to preserve the accuracy of the data for a 1024 point complex FFT.

5. 32 bit arithmetic is considered by many to be the next most common used form of integer arithmetic after 16 bit. It should be noted that this arithmetic is required for implementations of the long integer type by C and C++ computer language execution environments.

6. Polynomial calculation step operations, particularly fixed point versions, are commonly used for low degree polynomial interpolation. These operations are a common mechanism for implementing standard transcendental functions, such as sin, cos, tan, log, etc.

7. Standard Floating Point Arithmetic is the most widely used dynamic range arithmetic at this time.

8. Extended Precision Floating Point arithmetic is applicable wherever Standard Floating Point is currently employed and resolves some serious problems with rounding errors or slow convergence results. The major drawback to this approach is that it will run more slowly the comparable Standard Floating Point Arithmetic. It is important to note that with this approach, there is no performance penalty and very limited additional circuit complexity involved in supporting this significant increase in quality.

9. P-Adic Floating Point and Fixed Point arithmetic are applicable where Standard Floating point or fixed point arithmetic are used, respectively. The advantage of these arithmetics is that they will tend to converge to the correct answer rather than randomly diverging in round to nearest mode and can take about the same amount of time and circuitry as standard arithmetic when implemented in this approach. It should be noted that in the same number of bits as Standard Floating Point, implementations of p=7 p-adic floating point have greater dynamic range and at least the same mantissa precision, making these numeric formats better than standard floating point.

Referring further to FIG. 17, the operation of the various components will be described in more detail. The multipliers in a small bit multiplier block 300 perform small bit multiplications on A and B and transform signal bundles A and B into a collection of signal bundles C1 to C8 which are then sent to the Adder circuits D1–D4. Signal bundles A and B each represent numbers in some number system, which does not have to be the same for both of them. For instance, A might be in a redundant binary notation, whereas B might be a two's complement number. This would allow A to contain feedback from an accumulator in the second pipe stage. This would support an optimal polynomial calculation step operations. Number systems which may be applicable include, but are not limited to, signed and unsigned 2's complement, p-adic, redundant binary arithmetic, or a modular decomposition systems based on some variant of the Chinese Remainder Theorem.

The signal bundles C1 to C8 are partial products based upon the value of a small subset of one of the operands (A or B) and all of the other operand. In the discussion that follows, it will be assumed that the A signal bundle is used in its entirety for generating each C signal bundle and a subset of the B signal bundle is used in generating each C signal bundle. The logic circuitry generating signal bundles C1–C8 will vary, depending upon the number systems being used for A and B, the number systems being employed for the D1–D4 adders, the size of the signal bundles A and B plus the exact nature of the multiplication algorithm being implemented. In the discussion of following embodiments, certain specific examples will be developed. These will by no means detail all practical implementations which could be based upon this patent, but rather, demonstrate certain applications of high practical value that are most readily discussed.

Figure 18:
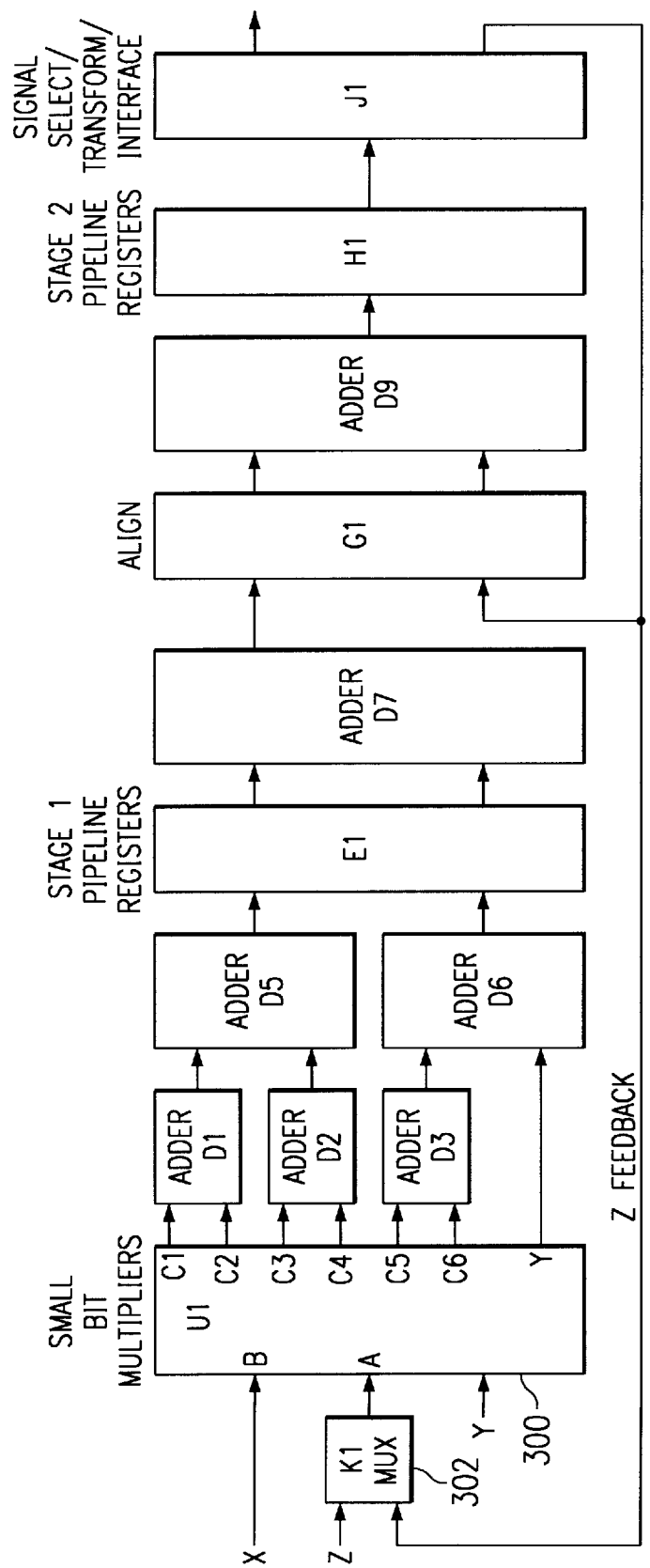
FIG. 18 illustrates an alternate embodiment of the MAC.

Referring now to FIG. 18, there is illustrated an alternate embodiment of the MAC 68. In this embodiment, a 16 bit by 16 bit multiplier/accumulator based upon a 4-3 modified Booth coding scheme is illustrated, wherein only C1–6 are needed for the basic operation. C7=Y would be available for adding an offset. This leads to implementations capable of supporting polynomial step calculations starting every cycle, assuming that the implementation possessed two accumulators in the second pipe stage. The polynomial step entails calculating X*Z+Y, where X and Y are input numbers and Z is the state of an accumulator register in H1. Implementation of 4-3 Modified Booth Coding schemes and other similar mechanisms will entail multipliers 300 containing the equivalent of an adder similar to those discussed hereinbelow.

Figure 19:
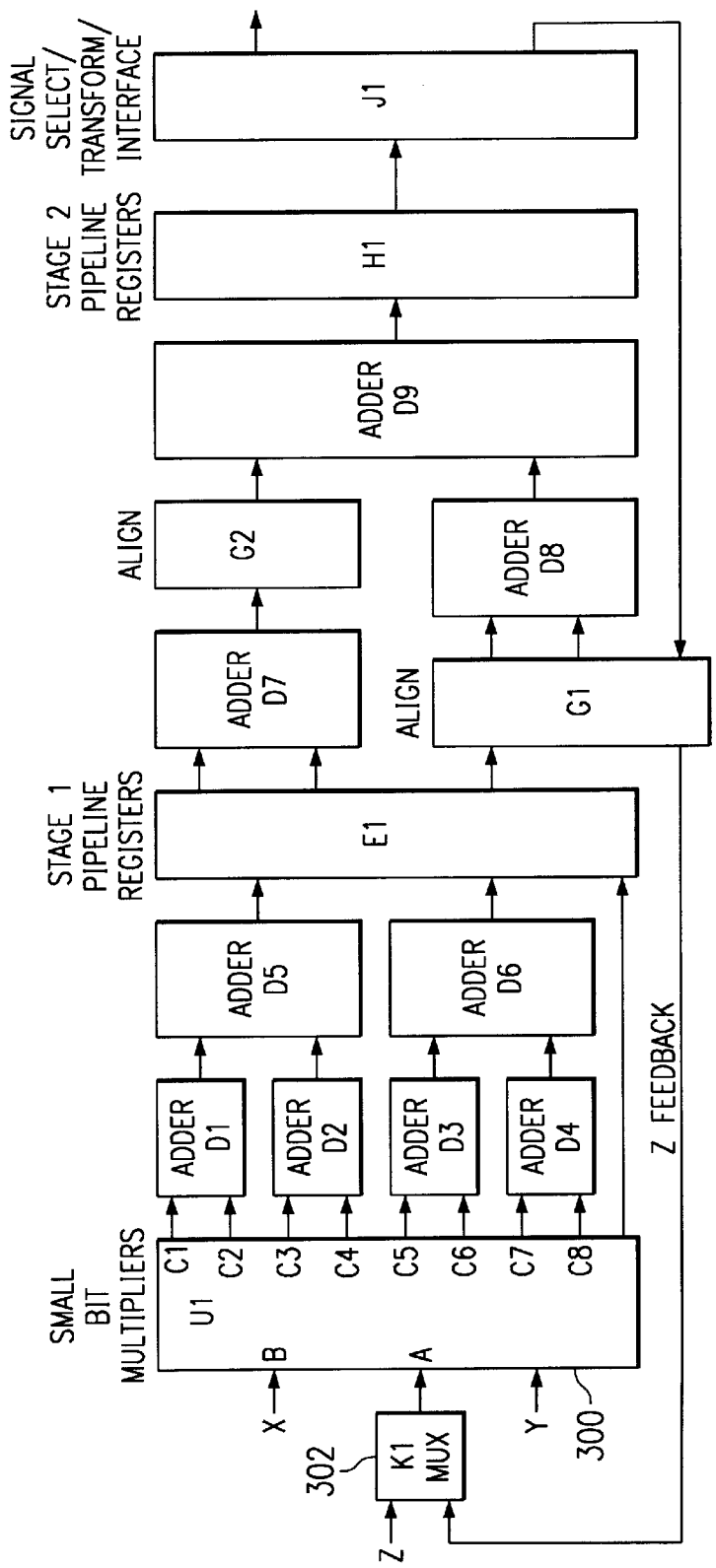
FIG. 19 illustrates an embodiment of the MAC which is optimized for polynomial calculations.

Referring now to FIG. 19, there is illustrated an embodiment of the MAC 68 which is optimized for polynomial calculations. In this case, all eight small bit multiplications (C1 to C8) are used. In such situations, the J1 component can provide Z for the calculation through a multiplexer 302. G1 performs alignment of the accumulator(s) being used for potential input to both multipliers 300 and Adder D7. Adder D9 now requires controls to support alignment of the product with the target accumulator. This is done by transmitting through the local carry propagation chain in D9 signals which act to mask carry propagation to successive digit cells and control transmission of top-most digit(s) carry propagation signals to the bottom most cell(s). This makes the Adder D9 into a loop of adder cells which can be broken at one of several places. J1 already had a requirement of aligning and potentially operating on the stored state of its accumulator(s) before feedback, this circuit implementation just adds slightly to that requirement.

Note that in the circuits represented by FIGS. 18 and 19, the presence of at least two accumulators is highly desirable, such that two polynomial calculations can then be performed in approximately the same time as one is performed. This is due to the 2 pipe stage latency in the multiplier.

Adders D1 to D4 perform local carry propagation addition, typically based upon some redundant binary notation or implementation of carry-save adders. They serve to sum the partial products C1 to C8 into four numbers. The partial products C1 to C8 are digit-aligned through how they are connected to the adders in a fashion discussed in greater detail later. These adders and those subsequently discussed herein can be viewed as a column or chain of adder cells, except where explicitly mentioned. Such circuits will be referred to hereafter as adder chains. It is noted that all adders described herein can be implemented to support p-adic and modular arithmetic in a redundant form similar to the more typical 2-adic or redundant binary form explicitly used hereafter.

Adders D5 and D6 perform local carry propagation addition upon the results of Adders D1, D2 and D3, D4 respectively.

The circuitry in E1 acts as pipeline registers making the basic circuit into a two pipe-stage machine. The memory circuits of E1 hold the results of adders D5 and D6. It may also hold Y in FIG. 19, which may either be sent from a bus directly to E1, or may have been transformed by the multiplier block 300 to a different notation than its form upon input. In certain embodiments, the last layers of the logic in Adders D5 and D6 may be "moved" to be part of the output circuitry of the pipeline registers of E1. This would be done to balance the combinatorial propagation delay between the first and second pipeline stages. The time it takes for signals to propagate from entry into multiplier block 300 to the pipeline registers of E1 is then about the same as the propagation time from output of the E1 registers into Adder D7 to the pipeline registers in H1. Thus the pipeline cycle time is about half of what it would be without the registers of E1. In certain applications, this register block E1 may be read and written by external circuitry with additional mechanisms. This could include, but is not limited to, signal bus interfaces and scan path related circuitry.

Adders D7 and D8 receive the contents of the memory circuits of E1, which contain the results of the Adders D5 and D6 from the previous clock cycle. D7 and D8 perform local carry propagation addition on these signal bundles. The result of Adder D7 is the completed multiplication of A and B. This is typically expressed in some redundant binary notation.

G1 aligns the product which has been generated as the result of Adder D7 to the accumulator H1's selected contents. GI selects for each digit of the selected contents of H1 either a digit of the result from Adder D7 or a '0' in the digit notation to be added in the Adder D8. G1 also can support negating the product resulting from D8 for use in accumulation with the contents of a register of HI. Assume that the contents of H1 are organized as P digits and that the multiplication result of Adder D7 is Q digits and the length of A is R digits and B is S digits. It is reasonable to assume that in most numeric systems, Q>=R+S and P>=Q. If P>=Q+S, then G1 can be used to align the result of Adder D7 to digits S to Q+Max(R,S), thus allowing for double (or multiple) precision multiplications to be performed within this unit efficiently. This provides a significant advantage, allowing multiple precision integer arithmetic operations to be performed with a circuit possessing far fewer logic components than would be typically required for the entire operation to be performed. Combined with the two pipe stage architecture, this makes double precision multiplications take place about as fast as a single pipestage version with somewhat more half the number of logic gates.

In FIGS. 17 and 18, Adder D9 is composed of local carry propagation adder cells as in Adders D1 to D7. It adds the aligned results of the Adder D7 to the selected contents of H1 to provide the signal bundle to H1 for storage as the new contents of one memory component in H1. In FIG. 19, Adder D9 is composed of a loop of local carry propagate adder cells which may be broken at one of several places to perform the alignment of the product with the accumulator.

H1 contains one or more clocked memory components (known hereafter as registers) which act as temporary storage accumulators for accumulating multiplications coming from Adder D9. Given the exact nature of multiplier block 300, G1 and the number of digits in each of H1's registers, and the performance requirements for a particular implementation of this circuit, the optimal number of registers contained in H1 will vary. In certain applications, this register block H1 may be read and written by external circuitry using additional mechanisms. This could include, but is not limited to signal bus interfaces and scan path related circuitry.

If Hi has more than one register, J1 selects which of these registers will be output to external circuitry. J1 also selects which of these registers is to be used for feedback to Adder D9 in FIGS. 1 and 2 and Adder D8 in FIG. 19. J1 selects which portion of H1's selected register(s) will be transmitted in cases where the register is longer than either the receiving buss or carry propagate adder it will enter. If the internal notation of an implementation of this circuit is not a standard notation, then the signal bundle to be transmitted to external circuitry is transformed by J1 into a standard notation which can then be converted by a carry propagate adder into the relevant standard arithmetic notation. In embodiments where extended precision arithmetic is a requirement, J1 can be used to "move the more significant bits down" and insert 0's in the vacated most significant bits. In embodiments requiring the accumulator contents be subtracted from the generated product from Adder D7, J1 would also perform negating the selected registers contents for delivery to the input of Adder D9 in FIGS. 1 and 2 and Adder D8 in FIG. 19.

Embodiments of this architecture support high-speed multiple-precision operations, which is not possible in typical integer or fixed-point arithmetic circuits. The performance of multiple- precision operations lowers throughput, but preserves the exactness of result. These are not possible at anything approaching the throughput and size of circuitry based upon this block diagram. Embodiments of this architecture can support standard single-precision floating point mantissa multiplications with significantly less logic circuitry than previous approaches. Embodiments of this architecture appear to be the only known circuits to support small p-adic mantissa multiplications. The authors believe that this is the first disclosure of such a floating point representation. Embodiments of this architecture provide a primary mechanism for implementing Extended precision Floating Point Arithmetic in a minimum of logic circuitry. Embodiments of this architecture also provide implementations of efficient high speed modular arithmetic calculators.

Basic Multiplier Embodied as 8 by N multiplier-accumulator based upon FIG. 17

In this discussion, A0 represents the least significant digit of the number A. The digits of A are represented in descending order of significance as AfAeAdAc, AbAaA9A8, A7A6A5A4, A3A2A1A0. B is represented as an 8 digit number represented by B7B6B5B4, B3B2B1B0.

Multipliers 300 are controlled by a signal bundle. One control signal, to be referred to as U1. A sign determines whether the A operand is treated as a signed or an unsigned integer. A second control signal, referred to as U1.Bsign determines whether the B operand is treated as a signed or unsigned integer. Four distinct one digit by one digit multiplications are performed in the generation of the C1 to C8 digit components for the adders D1 to D4. Let Ax represent a digit of A and By represent a digit of B. The operation AxuBy is an always unsigned multiplication of digit Ax with digit By. The operation AxsBy is an unsigned multiplication of Ax and By when the U1.Asign indicates the A operand is unsigned. The operation AxsBy is a signed multiplication when the U1.Asign indicates that the A operand is a signed integer. The operation BysAx is an unsigned multiplication of Ax and By when the U1.Bsign indicates the B operand is unsigned. The operation BysAx is a signed multiplication when the U1.Bsign indicates that the B operand is a signed integer. The operation AxSBy is an unsigned multiplication when both U1.Asign and U1.Bsign indicate unsigned integer operands. The operation AxSBy is a related to the multiplication of the most significant bits of A and B. This operation is determined by controls which specify whether the individual operands are signed or unsigned. The following Table 9 illustrates C1–C8 for digits 0 to 23:

Column definitions for the following performance evaluation tables:

TABLE 9

| C1 | C2 | C3 | C4 | C5 | C6 | C7 | C8 | Digit k |
|---|---|---|---|---|---|---|---|---|
| 0 | 0 | 0 | 0 | 0 | 0 | 0 | 0 | 23 |
| 0 | 0 | 0 | 0 | 0 | 0 | 0 | AfSB7 | 22 |
| 0 | 0 | 0 | 0 | 0 | 0 | AfsB6 | AeuB7 | 21 |
| 0 | 0 | 0 | 0 | 0 | AfsB5 | AeuB6 | AduB7 | 20 |
| 0 | 0 | 0 | 0 | AfsB4 | AeuB5 | AduB6 | AcuB7 | 19 |
| 0 | 0 | 0 | AfsB3 | AeuB4 | AduB5 | AcuB6 | AbuB7 | 18 |
| 0 | 0 | AfsB2 | AeuB3 | AduB4 | AcuB5 | AbuB6 | AauB7 | 17 |
| 0 | AfsBl | AeuB2 | AduB3 | AcuB4 | AbuB5 | AauB6 | A9uB7 | 16 |
| AfsB0 | AeuBl | AduB2 | AcuB3 | AbuB4 | AauB5 | A9uB6 | A8uB7 | 15 |
| AeuB0 | AduBl | AcuB2 | AbuB3 | AauB4 | A9uB5 | A8uB6 | A7uB7 | 14 |
| AduB0 | AcuB1 | AbuB2 | AauB3 | A9uB4 | A8uB5 | A7uB6 | A6uB7 | 13 |
| AcuB0 | AbuBl | AauB2 | A9uB3 | A8uB4 | A7uB5 | A6uB6 | A5uB7 | 12 |
| AbuB0 | AauB1 | A9uB2 | A8uB3 | A7uB4 | A6uB5 | A5uB6 | A4uB7 | 11 |
| AauB0 | A9uB1 | A8uB2 | A7uB3 | A6uB4 | A5uB5 | A4uB6 | A3uB7 | 10 |
| A9uB0 | A8uB1 | A7uB2 | A6uB3 | A5uB4 | A4uB5 | A3uB6 | A2uB7 | 9 |
| A8uB0 | A7uB1 | A6uB2 | A5uB3 | A4uB4 | A3uB5 | A2uB6 | A1uB7 | 8 |
| A7uB0 | A6uB1 | A5uB2 | A4uB3 | A3uB4 | A2uB5 | A1uB6 | A0uB7 | 7 |
| A6uB0 | A5uB1 | A4uB2 | A3uB3 | A2uB4 | A1uB5 | A0uB6 | 0 | 6 |
| A5uB0 | A4uB1 | A3uB2 | A2uB3 | A1uB4 | A0uB5 | 0 | 0 | 5 |
| A4uB0 | A3uB1 | A2uB2 | A1uB3 | A0uB4 | 0 | 0 | 0 | 4 |
| A3uB0 | A2uB1 | A1uB2 | A0uB3 | 0 | 0 | 0 | 0 | 3 |
| A2uB0 | A1uB1 | A0uB2 | 0 | 0 | 0 | 0 | 0 | 2 |
| A1uB0 | A0uB1 | 0 | 0 | 0 | 0 | 0 | 0 | 1 |
| A0uB0 | 0 | 0 | 0 | 0 | 0 | 0 | 0 | 0 |

Discussion of Adders D1 to D7

Adders D1 to D4 contain 18 digit cells for addition. Adders D5 and D6 contain 21 digits cells for addition. Adder D7 contains 25 digit cells for addition. Each of these adders contains one more cell than the number of digits for which they have no inputs. Implementations of D8, G1, H1 and J1 to achieve various arithmetic requirements.

Performance Evaluation of 1-bit small-bit multipliers

Table 10 illustrates Capability Versus Size Comparison with N=16 based upon FIG. 17.

"Operation" describes a form of integer multiplication generating the exact result which may be accumulated.

"Acc Bits" refers to the equivalent number of bits in standard integer arithmetic that the accumulator would be implemented to hold.

"Alignment Slots" refers to the implementation of G1 all diagrams and Adders D7, D8 and D9 in FIG. 3. Specific Details regarding each implementation will be discussed in the note regarding each circuit referenced in the "Remarks" column.

TABLE 10

| Operation | Acc Bits | Alignment Slots | Adder Cells | E1 + H1 Bits | Cyc Start to End | Cyc to start next | Typical Adder Cell Count | Typical Register Bit Count | Remarks |
|---|---|---|---|---|---|---|---|---|---|
| Mul 8*16 | 40 | 2 | 172 | 120 | 2 | 1 | 128 | 80 | Allows $2^{16}$ accumulations Note 1 |
| Mul 16*16 | | | | | 3 | 2 | 256 | 80 | Allows $2^8$ accumulations |
| Mul8*16 | 48 | 3 | 180 | 128 | 2 | 1 | 128 | 96 | Allows $2^{24}$ accumulations Note 2 |
| Mul 16*16 | | | | | 3 | 2 | 256 | 96 | Allows $2^{16}$ accumulations |
| Mul 16*24 | | | | | 4 | 3 | 384 | 96 | Allows $2^8$ accumulations |
| Mul 8*16 | 56 | 4 | 188 | 136 | 2 | 1 | 128 | 112 | Allows $2^{32}$ accumulations Note 3 |
| Mul 16*16 | | | | | 3 | 2 | 256 | 112 | Allows $2^{24}$ accumulations |
| Mul 24*16 | | | | | 4 | 3 | 384 | 112 | Allows $2^{16}$ accumulations |
| Mul 32*16 | | | | | 5 | 4 | 576 | 112 | Allows $2^8$ accumulations |

"Adder Cells" refers to the number of adder cells needed to implement the adders involved in implementing the noted circuit based upon this patent's relevant block diagram. Unless otherwise noted, the adder cells will be two input cells, i.e. they perform the sum of two numbers. In cases where not only 2-input but also 3-input adder cells are involved, the notation used will be "a,b" where a represents the number of 2-input adder cells and b represents the number of 3-input adder cells.

"E1+H1 Bits" will refer to the number of bits of memory storage required to build the circuit assuming a radix-2 redundant binary arithmetic notation.

"Cyc Start to End" refers to the number of clock cycles from start of the operation until all activity is completed.

"Cyc to start next" refers to the number of clock cycles from the start of the operation until the next operation may be started.

"Typical Adder Cell Count" represents a circuit directly implementing the operation with an accumulating final adder chain with no middle pipe register or alignment circuitry. Larger multiplications will require bigger adder trees. The columnar figure will be based upon using a similar small bit multiplier cell as described in the appropriate discussion of multipliers 300.

"Typical Register Bit Count" refers to the number of bits of memory that a typical design would require to hold a radix-2 redundant binary representation of the accumulator alone in a typical application.

"Remarks" contains a statement regarding the minimum number operations the circuit could perform before there was a possibility of overflow.

The Remarks entry may also contain a reference to a "Note", which will describe the implementation details of the multiplier-accumulator circuit being examined. The row of the table the Note resides in describes the basic multiplication operation performed, the size of the accumulator, number of alignment slots. The Note will fill in details should as the weighting factor between the alignment slot entries and any other pertinent details, comparisons and any other specific comments.

Notes:

Alignment in this new circuit is the same as multiplying the product by 1 and $2^8=256$. It is functionally equivalent to a 16 by 16 bit multiplier with follow-on local carry propagate adder for accumulation. The equivalent circuit would require 256 adder cells and 80 bits of accumulator memory compared to 172 adder cells and 120 bits of memory. Its clock cycle time is approximately half that of the standard equivalent device and would have the same throughput as the standard implementation.

Alignment in this new circuit is the same as multiplying the product by 1, $2^8=256$ and $2^{16}=256^2$. It is functionally equivalent to a 16 by 24 bit multiplier with follow-on local carry propagate adder for accumulation. The equivalent circuit would require 384 adder cells and 96 bits of accumulator memory compared to 180 adder cells and 128 bits of memory. The new circuit would require about half the logic of the standard functional equivalent circuit. Its clock cycle time is approximately half that of the standard equivalent device. Throughput of the standard implementation would be once every one of its clock cycles (or two of this new circuit), whereas performance of 16 by 24 bit multiply could be performed every three cycles in the new circuit. However, the new circuit would be twice as fast at multiplying 8 by 16 bits and would have identical performance for 16 by 16 bit multiplications.

Alignment in this new circuit is the same as multiplying the product by 1, $2^8=256$, $2^{16}=256^2$ and $2^{24}=256^3$. It is functionally equivalent to a 16 by 32 bit multiplier with follow-on local carry propagate adder for accumulation. The equivalent circuit would require 576 adder cells and 112 bits of accumulator memory compared to 188 adder cells and 136 bits of memory. The new circuit would require about a third the logic of the standard functional equivalent circuit. Its clock cycle time is approximately half that of the standard equivalent device. Throughput for a 16 by 32 bit multiplication with the standard implementation would be once every one of its clock cycles (or two of this new circuit), whereas performance of 16 by 24 bit multiply could be performed every four cycles in the new circuit. However, the new circuit would be twice as fast at multiplying 8 by 16 bits, would have identical performance for 16 by 16 bit multiplications, as well as being able to perform a 16 by 24 bit multiplication every 3 clock cycles.

Table 11 illustrates Capability Versus Size Comparison with N=24 based upon FIG. 17:

TABLE 11

| Operation | Acc Bits | Alignment Slots | Adder Cells | E1 + H1 Bits | Cyc Start to End | Cyc to start next | Typcial Adder Cell Count | Typical Registr Bit Count | Remarks |
|---|---|---|---|---|---|---|---|---|---|
| Mul 8*24 | 48 | 3 | 236 | 160 | 3 | 1 | 192 | 80 | Allows $2^{16}$ accumulations Note 1 |
| Mul 16*24 | | | | | 4 | 2 | 384 | 96 | Allows $2^8$ accumulations |
| Mul 24*24 | | | | | 6 | 3 | 576 | 96 | Allows 1 operation |
| Mul 8*24 | 64 | 4 | 244 | 184 | 3 | 1 | 192 | 128 | Allows $2^{32}$ accumulations Note 2 |
| Mul 16*24 | | | | | 4 | 2 | 128 | 128 | Allows $2^{24}$ accumulations |
| Mul 24*24 | | | | | 5 | 3 | 576 | 128 | Allows $2^{16}$ accumulations |

TABLE 11-continued

| Operation | Acc Bits | Alignment Slots | Adder Cells | E1 + H1 Bits | Cyc Start to End | Cyc to start next | Typcial Adder Cell Count | Typical Registr Bit Count | Remarks |
|---|---|---|---|---|---|---|---|---|---|
| Mul 32*24 | | | | | 65 | 43 | 1098 | 128 | Allows $2^8$ accumulations |
| Mul 8*24 | 64 | 64 | 244 | 312 | 3 | 1 | 192 | 256 | Allows $2^{32}$ accumulations Note 3 |
| Mul 16*24 | | | | | 4 | 2 | 128 | 256 | Allows $2^{24}$ accumulations |
| Mul 24*24 | | | | | 5 | 3 | 576 | 256 | Allows $2^{16}$ accumulations |
| Mul 32*24 | | | | | 6 | 4 | 1098 | 256 | Allows $2^8$ accumulations |
| Fmul 24*24 | | | | | 5 | 3 | 576 | 256 | Allows indefinite number of accumulations |

Notes

Alignment in this circuit is the same as multiplying the product by 1, $2^8=256$ and $2^{16}=256^2$. It is functionally equivalent to a 24 by 24 bit multiplier with follow-on local carry propagate adder for accumulation. The equivalent circuit would require 576 adder cells and 96 bits of accumulator memory compared to 236 adder cells and 160 bits of memory. The new circuit would require about half the logic of the standard functional equivalent circuit. Its clock cycle time is approximately half that of the standard equivalent device. Throughput of the standard implementation would be once every one of its clock cycles (or two of this new circuit), whereas performance of 24 by 24 bit multiply could be performed every three cycles in the new circuit. However, the new circuit would be twice as fast at multiplying 8 by 24 bits and would have identical performance for 16 by 24 bit multiplications.

Alignment in this multiplier-accumulator is the same as multiplying the product by 1, $2^8=256$, $2^{16}=256^2$ and $2^{24}=256^3$. It is functionally equivalent to a 24 by 32 bit multiplier with follow-on local carry propagate adder for accumulation. The equivalent circuit would require 1098 adder cells and 128 bits of accumulator memory compared to 244 adder cells and 184 bits of memory. The multiplier-accumulator would require about a quarter the logic of the standard functional equivalent circuit. Its clock cycle time would be less than half that of the standard equivalent device. Throughput for a 24 by 32 bit multiplication with the standard implementation would be once every one of its clock cycles (or two of this multiplier-accumulator), whereas performance of 32 by 24 bit multiply could be performed every four cycles in the multiplier-accumulator. However, the multiplier-accumulator would be twice as fast at multiplying 8 by 24 bits, would have identical performance for 16 by 24 bit multiplications, as well as being able to perform a 24 by 24 bit multiplication every 3 clock cycles.

This is the first of the multiplier-accumulators capable of performing single precision mantissa multiplication. It is specified as supporting an Extended Scientific Notation, which forces the implementation of dual accumulators. Alignment of a product is to any bit boundary, so that weights of every power of two must be supported. Truncation of "dropped bits" in either the accumulator or partial product circuitry require G1 to be able to mask digits. Integer performance regarding 2*24, 16*24, 24*24 and 32*24 arithmetic is the same as that described in the previous note. This circuit can also perform 40*24 arithmetic every 5 clock cycles, which has utility in FFTs with greater than 1K complex points.

Multiplier as a 16 by N multiplier-accumulator (N>=16) Using 3-2 Booth Coding

The Modified 3-2 bit Booth Multiplication Coding Scheme in multiplier block 300

The primary distinction between the 8 by N implementation and this implementation is in the multiplier block 300. In this implementation a version of Booth's Algorithm is used to minimize the number of add operations needed. The Booth Algorithm is based upon the arithmetic identity $-2^{n-1}+2^{n-2}+\ldots+2+1=2^n1$. The effect of this identity is that multiplication of a number by a string of 1's can be performed by one shift operation, an addition and a subtraction.

The following algorithm is based upon examining 3 successive bits, determining whether to perform an add or subtract, then processing over 2 bit positions and repeating the process. This is known as the 3-2 bit coding scheme. There is a one bit overlap, the least significant bit of one examination is the most significant bit of its predecessor examination.

Table 12 of 3-2 bit Booth Multiplication Coding Scheme:

TABLE 12

| B[i + 1] | B[i] | B[i − 1] | Operation | Remarks |
|---|---|---|---|---|
| 0 | 0 | 0 | +0 | String of 0's |
| 0 | 0 | 1 | +A | String of 1's terminating at B[i] |
| 0 | 1 | 0 | +A | Solitary 1 at B[i] |
| 0 | 1 | 1 | +2A | String of 1's terminating at B[i + 1] |
| 1 | 0 | 0 | −2A | String of 1's starting at B[i + 1] |
| 1 | 0 | 1 | −A | String of 1's terminating at B[i] plus String of 1's starting at B[i + 1] |
| 1 | 1 | 0 | −A | String of 1's starting at B[i] |
| 1 | 1 | 1 | −0 | String of 1's traversing all examined bits of B |

Table 13 of C1–C8 for digits 0 to 30:

TABLE 13

| C1 | C2 | C3 | C4 | C5 | C6 | C7 | C8 | Digit k |
|---|---|---|---|---|---|---|---|---|
| 0 | 0 | 0 | 0 | 0 | 0 | 0 | ABe | 30 |
| 0 | 0 | 0 | 0 | 0 | 0 | 0 | AfsBe | 29 |
| 0 | 0 | 0 | 0 | 0 | 0 | ABc | AeuBe | 28 |
| 0 | 0 | 0 | 0 | 0 | 0 | AfsBc | AduBe | 27 |
| 0 | 0 | 0 | 0 | 0 | ABa | AeuBc | AcuBe | 26 |
| 0 | 0 | 0 | 0 | 0 | AfsBa | AduBc | AbuBe | 25 |
| 0 | 0 | 0 | 0 | AB8 | AeuBa | AcuBc | AauBe | 24 |
| 0 | 0 | 0 | 0 | AfsB8 | AduBa | AbuBc | A9uBe | 23 |
| 0 | 0 | 0 | AB6 | AeuB8 | AcuBa | AauBc | A8uBe | 22 |
| 0 | 0 | 0 | AfsB6 | AduB8 | AbuBa | A9uBc | A7uBe | 21 |
| 0 | 0 | AB4 | AeuB6 | AcuB8 | AauBa | A8uBc | A6uBe | 20 |
| 0 | 0 | AfsB4 | AduB6 | AbuB8 | A9uBa | A7uBc | A5uBe | 19 |
| 0 | AB2 | AeuB4 | AcuB6 | AauB8 | A8uBa | A6uBc | A4uBe | 18 |
| 0 | AfsB2 | AduB4 | AbuB6 | A9uB8 | A7uBa | A5uBc | A3uBe | 17 |
| AB0 | AeuB2 | AcuB4 | AauB6 | A8uB8 | A6uBa | A4uBc | A2uBe | 16 |
| AfsB0 | AduB2 | AbuB4 | A9uB6 | A7uB8 | A5uBa | A3uBc | A1uBe | 15 |
| AeuB0 | AcuB2 | AauB4 | A8uB6 | A6uB8 | A4uBa | A2uBc | A0uBe | 14 |
| AduB0 | AbuB2 | A9uB4 | A7uB6 | A5uB8 | A3uBa | A1uBc | 0 | 13 |
| AcuB0 | AauB2 | A8uB4 | A6uB6 | A4uB8 | A2uBa | A0uBc | 0 | 12 |
| AbuB0 | A9uB2 | A7uB4 | A5uB6 | A3uB8 | A1uBa | 0 | 0 | 11 |
| AauB0 | A8uB2 | A6uB4 | A4uB6 | A2uB8 | A0uBa | 0 | 0 | 10 |
| A9uB0 | A7uB2 | A5uB4 | A3uB6 | A1uB8 | 0 | 0 | 0 | 9 |
| A8uB0 | A6uB2 | A4uB4 | A2uB6 | A0uB8 | 0 | 0 | 0 | 8 |
| A7uB0 | A5uB2 | A3uB4 | A1uB6 | 0 | 0 | 0 | 0 | 7 |
| A6uB0 | A4uB2 | A2uB4 | A0uB6 | 0 | 0 | 0 | 0 | 6 |
| A5uB0 | A3uB2 | A1uB4 | 0 | 0 | 0 | 0 | 0 | 5 |
| A4uB0 | A2uB2 | A0uB4 | 0 | 0 | 0 | 0 | 4 | |
| A3uB0 | A1uB2 | 0 | 0 | 0 | 0 | 0 | 0 | 3 |
| A2uB0 | A0uB2 | 0 | 0 | 0 | 0 | 0 | 0 | 2 |
| A1uB0 | 0 | 0 | 0 | 0 | 0 | 0 | 0 | 1 |
| A0uB0 | 0 | 0 | 0 | 0 | 0 | 0 | 0 | 0 |

Implementation Parameters to achieve various requirements are summarized in the following table 14 that illustrates performance evaluation with (3,2) Booth Encoder Small Bit Multipliers Cells is shown in the following table of Capability versus size comparison (N=16) based upon FIG. 1. The typical adder cell count in this table is based upon using a 3-2 bit Modified Booth Coding scheme similar in Table 12.

Alignment in this multiplier-accumulator is the same as multiplying the product by 1, $2^{16}$=65536 and $(2^{16})^2$. It is functionally equivalent to a 32 by 32 bit multiplier with follow-on local carry propagate adder for accumulation. The equivalent circuit would require 512

TABLE 14

| Operation | Acc Bits | Alignment Slots | Adder Cells | E1 + H1 Bits | Cyc Start to End | Cyc to start next | Typical Adder Cell Count | Typical Register Bit Count | Remarks |
|---|---|---|---|---|---|---|---|---|---|
| Mul 16*16 | 56 | 2 | 205 | 148 | 2 | 1 | 128 | 112 | Allows $2^{24}$ accumulations Note 1 |
| Mul 16*32 | | | | | 3 | 2 | 256 | 128 | Allows $2^8$ accumulations |
| Mul 16*16 | 64 | 3 | 213 | 156 | 2 | 1 | 128 | 128 | Allows $2^{32}$ accumulations Note 2 |
| Mul 16*32 | | | | | 3 | 2 | 256 | 128 | Allows $2^{16}$ accumulations |
| Mul 32*32 | | | | | 6 | 4 | 512 | 128 | Allows 1 operation |
| Mul 16*16 | 72 | 4 | 221 | 164 | 3 | 1 | 128 | 144 | Allows $2^{40}$ accumulations Note 3 |
| Mul 16*32 | | | | | 4 | 2 | 256 | 144 | Allows $2^{24}$ accumulations |
| Mul 32*32 | | | | | 6 | 4 | 512 | 144 | Allows $2^8$ accumulations |
| Mul 32*48 | | | | | 8 | 6 | 768 | 144 | Allows $2^8$ accumulations |

Notes:

Alignment in this multiplier-accumulator is the same as multiplying the product by 1 and $2^{16}$=65536. It is functionally equivalent to a 16 by 32. bit multiplier with follow-on local carry propagate adder for accumulation. The equivalent circuit would require 256 adder cells and 128 bits of accumulator memory compared to 205 adder cells and 148 bits of memory. It would have about the same amount of logic circuitry. Its clock cycle time is approximately half that of the standard equivalent device and would have the same throughput as the standard implementation.

adder cells and 128 bits of accumulator memory compared to 213 adder cells and 156 bits of memory. It would be about half the logic circuitry. Its clock cycle time is approximately half that of the standard equivalent device.

It would take twice as long to perform a 32 by 32 bit multiply. The multiplier-accumulator would be twice as fast the standard circuit for 16 by 16 multiplication. It would perform a 16 by 32 bit multiplication at the same rate as the standard multiplier-accumulator would perform.

Alignment is the same as multiplying the product by 1, $2^{16}=65536$, $(2^{16})^2$ and $(2^{16})^3$. It is functionally equivalent to a 32 by 48 bit multiplier with follow-on local carry propagate adder for accumulation. The equivalent circuit would require 768 adder cells and 144 bits of accumulator memory compared to 221 adder cells and 164 bits of memory. It would be about a third the logic circuitry. Its clock cycle time is approximately half that of the standard equivalent device. It would take three times as long to perform a 32 by 48 bit multiply. The present multiplier-accumulator would be twice as fast the the standard circuit for 16 by 16 multiplication. It would perform a 16 by 32 bit multiplication at the same rate as the standard circuit would perform. It would perform a 32 by 32 bit multiplication in about twice as long as the standard circuit.

The following table 15 illustrates a Capability versus size comparison (N=24) based upon FIG. 17. The typical adder cell count in this table is based upon using a 3-2 bit Modified Booth Coding scheme similar in Table 12.

a 32 by 48 bit multiplier with follow-on local carry propagate adder for accumulation. The equivalent circuit would require 768 adder cells and 176 bits of accumulator memory compared to 303 adder cells and 212 bits of memory. It would have about half as much logic circuitry. Its clock cycle time would be somewhat less than half the standard implementation. It would take 4 new circuit clock cycles to perform what would take 1 standard clock cycle (or 2 new circuit clock cycles) in the new circuit to perform.

However, in one clock cycle, a 16 by 24 bit multiplication could occur and in two clock cycles either a 16 by 48 or a 32 by 24 bit multiplication could occur. This circuit is half the size and for a number of important DSP arithmetic operations, either as fast or significantly faster than a standard circuit with the same capability.

Multiplier as a 24 by N multiplier-accumulator (N>=24) Use of a Modified 4-3 bit Booth Multiplication Coding Scheme

TABLE 15

| Operation | Acc Bits | Alignment Slots | Adder Cells | E1 + H1 Bits | Cyc Start to End | Cyc to start next | Typical Adder Cell Count | Typical Register Bit Count | Remarks |
|---|---|---|---|---|---|---|---|---|---|
| Mul 16*24 | 64 | 2 | 283 | 196 | 3 | 1 | 256 | 128 | Allows $2^{16}$ accumulations Note 1 |
| Mul 32*24 | | | | | 4 | 2 | 448 | 128 | Allows $2^8$ accumulations |
| Mul 16*24 | 88 | 4 | 303 | 212 | 3 | 1 | 280 | 176 | Allows $2^{48}$ accumulations Note 2 |
| Mul 32*24 | | | | | 4 | 2 | 472 | 176 | Allows $2^{32}$ accumulations |
| Mul 16*48 | | | | | 5 | 2 | 465 | 176 | Allows $2^{24}$ accumulations |
| Mul 32*48 | | | | | 6 | 4 | 768 | 176 | Allows $2^8$ accumulations |

Notes:

Alignment is the same as multiplying the product by 1 and $2^{24}=(2^8)^3$. It is functionally equivalent to a 32 by 24 bit multiplier with follow-on local carry propagate adder for accumulation. The equivalent circuit would require 256 adder cells and 128 bits of accumulator memory compared to 205 adder cells and 148 bits of memory. It would have about the same amount of logic circuitry. Its clock cycle time is approximately half that of the standard equivalent device and would have the same throughput as the standard implementation.

Alignment is the same as multiplying the product by 1, $2^{24}$, $2^{16}$ and $2^{40}=2^{16+24}$. It is functionally equivalent to This embodiment primarily differs from its predecessors in the multiplier block 300. As before, a version of Booth's Algorithm is used to minimize the number of add operations needed. The following algorithm is based upon examining four successive bits, determining whether to perform an add or subtract, then processing over three bit positions and repeating the process. This is what has lead to the term 4-3 bit coding scheme. There is a 1-bit overlap, the least significant bit of one examination is the most significant bit of its successor examination.

Table 16 illustrates a Modified 4-3 Bit Booth Multiplication Coding Scheme:

TABLE 16

| B[i + 2] | B[i + 1] | B[i] | B[i − 1] | Operation | Remark |
|---|---|---|---|---|---|
| 0 | 0 | 0 | 0 | +0 | string of 0's |
| 0 | 0 | 0 | 1 | +A | string of 1's terminating at B[i] |
| 0 | 0 | 1 | 0 | +A | Solitary 1 at B[i] |
| 0 | 0 | 1 | 1 | +2A | sting of 1's terminating at B[i + 1] |
| 0 | 1 | 0 | 0 | +2A | Solitary 1 at B[i + 1] |
| 0 | 1 | 0 | 1 | +3A | String of 1's terminating at B[i] plus solitary 1 at B[i + 1] |
| 0 | 1 | 1 | 0 | +3A | Short string(=3) at B[i + 1] and B[i] |
| 0 | 1 | 1 | 1 | +4A | String of 1's terminating at B[i + 2] |
| 1 | 0 | 0 | 0 | −4A | String of 1's starting at B[i + 2] |
| 1 | 0 | 0 | 1 | −3A | String of 1'starting at B[i + 2] plus string of 1's terminating at B[i] |
| 1 | 0 | 1 | 0 | −3A | String of 1's starting at B[i + 2] plus solitary 1 at B[i] |
| 1 | 0 | 1 | 1 | −2A | String of 1's starting at B[i + 2] |

TABLE 16-continued

| B[i + 2] | B[i + 1] | B[i] | B[i − 1] | Operation | Remark |
|---|---|---|---|---|---|
| 1 | 1 | 0 | 0 | −2A | plus string of 1's terminating at B[i + 1] String of 1's starting at B[i + 1] |
| 1 | 1 | 0 | 1 | −A | String of 1's starting at B[i + 1] plus string of 1's terminating at B[i] |
| 1 | 1 | 1 | 0 | −A | String of 1's starting at B[i] |
| 1 | 1 | 1 | 1 | −0 | String of 1's starting traversing all bits |

Optimal Double Precision Floating Point Mantissa Multiplication

An implementation based upon 24- by 32-bit multiplication would be capable of performing a standard 56-bit precision floating point mantissa multiplication every two cycles. The 56-bit length comes from the inherent requirement of IEEE Standard Double Precision numbers, which require a mantissa of 64-10 bits, plus two guard bits for intermediate rounding accuracy. Such an implementation would require only two alignment slots. An implementation of 16- by 24-bit multiplication would be capable of supporting the 56-bit floating point mantissa calculation, but with the liability of taking more clock cycles to complete. More alignment slots would be required. Such an implementation would however much less logic circuitry as the application dedicated multiplier. Implementation of a p-adic mantissa for either p=3 or 7 would be readily optimized in such implementations.

Table 17 of C1–C8 for digits 0 to 47

TABLE 17

| C1 | C2 | C3 | C4 | C5 | C6 | C7 | C8 | Digit k |
|---|---|---|---|---|---|---|---|---|
| 0 | 0 | 0 | 0 | 0 | 0 | 0 | AB15 | 47 |
| 0 | 0 | 0 | 0 | 0 | 0 | 0 | A19uB15 | 46 |
| 0 | 0 | 0 | 0 | 0 | 0 | 0 | A18uB15 | 45 |
| 0 | 0 | 0 | 0 | 0 | 0 | AB12 | A17uB15 | 44 |
| 0 | 0 | 0 | 0 | 0 | 0 | A19uB12 | A16uB15 | 43 |
| 0 | 0 | 0 | 0 | 0 | 0 | A18uB12 | A15uB15 | 42 |
| 0 | 0 | 0 | 0 | 0 | ABf | A17uB12 | A14uB15 | 41 |
| 0 | 0 | 0 | 0 | 0 | A19uBf | A16uB12 | A13uB15 | 40 |
| 0 | 0 | 0 | 0 | 0 | A18uBf | A15uB12 | A12uB15 | 39 |
| 0 | 0 | 0 | 0 | ABc | A17uBf | A14uB12 | A11uB15 | 38 |
| 0 | 0 | 0 | 0 | A19uBc | A16uBf | A13uB12 | A10uB15 | 37 |
| 0 | 0 | 0 | 0 | A18uBc | A15uBf | A12uB12 | AfsBl5 | 36 |
| 0 | 0 | 0 | AB9 | A17uBc | A14uBf | A11uB12 | AeuB15 | 3S |
| 0 | 0 | 0 | A19uB9 | A16uBc | A13uBf | A10uB12 | AduB15 | 34 |
| 0 | 0 | 0 | A18uB9 | A15uBc | A12uBf | AfsBl2 | AcuB15 | 33 |
| 0 | 0 | AB6 | A17uB9 | A14uBc | A11uBf | AeuBl2 | AbuB15 | 32 |
| 0 | 0 | A19uB6 | A16uB9 | A13uBc | A10uBf | AduBl2 | AauB15 | 31 |
| 0 | 0 | A18uB6 | A15uB9 | A12uBc | AfsBf | AcuBl2 | A9uB15 | 30 |
| 0 | AB3 | A17uB6 | A14uB9 | A11uBc | AeuBf | AbuBl2 | A8uB15 | 29 |
| 0 | A19uB3 | A16uB6 | A13uB9 | A10uBc | AduBf | AauBl2 | A7uB15 | 28 |
| 0 | A18uB3 | A15uB6 | A12uB9 | AfsBc | AcuBf | A9uB12 | A6uB15 | 27 |
| AB0 | A17uB3 | A14uB6 | A11uB9 | AeuBc | AbuBf | A8uB12 | A5uB15 | 26 |
| A19sB0 | A16uB3 | A13uB6 | A10uB9 | AduBc | AauBf | A7uB12 | A4uB15 | 25 |
| A18sB0 | A15uB3 | A12uB6 | AfsB9 | AcuBc | A9uBf | A6uB12 | A3uB15 | 24 |
| A17sB0 | A14uB3 | A11uB6 | AeuB9 | AbuBc | A8uBf | A5uB12 | A2uB15 | 23 |
| A16sB0 | A13uB3 | A10uB6 | AduB9 | AauBc | A7uBf | A4uB12 | A1uB15 | 22 |
| A15sB0 | A12uB3 | AfsB6 | AcuB9 | A9uBc | A6uBf | A3uB12 | A0uB15 | 21 |
| A14sB0 | A11uB3 | AeuB6 | AbuB9 | A8uBc | A5uBf | A2uB12 | 0 | 20 |
| A13sB0 | A10uB3 | AduB6 | AauB9 | A7uBc | A4uBf | A1uB12 | 0 | 19 |
| A12sB0 | AfsB3 | AcuB6 | A9uB9 | A6uBc | A3uBf | A0uB12 | 0 | 18 |
| A11sB0 | AeuB3 | AbuB6 | A8uB9 | A5uBc | A2uBf | 0 | 0 | 17 |
| A10sB0 | AduB3 | AauB6 | A7uB9 | A4uBc | A1uBf | 0 | 0 | 16 |
| AfsB0 | AcuB3 | A9uB6 | A6uB9 | A3uBc | A0uBf | 0 | 0 | 15 |
| AeuB0 | AbuB3 | A8uB6 | A5uB9 | A2uBc | 0 | 0 | 0 | 14 |
| AduB0 | AauB3 | A7uB6 | A4uB9 | A1uBc | 0 | 0 | 0 | 13 |
| AcuB0 | A9uB3 | A6uB6 | A3uB9 | A0uBc | 0 | 0 | 0 | 12 |
| AbuB0 | A8uB3 | A5uB6 | A2uB9 | 0 | 0 | 0 | 0 | 11 |
| AauB0 | A7uB3 | A4uB6 | A1uB9 | 0 | 0 | 0 | 0 | 10 |
| A9uB0 | A6uB3 | A3uB6 | A0uB9 | 0 | 0 | 0 | 0 | 9 |
| A8uB0 | A5uB3 | A2uB6 | 0 | 0 | 0 | 0 | 0 | 8 |
| A7uB0 | A4uB3 | A1uB6 | 0 | 0 | 0 | 0 | 0 | 7 |
| AGuB0 | A3uB3 | A0uB6 | 0 | 0 | 0 | 0 | 0 | 6 |
| A5uB0 | A2uB3 | 0 | 0 | 0 | 0 | 0 | 0 | 5 |
| A4uB0 | A1uB3 | 0 | 0 | 0 | 0 | 0 | 0 | 4 |
| A3uB0 | A0uB3 | 0 | 0 | 0 | 0 | 0 | 0 | 3 |
| A2uB0 | 0 | 0 | 0 | 0 | 0 | 0 | 0 | 2 |
| A1uB0 | 0 | 0 | 0 | 0 | 0 | 0 | 0 | 1 |
| A0uB0 | 0 | 0 | 0 | 0 | 0 | 0 | 0 | 0 |

The following table 18 illustrates the performance evaluation of Capability versus size comparison (N=24) based upon FIG. 17. The typical adder cell counts in the above table are based upon a multiplier design using a 4-3 bit Modified Booth Encoding Algorithm.

uct is to any bit boundary, so that weights of every power of two must be supported. Truncation of "dropped bits" in either the accumulator or partial product circuitry require G1 to be able to mask digits. Integer performance is the same as that described in the

TABLE 18

| Operation | Acc Bits | Alignment Slots | Adder Cells | E1 + H1 Bits | Cyc Start to End | Cyc to start next | Typical Adder Cell Count | Typical Register Bit Count | Remarks |
|---|---|---|---|---|---|---|---|---|---|
| Mul 24*24 | 56 | 1 | 272 | 244 | 3 | 1 | 272 | 112 | Allows $2^8$ accumulations Note 1 |
| Mul 24*24 | 80 | 2 | 296 | 292 | 3 | 1 | 296 | 160 | Allows $2^{32}$ accumulations Note 2 |
| Mul 24*48 | | | | | 4 | 2 | 512 | 160 | Allows $2^8$ accumulations |
| Mul 24*24 | 64 | 64 | 280 | 260 | 3 | 1 | 576 | 256 | Allows $2^{16}$ accumulations Note 3 |
| FMul 24*24 | | | | | 33 | 12 | | 256 | Allows indefinite number of accumulations Allows $2^8$ accumulations |
| Mul 24*24 P-adic | 48 | 16 | 264 | 260 | 3 | 1 | 576 | 192 | Allows 1 operation Note 4 |
| P-adic FMul 24*24 | | | | | 3 | 1 | | 192 | Allows indefinite number of accumulations |

Note:

The primary advantage of this circuit is that it performs twice as many multiply-accumulates in the same period of time as the standard implementation. It is somewhat larger, due to the memory bits in the E1 circuit.

Alignment in this new circuit is the same as multiplying the product by 1 and $2^{24}=(2^8)^3$. It is functionally equivalent to a 24 by 48 bit multiplier with follow-on local carry propagate adder for accumulation. The equivalent circuit would require 512 adder cells and 160 bits of accumulator memory compared to 296 adder cells and 292 bits of memory. It would have about 60% as much logic circuitry. Its clock cycle time is approximately half that of the standard equivalent device. The new circuit would have the same throughput as the standard implementation for 24 by 48 bit multiplications, but for 24 by 24 bit multiplications, would perform twice as fast.

This circuit is capable of performing single precision mantissa multiplication. It is specified as supporting an Extended Scientific Notation, which forces the implementation of dual accumulators. Alignment of a product previous note. Note that the present multiplier-accumulator can support a new single precision floating point multiplication-accumulation every clock cycle.

This is the first circuit discussed in this patent capable of p-adic floating point support, P=7. Since alignment is at p-digit boundaries, a 48 bit (which is 16 p-digits) accumulator only requires 16 alignment slots, making its implementation of the alignment mechanism much less demanding. The adder cells used here are p-adic adder cells, which are assuming to work on each of the three bits of a redundant p-digit notation. These adder cells may well be different for each bit within a digit, but will be counted as having the same overall complexity in this discussion. The primary advantage of this circuit is that its performance is twice the performance of the standard implementation.

Multiplier as 16 by N using a 4-3 Booth Coding Scheme in FIG. 18

Multiplier 300 circuitry

Table 19 illustrates coefficient generation for multipliers 300:

TABLE 19

| C1 | C2 | C3 | C4 | C5 | C6 | C7 | C8 | Digit k |
|---|---|---|---|---|---|---|---|---|
| 0 | 0 | 0 | 0 | 0 | ABf | Z1f | 0 | 31 |
| 0 | 0 | 0 | 0 | 0 | AfsBf | Z1e | 0 | 30 |
| 0 | 0 | 0 | 0 | 0 | AeuBf | Z1d | 0 | 29 |
| 0 | 0 | 0 | 0 | ABc | AduBf | Z1c | 0 | 28 |
| 0 | 0 | 0 | 0 | AfsBc | AcuBf | Z1b | 0 | 27 |
| 0 | 0 | 0 | 0 | AeuBc | AbuBf | Z1a | 0 | 26 |
| 0 | 0 | 0 | AB9 | AduBc | AauBf | Z19 | 0 | 25 |
| 0 | 0 | 0 | AfsB9 | AcuBc | A9uBf | Z18 | 0 | 24 |
| 0 | 0 | 0 | AeuB9 | AbuBc | A8uBf | Z17 | 0 | 23 |
| 0 | 0 | AB6 | AduB9 | AauBc | A7uBf | Z16 | 0 | 22 |
| 0 | 0 | AfsB6 | AcuB9 | A9uBc | A6uBf | Z15 | 0 | 21 |
| 0 | 0 | AeuB6 | AbuB9 | A8uBc | A5uBf | Z14 | 0 | 20 |
| 0 | AB3 | AduB6 | AauB9 | A7uBc | A4uBf | Z13 | 0 | 19 |
| 0 | AfsB3 | Ac1uB6 | A9uB9 | A6uBc | A3uBf | Z12 | 0 | 18 |
| 0 | AeuB3 | AbuB6 | A8uB9 | A5uBc | A2uBf | Z11 | 0 | 17 |
| AB0 | AduB3 | AauB6 | A7uB9 | A4uBc | A1uBf | Z10 | 0 | 16 |

TABLE 19-continued

| C1 | C2 | C3 | C4 | C5 | C6 | C7 | C8 | Digit k |
|---|---|---|---|---|---|---|---|---|
| AfsB0 | AcuB3 | A9uB6 | A6uB9 | A3uBc | A0uBf | Zf | 0 | 15 |
| AeuB0 | AbuB3 | A8uB6 | A5uB9 | A2uBc | 0 | Ze | 0 | 14 |
| AduB0 | AauB3 | A7uB6 | A4uB9 | A1uBc | 0 | Zd | 0 | 13 |
| AcuB0 | A9uB3 | A6uB6 | A3uB9 | A0uBc | 0 | Zc | 0 | 12 |
| AbuB0 | A8uB3 | A5uB6 | A2uB9 | 0 | 0 | Zb | 0 | 11 |
| AauB0 | A7uB3 | A4uB6 | A1uB9 | 0 | 0 | Za | 0 | 10 |
| A9uB0 | A6uB3 | A3uB6 | A0uB9 | 0 | 0 | Z9 | 0 | 9 |
| A8uB0 | A5uB3 | A2uB6 | 0 | 0 | 0 | Z8 | 0 | 8 |
| A7uB0 | A4uB3 | A1uB6 | 0 | 0 | 0 | Z7 | 0 | 7 |
| A6uB0 | A3uB3 | A0uB6 | 0 | 0 | 0 | Z6 | 0 | 6 |
| A5uB0 | A2uB3 | 0 | 0 | 0 | 0 | Z5 | 0 | 5 |
| A4uB0 | A1uB3 | 0 | 0 | 0 | 0 | Z4 | 0 | 4 |
| A3uB0 | A0uB3 | 0 | 0 | 0 | 0 | Z3 | 0 | 3 |
| A2uB0 | 0 | 0 | 0 | 0 | 0 | Z2 | 0 | 2 |
| A1uB0 | 0 | 0 | 0 | 0 | 0 | Z1 | 0 | 1 |
| A0uB0 | 0 | 0 | 0 | 0 | 0 | Z0 | 0 | 0 |

Trimmed Adder Tree Requirements

Examination of Table 19 shows that Adder D4 is not needed to achieve a fixed point polynomial step implementation. Adder D4 and D6 would be unnecessary for implementations which did not support single cycle polynomial step operations.

Implementation of polynomial step operations

Fixed point arithmetic polynomial step calculations would not need Adder D4.

The assumption would be that the computation's precision would match or be less than N bits, so that the Z input in this case would be 16 bits, which would be aligned to the most significant bits of the product. Integer arithmetic polynomial step calculations would also not need Adder D4. The major difference would be that the offset in such a situation would be assumed to be of the same precision as the result of the multiplication, so that Z would be assumed to be 32 bits.

Table 20 illustrates Performance versus Size for N=16.

standard circuit and the same performance for 16 by 32 bit multiplies.

This new circuit has alignment weights of 1, $2^{16}$ and $2^{32}=(2^{16})^2$. It possesses about half of the logic of a standard implementation. It performs one 32 by 32 bit multiply in 4 of its clock cycles, compared to the standard implementation taking about 2 new circuit clock cycles.

However, it performs a 16 by 16 bit multiply every clock cycle, which is twice as fast as the standard implementation.

This new circuit has alignment weights of 1, $2^{16}$, $2^{32}=(2^{16})^2$ and $2^{48}=(2^{16})^3$. It possesses about a third of the logic of a standard implementation. It performs one 32 by 48 bit multiply in 6 of its clock cycles, compared to the standard implementation taking about 2 new circuit clock cycles. However, it performs a 16 by 16 bit multiply every clock cycle, which is twice as fast as the standard implementation.

Figure 20:
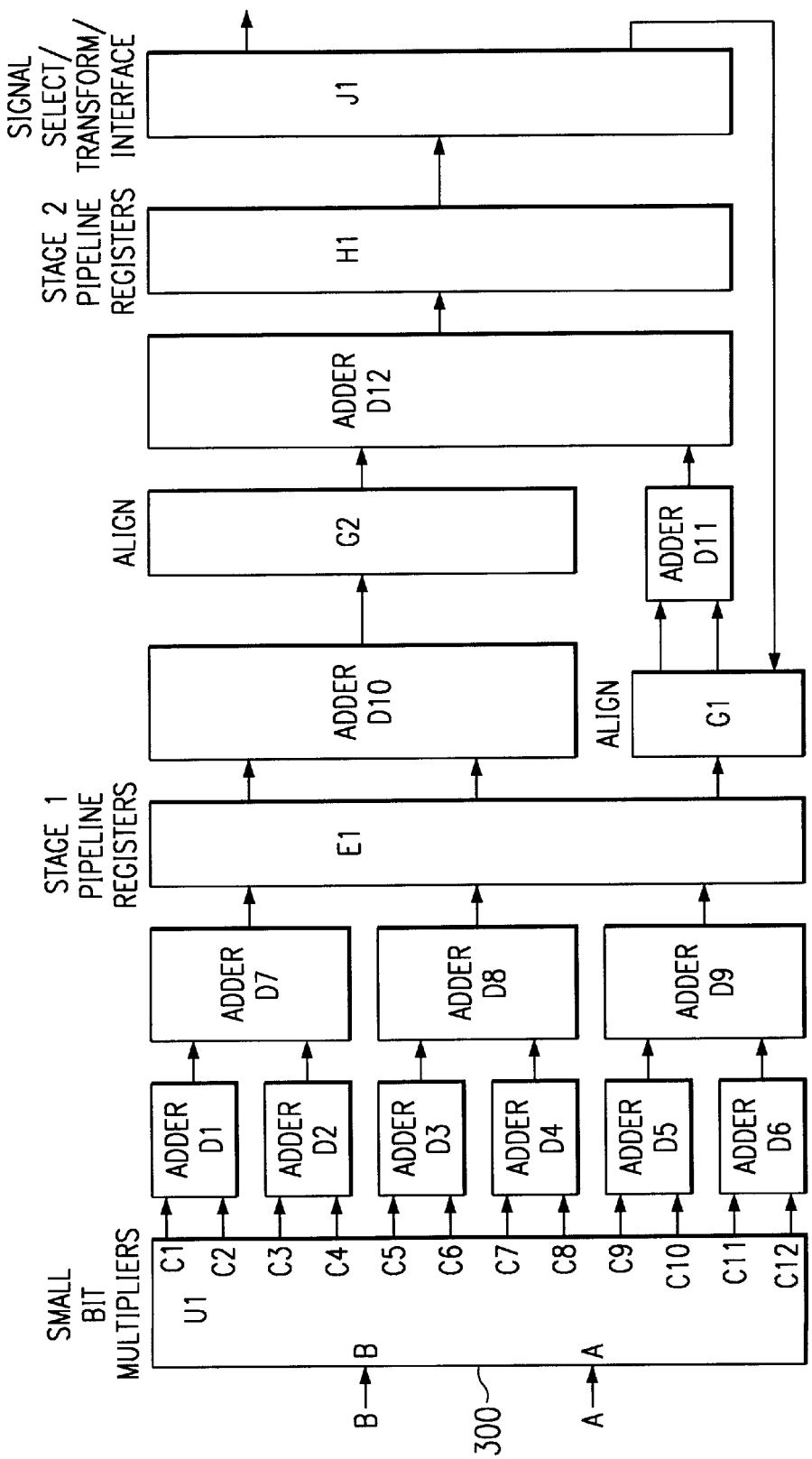
FIG. 20 has an additional four numbers generated in the multiplier block.

The basic difference in the MAC of FIG. 20 and the above MAC of FIG. 19 is that there are an additional four numbers

TABLE 20

| Operation | Acc Bits | Alignment Slots | Adder Cells | E1 + H1 Bits | Cyc Start to End | Cyc to start next | Typical Adder Cell Count | Typical Register Bit Count | Remarks |
|---|---|---|---|---|---|---|---|---|---|
| Mul 16*16 | 40 | 1 | 148 | 132 | 2 | 1 | 196 | 80 | Allows $2^8$ accumulations Note 1 |
| Mul 16*16 | 56 | 2 | 196 | 148 | 2 | 1 | 196 | 112 | Allows $2^{24}$ accumulations Note 2 |
| Mul 16*32 | | | | | 3 | 2 | 300 | 112 | Allows $2^8$ accumulations |
| Mul 16*16 | 64 | 3 | 220 | 156 | 2 | 1 | 220 | 128 | Allows $2^{32}$ accumulations Note 3 |
| Mul 16*32 | | | | | 3 | 2 | 316 | 128 | Allows $2^{16}$ accumulations |
| Mul 32*32 | | | | | 5 | 4 | 600 | 144 | Allows $2^8$ accumulations |
| Mul 16*16 | 88 | 4 | 270 | 196 | 2 | 1 | 270 | 176 | Allows $2^{56}$ accumulations Note 4 |
| Mul 16*32 | | | | | 3 | 2 | 374 | 176 | Allows $2^{40}$ accumulations |
| Mul 32*32 | | | | | 5 | 4 | 648 | 176 | Allows $2^{16}$ accumulations |
| Mul 32*48 | | | | | 8 | 6 | 900 | 176 | Allows $2^8$ accumulations |

Notes:

This circuit has as its major advantage being able to perform twice as many multiply-accumulates in the same time as a standard implementation.

Alignment weights are the same as multiplying by 1 and $2^{16}$. This circuit has about 70% of the standard multiplier circuit capable of the same operations. It has twice the performance for 16 by 16 bit multiplies as the generated in multiplier block 300, C9–C12. This requires six holders D1–D6 on the output. The Adders D5 and D6 extend the precision of the multiplication which can be accomplished by 50% beyond that which can be achieved by a comparable circuit of the basic Multiplier described above. A 32 bit by N bit single cycle multiplication could be achieved without the necessity of D6. In such an implementation, D6 would provide the capability to implement a polynomial step operation of the form X*Y+Z, where X and Z are input numbers and Y is the state of an accumulator register contained in H1. This would be achieved in a manner similar to that discussed regarding FIGS. 18 and 19. Such an implementation would require at least two accumulator registers in H1 for optimal performance. If N>=32, then with the appropriate alignment slots in G1 and G2, these operations could support multiple precision integer calculations. Such operations are used in commercial symbolic computation packages, including Mathematica, Macsyma, and MAPLE V, among others.

An implementation of 28 by N bit multiplication would be sufficient with the use of D6 to provide offset additions supporting two cycle X*Y+Z polynomial step calculation store the result. The primary performance improvement comes from being able to handle more bits in parallel in one clock cycle. The secondary performance improvement comes from being able to start a second operation while the first operation has traversed only about half the adder tree as in the primary circuitry discussion. The third performance improvement comes from the ability to perform multiple-precision calculations without significantly affecting the size of the circuit. An implementation based upon this diagram with a trimmed adder tree can support 32 by N bit multiply-accumulates.

Table 21 illustrates a Trimmed adder tree supporting 32 by 32 Multiplication (Performance versus Size for N=32).

TABLE 21

| Operation | Acc Bits | Alignment Slots | Adder Cells | E1 + H1 Bits | Cyc Start to End | Cyc to start next | Typical Adder Cell Count | Typical Register Bit Count | Remarks |
|---|---|---|---|---|---|---|---|---|---|
| Mul 32*32 | 80 | 1 | 508 | 400 | 2 | 1 | 508 | 160 | Allows $2^{16}$ accumulations Note 1 |
| Mul 32*32 | 112 | 2 | 572 | 464 | 2 | 1 | 572 | 224 | Allows $2^{56}$ accumulations Note 2 |
| Mul 32*64 |  |  |  |  | 3 | 2 | 860 | 224 | Allows $2^{16}$ accumulations |
| Mul 32*32 | 144 | 3 | 636 | 528 | 2 | 1 | 636 | 288 | Allows $2^{80}$ accumulations Note 3 |
| Mul 32*64 |  |  |  |  | 3 | 2 | 924 | 288 | Allows $2^{48}$ accumulations |
| Mul 64*64 |  |  |  |  | 5 | 4 | 1664 | 288 | Allows $2^{16}$ accumulations |
| Mul 32*32 | 160 | 4 | 672 | 560 | 2 | 1 | 668 | 320 | Allows $2^{56}$ accumulations Note 4 |
| Mul 32*64 |  |  |  |  | 3 | 2 | 960 | 320 | Allows $2^{40}$ accumulations |
| Mul 64*64 |  |  |  |  | 5 | 4 | 1694 | 320 | Allows $2^{16}$ accumulations |
| Mul 64*96 |  |  |  |  | 8 | 6 | 2176 | 320 | Allows $2^{8}$ accumulations | support for Standard Double Precision Floating Point mantissa calculations.

Implementations of either of the last two implementations which contained four accumulation registers in H1 would be capable of supporting Extended Precision Floating Point Mantissa Multiplication/Accumulations acting upon two complex numbers, which is a requirement for FORTRAN runtime environments. Any of the above-discussed implementations could be built with the capability of supporting p-adic floating point operations of either Standard or Extended Precision Floating Point, given the above discussion. Adder chains D7, D8 and D9 are provided on the output of Adders D1–D6 in a true configuration. These Adder chains D7, D8 and D9 take as inputs the results of D1, D2, D3, D4, D5 and D6, respectively. The primary Multiplier does not contain D9. It is specific to the embodiment discussed herein.

As in the initial Multiplier/Accumulator architecture of FIG. 17, the inputs of Adder D10 are the results of Adders D7 and D8, which have been registered in Block E1. Adder D11 takes as inputs the aligned results of Adder D9 and aligned results of selected memory contents of H1. In this embodiment to the Basic Multiplier/Accumulator Architecture. Adder D11 takes as inputs the aligned results of Adder D9 and aligned results of selected memory contents of H1. The alignment mentions in the last sentence is performed by G1. The aligned results of Adder D9 have traversed E1, where they synchronously captured.

Adder D12 receives the aligned results of the Adders D10 and the results of Adder D11. G2 aligns the results of Adder D10 prior to input of this aligned signal bundle by Adder D12. The results of its operation are sent to Block H1, where one or more of the registers(s) internal to Block H1 may Notes:
This circuit performs twice as many multiply-accumulates in the same time as a standard implementation.

Alignment weights for this circuit are the same as multiplying by 1 and $2^{32}$. This circuit has about 70% of the standard multiplier circuit capable of the same operations. It has twice the performance for 32 by 32 bit multiplies as the standard circuit and the same performance for 32 by 64 bit multiplies.

This circuit has alignment weights of 1, $2^{32}$ and $2^{64}=(2^{32})^2$. It possesses less than half of the logic of a standard implementation. It performs one 64 by 64 bit multiply in 4 of its clock cycles, compared to the standard implementation taking about two circuit clock cycles.

However, it performs a 32 by 32 bit multiply every clock cycle, which is twice as fast as the standard implementation.

This circuit has alignment weights of 1, $2^{32,}$ $2^{64}=(2^{32})^2$ and $2^{96}=(2^{32})^3$. It possesses about a third of the logic of a standard implementation. It performs one 64 by 96 bit multiply in 6 of its clock cycles, compared to the standard implementation taking about two circuit clock cycles. However, it performs a 32 by 32 bit multiply every clock cycle, which is twice as fast as the standard implementation.

Figure 21:
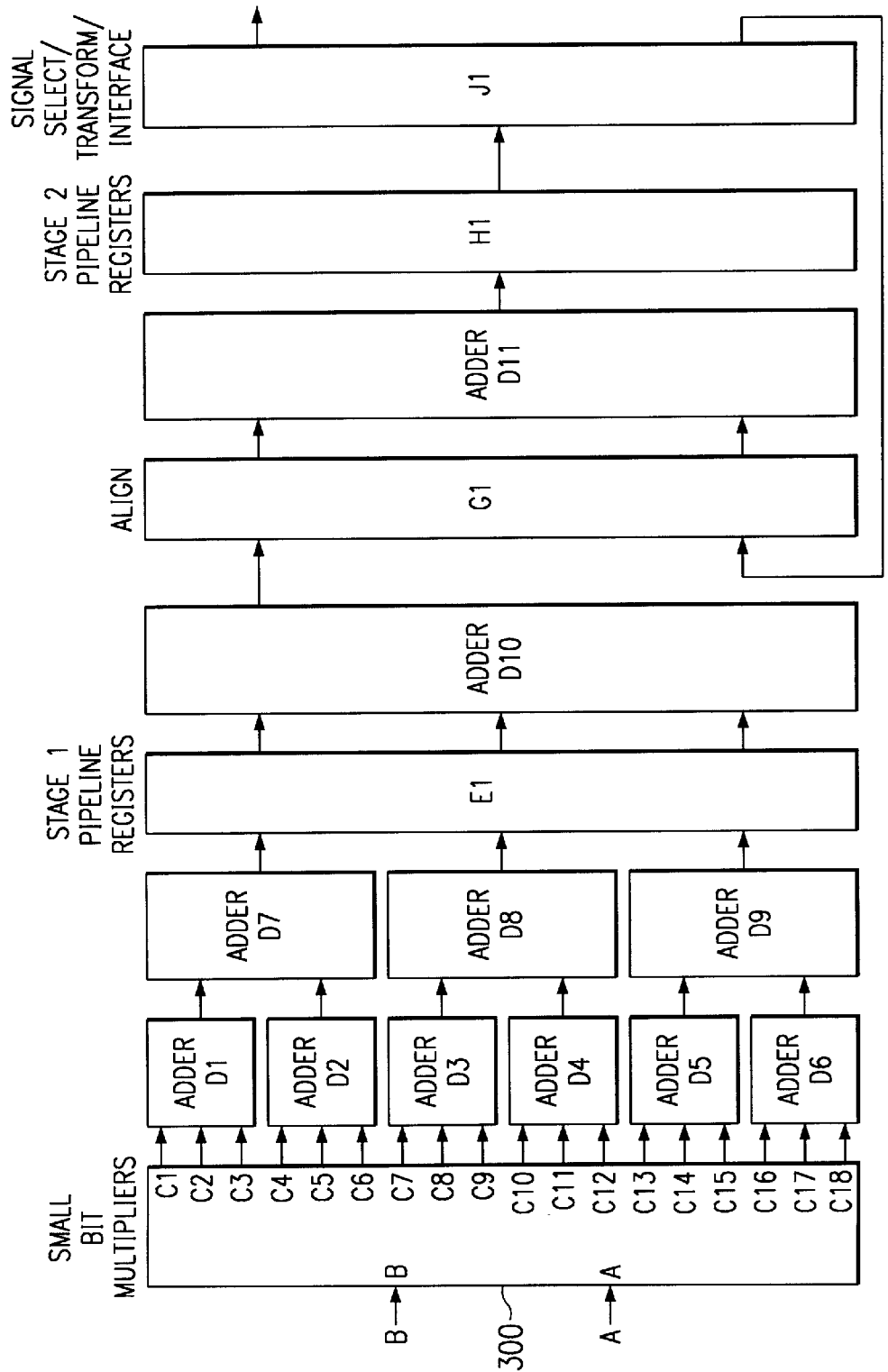
FIG. 21 illustrates a basic multiplier-accumulator.
Figure 22:
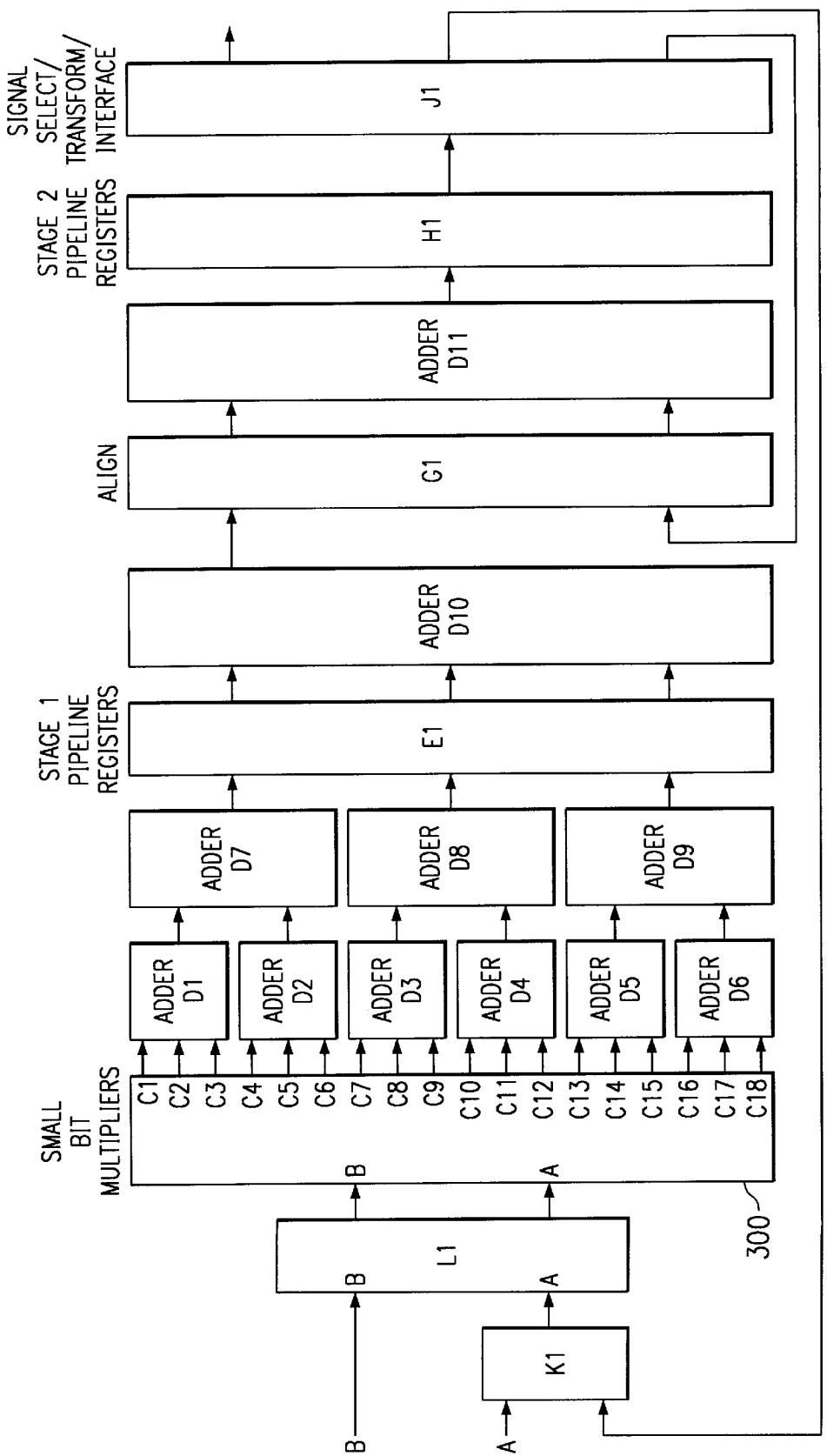
FIG. 22 illustrates an extended circuit which supports optimal polynomial calculation steps.

Referring now to FIGS. 21 and 22, there are illustrated two additional embodiments of the MAC 68. Both of these FIGS. 21 and 22 support single-cycle double precision floating point mantissa multiplications. They may be implemented to support Extended Scientific Floating Point Notations as well as p-adic floating point and extended floating point with the same level of performance. FIG. 21 represents a basic multiplier-accumulator. FIG. 22 represents an extended circuit which supports optimal polynomial calculation steps.

Use of 4-3 Modified Booth Multiplication Encoding will be assumed for multiplier block 300. The support of small p-adic floating point mantissa or Modular Arithmetic multiplication would require a modification of this scheme. The 18 partial products which are generated support the 54 bit mantissa fields of both standard double precision and also p=7 p-adic double precision. These FIGS. 21 and 22 represent circuitry thus capable of 54 by 54 bit standard mantissa multiplication as well as 18 by 18 digit (54 bits) p-adic mantissa calculation.

Starting from the left, the first layer of adders (D1–D6) on the output of multiplier block 300 and the third layer of adders (D10) on the output of pipeline registers E1 are the sum of three-number adder chains. The second and fourth layers of adders (D7–9 and D11) are the sum of two number adders. The alignment circuitry G1 and the use of an adder ring in D11 provide the alignment capabilities needed for the specific floating point notations required. Circuitry in H1 may be implemented to support Extended Scientific Notations as well as optimize performance requirements for Complex Number processing for FORTRAN. The functions performed by J1 are not substantially different from the above-noted embodiments.

With further reference to FIG. 21, the major item to note is that there are an additional six numbers generated in multiplier block 300 beyond what FIG. 20 could generate. The Adders D1 to D6 each add three numbers represented by the signal bundles C1 to C18. Standard, as well as p=7 p-adic, floating point double precision mantissa multiplications require 54 bit (18 p=7 p-adic digit) mantissas. This multiplier block 300 would be able to perform all the small bit multiplications in parallel. The results of these small bit multiplications would then be sent to Adders D1 to D6 to create larger partial products.

The adder chains D7, D8 and D9 take as inputs the results of D1, D2, D3, D4, D5 and D6, respectively. The primary Multiplier claimed does not contain D9. It is specific to the embodiment being discussed here. Adder D10 also sums three numbers. The inputs of Adder D10 are the results of Adders D7, D8 and D9, which have been registered in Block E1. Adder D11 receives the aligned results of the Adders D10 and the selected contents of H1. G1 aligns the results of Adder D10. The results of its operation are sent to Block H1, where one or more of the registers(s) internal to Block H1 may store the result.

Register Block H1 and Interface J1 have an additional function in FIG. 22: The ability to be loaded with an additional number "Y" which may then be used to compute B*Z+Y. The primary performance improvement comes from being able to handle a double precision mantissa multiplication every clock cycle with the necessary accumulators to support Extended Scientific Precision Floating Point for either standard or p=7 p-adic arithmetic. The secondary performance improvement comes from being able to start a second operation while the first operation has traversed only about half the adder tree as in the primary circuitry discussion.

he following Table 22 describes the performance analysis of Multipliers with two accumulators capable of supporting Extended Scientific Double Precision Standard and p=7 p-adic multiplication-accumulation on every cycle.

TABLE 22

| Operation | Acc (2) Bits | Alignment Slots | Adder Cells | E1 + H1 Bits | Cyc Start to End | Cyc to start next | Typical Adder Cell Count | Typical Register Bit Count | Remarks |
|---|---|---|---|---|---|---|---|---|---|
| FMul 54*54 | 256 | 128 | 475(3) 338(2) | 932 | 2 | 1 | 475(3) 338(2) | 512 | Note 1 |
| PFMul 18*18 | 216 | 36 | 475(3) 298(2) | 812 | 2 | 1 | 475(3) 298(2) | 432 | Note2 |

Note:

This design implements standard double precision mantissa multiplication-accumulate targeting extended scientific notation accumulators.

This notation requires dual accumulators of twice the length of the mantissa. Minimally, 108 alignment slots would be sufficient. For simplicity of design, the alignment slots are made a power of two. This drives the requirement of accumulators holding 128 bits in the redundant binary notation. Note that complex number support would double the number of accumulators required. Such support is needed for FORTRAN and optimal for Digital Signal Processing applications based upon complex number arithmetic.

The number of adder cells is decomposed into two types: those which sum 3 numbers (3) and those sum two numbers(2). These adder cell numbers represent the cells in the respective adders D1–D11 as all being of the same type, which is a simplification.

The primary difference between this and a standard approach is performance: the new circuit performs twice as many multiplies in the same amount of time.

Use of FIG. 22-based circuitry enhances performance by permitting polynomial calculation step optimization. This represents a speedup of a factor of two in these calculations.

This design implements p=7 p-adic double precision mantissa multiplication-accumulate targeting extended scientific notation acculators.

Double length accumulators require 36 digit storage, which poses a problem: if the approach taken in new circuit 1(simplicity of the alignment slots) were used here, it would require 64 alignment slots, resulting in 64 digit accumulators. This is a lot more accuracy than would seem warranted. The assumptions made here are that there are 36 alignment slots, with 36 redundant p-adic digits required of each of the two accumulators. Each redundant p-adic digit will be assumed to require 6 bits of memory.

Note that complex number support would double the number of accumulators required. Such support is needed for FORTRAN and optimal for Digital Signal Processing applications based upon complex number arithmetic.

It will be further assumed that each digit of the redundant p-adic adder cell is roughly equivalent to 3 of the redundant binary adder cells. The number of adder cells is decomposed into two types: those which sum 3 numbers (3) and those sum two numbers(2). These adder cell numbers represent the cells in the respective adders D1–D11 as all being of the same type, which is a simplification.

Since there is no known equivalent circuit, comparison is more hypothetical: this circuit's throughput is twice a circuit lacking the E1 pipe registers.

Use of FIG. 22-based circuitry enhances performance by permitting polynomial calculation step optimization. This represents a speedup of a factor of two in these calculations.

Referring now to FIG. 23, there is illustrated a block diagram of a Multiplier Block with minimal support Circuitry. A Multiplier-Accumulator Block 310 contains a multiplier-accumulator comprised of a multiplier 312 and an accumulator 314, as described hereinabove, plus an input register block 316 labeled 'L2:MulInReg'. Signal bundles whose sources are external to this circuit are selected by a plurality of multiplexors 318 labeled 'K2:IN Mux(s)'. The selected signal bundles are synchronously stored in the memory of a block 320 labeled 'L1:IN Reg(s)'. The inputs to the Multiplier-Accumulator block 310 are selected by a multiplexor circuit 322 labeled 'K3:Mult Mux(s)'. A plurality of signals bundles from block 322 would then be sent to 322 and to a block 324 labeled 'K4:Add Mux(s)'.

The K4 block selects between synchronized externally sourced signal bundles coming from the block 320 and the contents (or partial contents) of selected memory contents of the accumulator block 314 labeled 'L4:MulAcReg(s)'. These signal bundles are then synchronously stored in the memory contents of a block 326, labeled 'L5:AddInReg' in an Adder block 328. The Adder is considered to optionally possess a mid-pipe register block labeled 'L6:AddMidReg (s)'. The synchronous results of the Adder are stored in the memory component(s) of the block labeled 'L7:AddAccReg (s)'. In the simplest implementations, the following components would not be populated: K2, L1, K3, K4 and L6.

Figure 24:
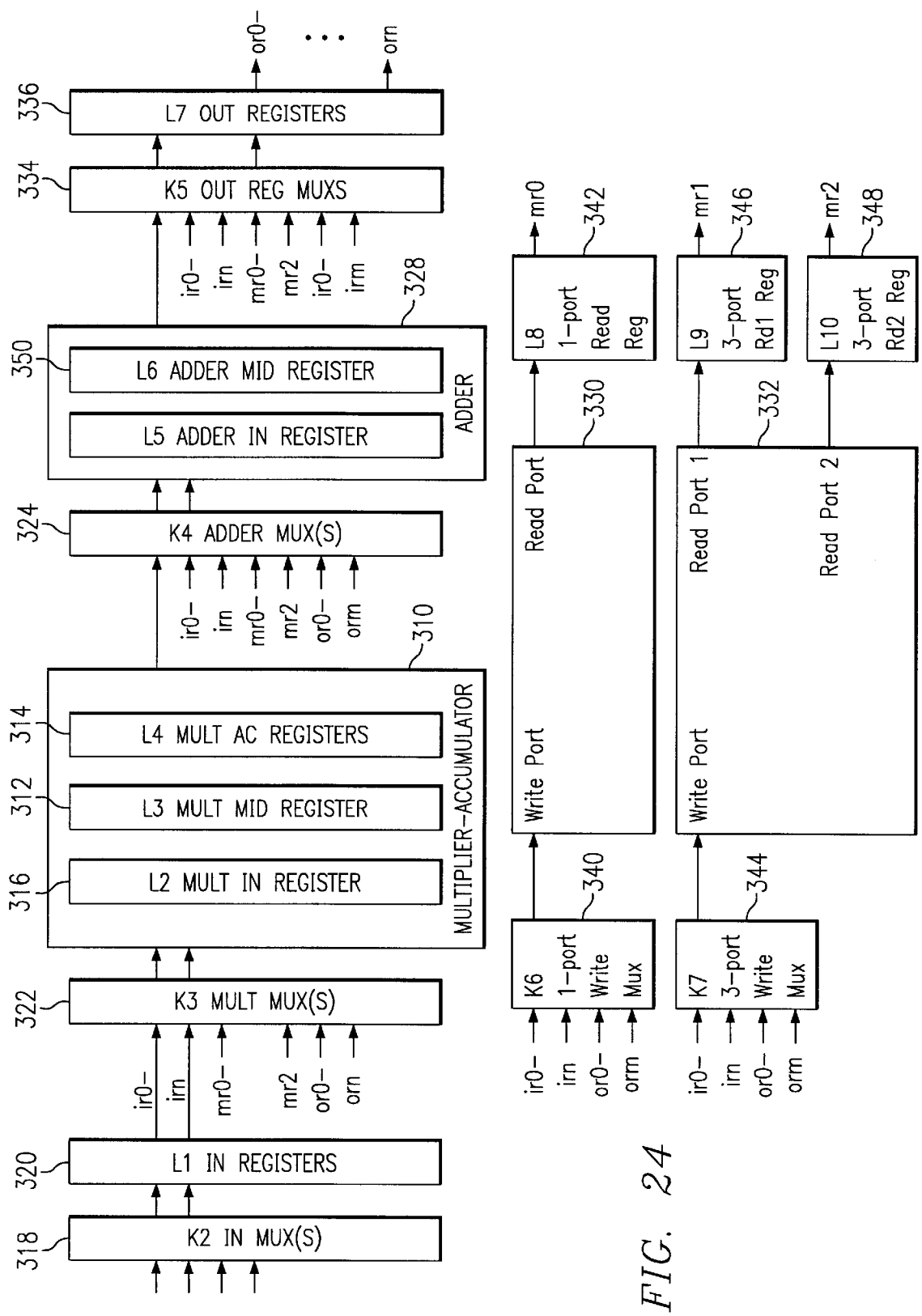
FIG. 24 is illustrates a block diagram of a multiplier-accumulator with Basic Core of Adder, one-port and three-port Memories.

Referring now to FIG. 24, there is illustrated a block diagram of a Multiplier-Accumulator with Basic Core of Adder, one-port and three-port Memories. This circuit incorporates all the functional blocks of FIG. 23 7 plus a one-port memory 330, similar to one-port memory 44, a three-port memory 322, similar to three-port memory 43, output register multiplexors 334 and output registers 336. The Multiplier's input selector 322 now selects between signal bundles from the input register block 320 (L1(ir0–irn)), the memory read port synchronized signal bundles(mr0–mr2) and the synchronized results of the output register block 336 (L7(or0–orn)). The Adder's accumulators L7 now serve as the output registers, with the block 334 'K5:OutRegMux(s)' selecting between adder result signal bundle(s), input register signal bundles (ir0–irn) and memory read port signal bundles (mr0–mr2). The Adder 328 may also possess status signals, such as equality, zero-detect, overflow, carry out, etc. which may also be registered. They are left silent in this diagram to simplify the discussion.

The one-port memory block 330 contains a write data multiplexor block 340, labeled 'K6:1-port Write Mux' which selects between the input register signal bundles 'ir0–irn' and the output register signal bundles 'or0–orn'. The selected signal bundle is sent to the write port of the memory. The read port sends its signal bundle to a read register 342, labeled 'L8:1-port Read Reg', which synchronizes these signals for use elsewhere. This memory can only perform one access in a clock cycle, either reading or writing. The contents of block 342 are assumed to change only when the memory circuit performs a read. Note that address generation and read/write control signal bundles are left silent in this diagram to simplify the discussion.

The three-port memory block 332 contains a write data multiplexor block 344, labeled 'K7:3-port Write Mux' which selects between the input register signal bundles 'ir0–irn' and the output register signal bundles 'or0–orn'. The selected single bundle is sent to the write port of the memory. The read ports send their signal bundles to a read register block 346, labeled 'L9:3-port Rd1 Reg' and a read register block 348, labeled 'L10:3-port Rd2 Reg', which synchronize these signals for use elsewhere. This memory 332 can perform two read and one write access in a clock cycle. The contents of 346 and 349 are assumed to change only when the memory circuit performs a read. Note that address generation and read/write control signal bundles are left silent in this diagram to simplify the discussion.

Figure 25:
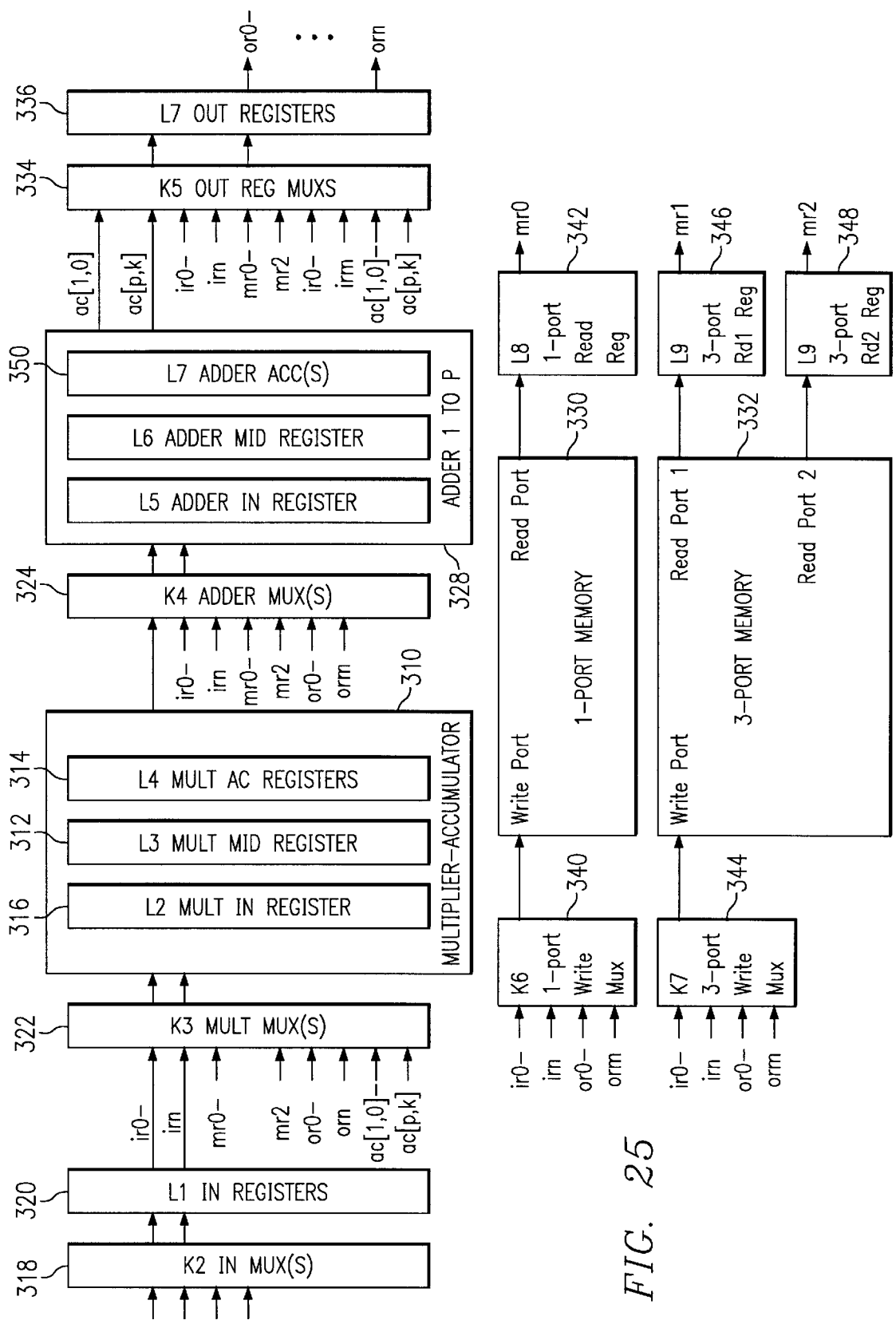
FIG. 25 illustrates a block diagram of a Multiplier-Accumulator with Multiplicity of Adders, and one-port and three-port Memories.

Referring now to FIG. 25, there is illustrated a block diagram of a Multiplier-Accumulator with Multiplicity of Adders, and one-port and three-port Memories. This circuit incorporates all the functional blocks of FIG. 24 plus one or more additional Adder blocks, each containing a multiplicity of Accumulators 350, labeled 'L7:AddAcc(s)'. Adder input multiplexing may be independently controlled to each Adder Block. Multiple signal bundles (ac[1,0] to ac[pk]) are assumed to be generated from these Adder Blocks. Any adder status signals, such as overflow, equality, zero detect, etc., are assumed synchronously stored and made available to the appropriate control signal generation circuitry. These status signal bundles, synchronizing circuitry and control signal generation circuitry are left silent in this figure for reasons of simplicity. The Multiplier Multiplexor 332 is extended to select any from the generated adder signal bundles (ac[1,0] to ac[p,k]). The Output Register Multiplexor 334 is extended any from the generated adder signal bundles (ac[1,0] to ac[p,k]).

The basic Advantages of Circuit represented by FIGS. 23 to 25 will now be described. Circuitry based upon FIG. 23 incorporates the advantages of the implemented multiplier-accumulators based upon the embodiments described hereinabove. The major systems limitation regarding multipliers is efficiently providing operands to the circuitry. The embodiment of FIG. 23 does not address this problem. Circuitry based upon FIGS. 24 and 25 solves the systems limitation in FIG. 23 for a broad class of useful algorithms which act upon a stream of data. A stream of data is characterized by a sequential transmission of data values. It possesses significant advantages in the ability to perform linear transformations (which includes Fast Fourier Transforms(FFTs), Finite Impulse Response (FIR) filters, Discrete Cosine Transforms(DCTs)), convolutions and polynomial calculations upon data streams. Linear Transformations are characterized as a square M by M matrix a times a vector v generating a resultant vector. In the general case, each result to be output requires M multiplications of a[ij] with v[j] for j=0, . . . , M. The result may then be sent to one or more output registers where it may be written into either of the memories. If the matrix is symmetric about the center, so that a[ij]=a[i,n−j] or a[ij]=−a[i,n−j], then an optimal sequencing involves adding or subtracting v[j] and v[n−j], followed by multiplying the result by a[ij], which is accumulated in the multiplier's accumulator(s). This dataflow reduces the execution time by a factor of two. Note that assuming the matrix a can be stored in the one port memory and the vector v can be stored in the three port memory, the multiplier is essentially always busy. This system data flow does not stall the multiplier. In fact, when the matrix is symmetric around the center, the throughput is twice as fast.

Figure 8:
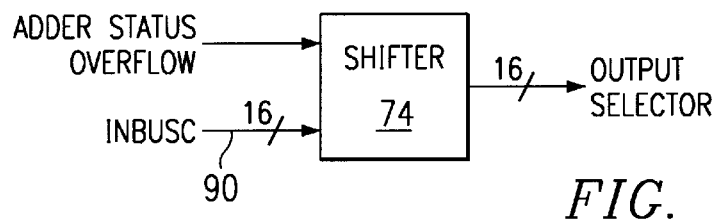
FIG. 8 illustrates a block diagram of the shifter.

Convolutions are characterized by acting upon a stream of data. Let x[−n], . . . , x[0], . . . , x[n] denote a stream centered at x[0]. A convolution is the sum c[0]* x[−n]* x[0]+. . . +c[n]*x[0]*x[n]. After calculating each convolution result, the data x[−n] is removed, the remaining data is "moved down" one element and a new piece of data becomes x[n]. Assuming that the x vector can be stored in the three-port memory, the acquiring of a new data element does not slow down the multiplier. The multiplier is essentially busy all the time. Polynomial calculations are optimized inside the multiplier-accumulator architecturally. Assuming sufficient memory to hold the coefficients, these multiplier-accumulator calculations can be performed on every clock cycle. Large-word integer multiplications are also efficiently implemented with these circuitry of FIGS. 7 and 8. Let A[0] to A[n] be one large integer and B[0] to B[m] be a second large integer. The product is a number C[0] to C[n+m] which can be represented as:

C[0]=Least Significant Word of A[0]*B[0],

C[1]=A[1]*B[0]+A[0]*B[1]+Second word of C[0]. . .

C[n+m]=A[n]*B[m]+Most Significant Word of C[n+m−1]

These calculations can also be performed with very few lost cycles for the multiplier. Circuitry built around FIG. 25 has the advantage in that bounds checking (which requires at least two adders) can be done in a single cycle, and symmetric Matrix Linear Transformations can simultaneously be adding or subtracting vector elements while another adder is converting the multiplier's accumulator(s).

Although the preferred embodiment has been described in detail, it should be understood that various changes, substitutions and alterations can be made therein without departing from the spirit and scope of the invention as defined by the appended claims.

What is claimed is:

1. A synchronous multiplier-accumulator comprising:

a first pipeline stage including: small bit multipliers to generate partial products from arithmetic data signals and an adder network coupled to the small bit multipliers to receive and sum said partial products and wherein said small bit multipliers support processing of p-adic arithmetic data signals, where p is a prime number; said adder network comprising local carry propagate adder cells configured as a multi-level adder tree to generate the product of said arithmetic data signals at an output level of said adder tree; said first pipeline stage also including a first accumulator having a plurality of registers to store results from one level of said adder tree for input to the next level of said adder tree; said first pipeline stage being operable to generate and sum said partial products and to store said results in said first accumulator during one clock cycle;

a second pipeline stage comprising a second accumulator having a plurality of registers to store results from a further adder comprising a plurality of local carry propagate adder cells; and an interface circuit coupled to the second accumulator to selectively access one or more stored results stored by said second accumulator; said output level of said adder tree coupled to input said product to said further adder; said second pipeline stage being operable during a clock cycle subsequent to said one clock cycle to selectively output one or more stored results from said second accumulator for output from said multiplier accumulator and/or for feedback to said further adder, and to operate said further adder and said output level of said adder tree.

2. A multiplier-accumulator according to claim 1, wherein said multiple level adder tree has either 3 or 4 levels.

3. A multiplier-accumulator according to claim 1, wherein said second pipeline stage includes alignment circuitry to align said product of the arithmetic data signals from the adder tree with precision components of a result stored by the second accumulator, and wherein said feedback input is coupled by said alignment circuitry to the further adder.

4. A multiplier-accumulator according to claim 1, wherein said subsequent clock cycle is next to said one clock cycle.

5. A multiplier-accumulator according to claim 1, said adder tree comprises a uniform adder tree or a k-ary adder tree.

6. A multiplier-accumulator according to claim 1, wherein p<−31.

7. A multiplier-accumulator according to claim 1, wherein p=7 or p=31.

8. A multiplier-accumulator according to claim 1, wherein said small bit multipliers include an input multiplexer operable to selectively couple to said small bit multipliers, arithmetic data signals or the contents of registers of said second accumulator selected by said interface circuit.

9. A multiplier-accumulator according to claim 1, wherein said second pipeline stage includes at least one further second accumulator to store results from said further adder, and wherein said interface circuit is also coupled to access one or more stored results stored by said at least one further second accumulator.

10. A synchronous multiplier-accumulator comprising:

a first pipeline stage including: small bit multipliers to generate partial products from arithmetic data signals an adder network coupled to the small bit multipliers to receive and sum said partial products; said adder network comprising local carry propagate adder cells configured as a multi-level adder tree to generate the product of said arithmetic data signals at an output level of said adder tree; said first pipeline stage also including a first accumulator having a plurality of registers to store results from one level of said adder tree for input to the next level of said adder tree; said first pipeline stage being operable to generate and sum said partial products and to store said results in said first accumulator during one clock cycle;

a second pipeline stage comprising a second accumulator having a plurality of registers to store results from a further adder comprising a plurality of local carry propagate adder cells; and an interface circuit coupled to the second accumulator to selectively access one or more stored results stored by said second accumulator; said output level of said adder tree coupled to input said product to said further adder:

said second pipeline stage being operable during a clock cycle subsequent to said one clock cycle to selectively output one or more stored results from said second accumulator for output from said multiplier accumulator and/or for feedback to said further adder and to operate said further adder and said output level of said adder tree;

wherein said first accumulator is located between levels of said adder tree to provide approximately equivalent signal propagation delays from the multiplier input to the first accumulator, and from the first accumulator to the second accumulator.

* * * * *